(12) United States Patent
Alagappan et al.

(10) Patent No.: US 7,720,641 B2
(45) Date of Patent: May 18, 2010

(54) APPLICATION OF ABNORMAL EVENT DETECTION TECHNOLOGY TO DELAYED COKING UNIT

(75) Inventors: Perry Alagappan, Houston, TX (US); Kenneth F. Emigholz, Chevy Chase, MD (US); Kevin R. Worden, Lemont, IL (US); Stephen S. Woo, Markham (CA); Anh T. Nguyen, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/786,950

(22) Filed: Apr. 13, 2007

(65) Prior Publication Data

US 2007/0250292 A1    Oct. 25, 2007

Related U.S. Application Data

(60) Provisional application No. 60/794,296, filed on Apr. 21, 2006.

(51) Int. Cl.
G06F 11/30    (2006.01)

(52) U.S. Cl. .............. 702/183; 702/182; 702/184; 702/33; 702/34; 700/30

(58) Field of Classification Search ............. 702/57–59, 702/81–84, 105, 182–184, 190–195; 201/1; 703/3; 700/108–110, 209–211
See application file for complete search history.

(56) References Cited

U.S. PATENT DOCUMENTS

| | | | |
|---|---|---|---|
| 3,175,968 A | | 3/1965 | Berger |
| 4,060,716 A | * | 11/1977 | Pekrul et al. ............... 702/184 |
| 4,549,934 A | * | 10/1985 | Graf et al. .................. 196/98 |
| 4,764,318 A | * | 8/1988 | Morgenstern et al. ...... 264/29.5 |
| 5,023,045 A | | 6/1991 | Watanabe et al. |
| 5,333,240 A | | 7/1994 | Matsumoto et al. |
| 5,351,247 A | | 9/1994 | Dow et al. |
| 5,457,625 A | | 10/1995 | Lim et al. |
| 5,465,321 A | | 11/1995 | Smyth |

(Continued)

FOREIGN PATENT DOCUMENTS

EP    0 428 135 A2    5/1991

(Continued)

OTHER PUBLICATIONS

Bell, Michael, Errington, Jamie, NOVA Chemicals Corporation; Reising, Dal Vernon, Mylaraswamy, Dinkar, Honeywell Laboratories; "Early Event Detection—A Prototype Implementation".

(Continued)

*Primary Examiner*—Eliseo Ramos Feliciano
*Assistant Examiner*—Mi'schita' Henson

(57) ABSTRACT

The present invention is a method for detecting an abnormal event for process units of a Delayed Coking Unit. The method compares the operation of the process units to statistical and engineering models. The statistical models are developed by principal components analysis of the normal operation for these units. The engineering models are based statistical and correlation analysis between variables. If the difference between the operation of a process unit and the normal model result indicates an abnormal condition, then the cause of the abnormal condition is determined and corrected.

44 Claims, 40 Drawing Sheets

U.S. PATENT DOCUMENTS

| | | | |
|---|---|---|---|
| 5,539,877 A | 7/1996 | Winokur et al. | |
| 5,817,958 A | 10/1998 | Uchida et al. | |
| 5,859,964 A | 1/1999 | Wang et al. | |
| 5,949,677 A | 9/1999 | Ho | |
| 5,949,678 A | 9/1999 | Wold et al. | |
| 5,950,147 A | 9/1999 | Sarangapani et al. | |
| 6,115,656 A | 9/2000 | Sudolsky | |
| 6,133,132 A | 10/2000 | Toprac et al. | |
| 6,207,043 B1* | 3/2001 | Vicari et al. | 208/237 |
| 6,368,975 B1 | 4/2002 | Balasubramhanya et al. | |
| 6,466,877 B1 | 10/2002 | Chen et al. | |
| 6,485,631 B1* | 11/2002 | Ellingsen | 208/142 |
| 6,505,145 B1 | 1/2003 | Bjornson | |
| 6,521,080 B2 | 2/2003 | Balasubramhanya et al. | |
| 6,522,978 B1 | 2/2003 | Chen et al. | |
| 6,564,119 B1 | 5/2003 | Vaculik et al. | |
| 6,606,580 B1 | 8/2003 | Zedda et al. | |
| 6,625,569 B2 | 9/2003 | James et al. | |
| 6,636,842 B1 | 10/2003 | Zambrano et al. | |
| 6,681,344 B1 | 1/2004 | Andrew | |
| 6,735,541 B2 | 5/2004 | Kern et al. | |
| 6,760,639 B2 | 7/2004 | Kallela et al. | |
| 6,809,837 B1 | 10/2004 | Mestha et al. | |
| 6,813,532 B2 | 11/2004 | Eryurek et al. | |
| 6,904,386 B2 | 6/2005 | Mylaraswamy | |
| 6,907,383 B2 | 6/2005 | Eryurek et al. | |
| 6,917,839 B2 | 7/2005 | Bickford | |
| 6,925,338 B2 | 8/2005 | Eryurek et al. | |
| 6,954,713 B2 | 10/2005 | Eryurek | |
| 6,973,396 B1 | 12/2005 | Shah et al. | |
| 6,978,210 B1 | 12/2005 | Suter et al. | |
| 6,980,938 B2 | 12/2005 | Cutler | |
| 7,079,984 B2 | 7/2006 | Eryurek | |
| 7,085,610 B2 | 8/2006 | Eryurek et al. | |
| 7,096,074 B2 | 8/2006 | Yulevitch et al. | |
| 7,181,654 B2 | 2/2007 | Ford, Jr. et al. | |
| 7,243,048 B2 | 7/2007 | Foslien et al. | |
| 2002/0077792 A1 | 6/2002 | Qiu | |
| 2003/0083756 A1 | 5/2003 | Hsiung et al. | |
| 2003/0255466 | 12/2003 | Yulevitch et al. | |
| 2004/0002776 A1 | 1/2004 | Bickford | |
| 2004/0033617 A1 | 2/2004 | Sonbul | |
| 2004/0078171 A1 | 4/2004 | Wegerich et al. | |
| 2004/0078683 A1 | 4/2004 | Buia et al. | |
| 2004/0172229 A1 | 9/2004 | Aragones et al. | |
| 2005/0067816 A1 | 3/2005 | Buckman | |
| 2005/0141782 A1 | 6/2005 | Guralnik et al. | |
| 2005/0149297 A1 | 7/2005 | Guralnik et al. | |
| 2005/0197805 A1 | 9/2005 | Eryurek et al. | |
| 2005/0267702 A1 | 12/2005 | Shah et al. | |
| 2005/0267710 A1* | 12/2005 | Heavner et al. | 702/183 |
| 2006/0020423 A1* | 1/2006 | Sharpe, Jr. | 702/183 |
| 2006/0036403 A1 | 2/2006 | Wegerich et al. | |
| 2006/0058898 A1* | 3/2006 | Emigholz et al. | 700/29 |
| 2006/0073013 A1* | 4/2006 | Emigholz et al. | 416/35 |
| 2006/0074598 A1 | 4/2006 | Emigholz et al. | |
| 2006/0074599 A1 | 4/2006 | Emigholz et al. | |
| 2007/0005266 A1 | 1/2007 | Blevins et al. | |
| 2007/0088448 A1 | 4/2007 | Mylaraswamy et al. | |
| 2007/0088528 A1 | 4/2007 | Miller | |
| 2007/0088534 A1 | 4/2007 | MacArthur et al. | |
| 2007/0124113 A1 | 5/2007 | Foslien et al. | |
| 2008/0097637 A1 | 4/2008 | Nguyen et al. | |
| 2008/0281557 A1 | 11/2008 | Emigholz | |
| 2009/0149981 A1 | 6/2009 | Evans et al. | |

FOREIGN PATENT DOCUMENTS

| | | |
|---|---|---|
| EP | 0 626 697 A1 | 11/1994 |
| JP | 02-2408 A | 1/1990 |
| JP | 10-143343 A | 5/1998 |
| WO | WO 2008/047098 A1 | 4/2008 |

OTHER PUBLICATIONS

Bell, Michael B., NOVA Chemicals; Foslien, Wendy K., Honeywell; "Early Event Detection—Results From A Prototype Implementation", 2005 Spring National Meeting Atlanta GA, Apr. 10-14, 17$^{th}$ Annual Ethylene Producers' Conference Session TA006—Ethylene Plant Process Control.

Mylaraswamy, Dinkar, Bullemer, Peter, Honeywell Laboratories; Emigholz, Ken, EMRE, ExxonMobil, "Fielding a Multiple State Estimator Platform", NPRA Computer Conference, Chicago, IL, Nov. 2000.

U.S. Appl. No. 11/212,188, filed Apr. 6, 2006, Emigholz.

Workman et al. 'Process Analytical Chemistry', In: Analytical Chemistry, vol. 71, No. 12, p. 121-180, Published May 1, 1999.

* cited by examiner

Probability Distribution of Process Data
Combined Continuous and Disturbed Operations DCU Schematic Layout DCU and Light Ends Processing Units AED Overview of DCU Process Fuzzy Logic Based Continuous Abnormality Indicator Fuzzy Logic Network for a Level Controller Monitor Complete Drill Down of a Furnace problem in AED

OVERVIEW LEVEL

SUMMARY LEVEL

DETAIL LEVEL

Overview Display on the Occurrence of a Furnace Problem

Indication of Furnace Sub-Area with a Problem

Bad Actor Pareto-Chart for a Furnace Problem

Multi-Trend Chart of Bad Actors (Predicted vs. Actual)

Detailed Trend of Worst Actor for Furnace Problem

Historical Trend of Furnace Sub-Area Normality Indicator

Valve Flow Pareto Chart (Furnace Feed Valves)

Valve-Flow model X-Y plot

Valve-Flow Fuzzy Network (Heater Valves)

Example of Valve Out of Controllable Range

Building a PCA Model: Distribution of Principal Components

Alert Suppression Network

APPLICATION OF ABNORMAL EVENT DETECTION TECHNOLOGY TO DELAYED COKING UNIT

This application claims the benefit of U.S. Provisional application 60/794,296 filed Apr. 21, 2006.

BACKGROUND OF THE INVENTION

The present invention relates to the operation of a Delayed Coking Unit (DCU) comprising of feed heaters, main fractionator, wet gas compressor, and downstream light ends processing towers referred to as the Gas Plant. In particular, the present invention relates to determining when the process is deviating from normal operation and automatic generation of notification.

Delayed Coking is a high-severity thermal cracking process used in petroleum refineries. The process unit, DCU, thermally decomposes the "bottom" of the crude barrel, which are typically the bottom streams of the atmospheric and vacuum crude distillation towers and produces a value-added mixture of olefins, naphthas, gas oils and petroleum coke. The overall reaction is endothermic with the furnace supplying the necessary heat for vaporization and cracking. The olefins are used in the petrochemical industry. Naphthas are used for various gasoline blends. Gas Oils are sent to other refinery units to be further cracked into naphthas and olefins. The coke, which is essentially carbon with varying amounts of impurities, is calcined (roasted to dry, without melting) and used in the aluminum, steel or chemical industries. Coke can also be burned as fuel, or gasified to produced steam or electricity.

FIG. 23 shows a typical DCU layout. One or more fired heaters with horizontal tubes are used in the process to reach thermal cracking temperatures of 905 to 941° F. (485 to 505° C.). With short residence time in the furnace tubes, coking (formation of Petroleum Coke) of the feed material is "delayed" until it reaches a large drum downstream of the heater. The thermodynamic conditions of the drum are well-suited for the cracking operation to proceed. These drums are designed to normally operate at a top drum vapor temperature of 825° F. (441° C.) and a pressure of 15 psig (103 kpag). As the feed cracks, the cracked products (vapors) are sent into a fractionator while coke accumulates in the drum. The fractionator separates the hydrocarbon mixture received from the coke drum into various fractions. The overhead product of the fractionator is sent through wet gas compressors to a light ends processing unit to further separate the light mixture.

When the drum is filled mostly with coke, the feed from the furnace is directed to an empty drum. Multiple drums are thus operated in a staggered fashion to ensure continuity of operations of the furnaces, fractionator and the gas plant. The coke in the filled drum is quenched, cut and removed with high-pressure water to a pit located below the coke drums. A bridge crane is used to transfer coke from the pit to a pad where water is allowed to drain from the coke before it is crushed and loaded onto railcars for transport. The emptied drum is cleaned and readied for the next cycle. The furnaces are brought offline about once every 3 months to clean coke deposits formed over time in the tubes through a process known as "decoking". In some refineries the furnaces are cleaned online through a process known as steam spalling. The delayed coking unit is thus capable of turndown to a nominal 50% of capacity which represents operation with one furnace and pair of drums out of service. The complete schematic with DCU and the downstream units is shown in FIG. 24.

Due to the complicated dynamic and semi-batch nature of the DCU, and due to the high-severity process conditions, abnormal process operations can easily result from various root problems that can escalate to serious problems and even cause plant shutdowns. Three problems typically plague the delayed coker units: 1) Premature coking of the heater tubes (instead of in the drum) resulting in reduced feed rates and reduced refinery throughput and eventual shutdown of the unit with significant economic losses; 2) Foam (produced while coking) carryover from the coke drum into the coker fractionator; 3) Reliability problems with the coker fractionator. These operations can have significant safety and economic implications ranging from lost production, equipment damage, environmental emissions, injuries and even death. A primary job of the operator is to identify the cause of the abnormal situation and execute compensatory or corrective actions in a timely and efficient manner.

The current commercial practice is to use advanced process control applications to automatically adjust the process in response to minor process disturbances, to rely on human process intervention for moderate to severe abnormal operations, and to use automatic emergency process shutdown systems for very severe abnormal operations. The normal practice is to notify the console operator of the start of an abnormal process operation is through "process alarms". These alarms are triggered when key process measurements (temperatures, pressures, flows, levels and compositions) violate predefined static set of operating ranges. These operating ranges are kept as wide as possible to avoid false alarms, and to avoid multiple related and repetitive alarms. Thus, when an alarm occurs, it is often too late for the operator to bring the process to normal operations without compromising the optimal production rates.

Furthermore, more than 600 key process measurements cover the operation of a typical DCU. Under the conventional Distributed Control System (DCS) system, the operator must survey this list of sensors and its trends, compare them with mental knowledge of normal DCU operation, and use their skill to discover the potential problems. Due to the very large number of sensors in an operating DCU, abnormalities can be and are easily missed. With the current DCS based monitoring technology, the only automated detection assistance an operator has is the DCS alarm system which is based on the alarming of each sensor when it violates predetermined limits. In any large-scale complex process such as the DCU, this type of notification is clearly a limitation as it often comes in too late for the operator to act to mitigate the problem. The present invention provides a more effective notification to the operator of the DCU.

SUMMARY OF THE INVENTION

The present invention is a method and system for detecting an abnormal event for the process units of a DCU. The system and method compare the current operation to various models of normal operation for the covered units. If the difference between the operation of the unit and the normal operation indicates an abnormal condition in a process unit, then the cause of the abnormal condition is determined and relevant information is presented efficiently to the operator to take corrective actions. The method is for abnormal event detection (AED) for some process units of a delayed coking unit (DCU). The method includes steps of comparing online measurements from the process units to a set of models for normal operation of the corresponding process units, determining if the current operation differs from expected normal operations so as to indicate the presence of an abnormal condition in a process unit, and assisting the process operator to determine the underlying cause of an abnormal condition in the DCU. The system includes a set of models for the process units describing operations of the process units including automatic detection of drum switches and furnace decoking operations, a display which indicates if the current operation differs from expected normal operations so as to indicate the presence of an abnormal condition in the process unit, and a display which indicates the underlying cause of an abnormal condition in the DCU.

DETAILED DESCRIPTION OF THE PREFERRED EMBODIMENTS

The present invention is a method to provide early notification of abnormal conditions in sections of the DCU to the operator using Abnormal Event Detection (AED) technology.

Figure 28:
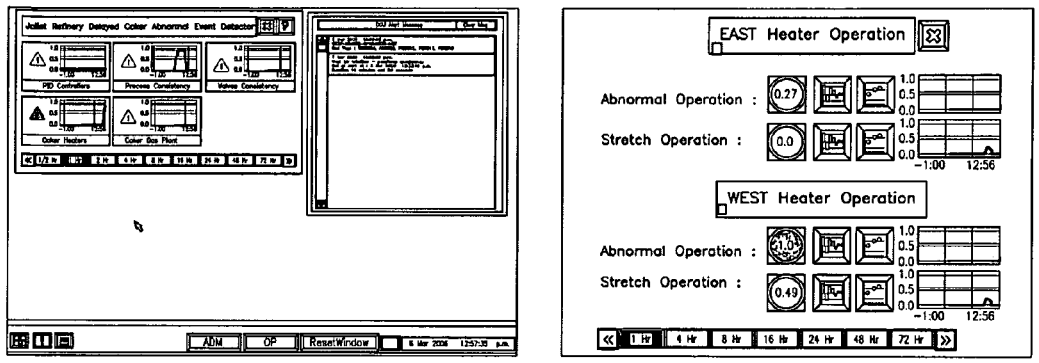
FIG. 28 shows that complete drill down for a Furnace Operation problem along with all the supporting evidences.
Figure 28:
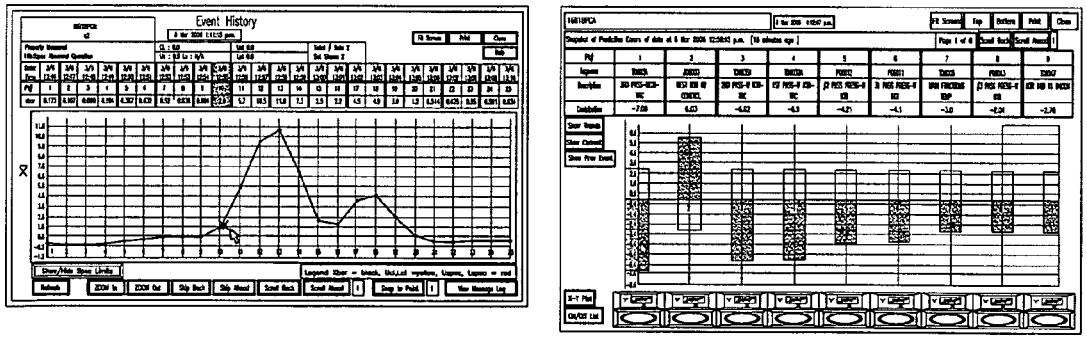
Figure 28:
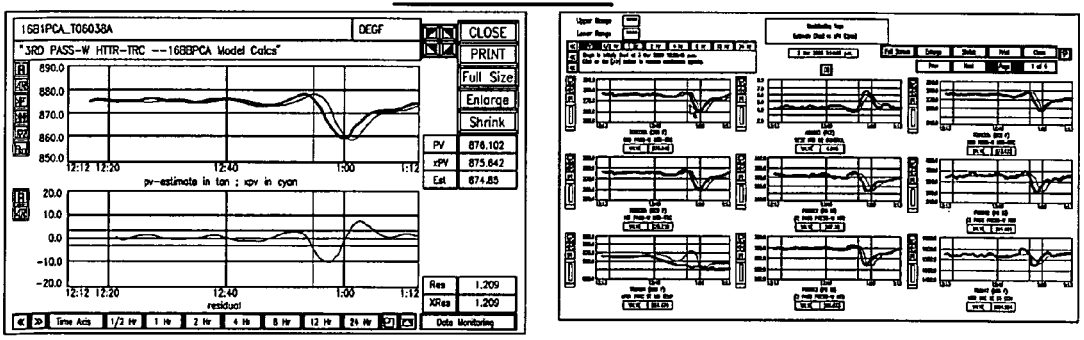

In contrast to alarming techniques that are snapshot based and provide only an on/off indication, this method uses fuzzy logic to combine multiple supportive evidences of abnormalities that contribute to an operational problem and estimates its probability in real-time. This probability is presented as a continuous signal to the operator thus removing any chattering associated with the current single sensor alarming-based on/off methods. The operator is provided with a set of tools that allow complete investigation and drill down to the root cause of a problem for focused action. This approach has been demonstrated to furnish the operator with advanced warning of the abnormal operation that can be minutes to hours earlier than the conventional alarm system. This early notification lets the operator to make informed decision and take corrective action to avert any escalation or mishaps. This method has been successfully applied to the DCU. For example, FIG. 28 shows the complete drill down for a Furnace Operation Problem.

The DCU application uses diverse sources of specific operational knowledge to combine indications from Principal Component Analysis (PCA), correlation-based engineering models, and relevant sensor transformations into several fuzzy logic networks. This fuzzy logic network aggregates the evidence and indicates the combined confidence level of a potential problem. Therefore, the network can detect a problem with higher confidence at its initial developing stages and provide crucial lead-time for the operator to take compensatory or corrective actions to avoid serious incidents. This is a key advantage over the present commercial practice of monitoring DCU based on single sensor alarming from a DCS system. Very often the alarm comes in too late for the operator to mitigate an operational problem due to the complicated, fast dynamic nature of DCU or (b) multiple alarms could flood the operator, confusing them and thus hindering rather than aiding in response.

In the preferred embodiment, the present invention divides the DCU operation into the following overall monitors:
1. Overall Furnaces Operation
2. Overall Gas Plant Operation and the following special concern monitors
3. Health of PID Controllers
4. Operations Consistency
5. Valve Flow Consistency The overall monitors carry out "gross model checking" to detect any deviation in the overall operation and cover a large number of sensors. The special concern monitors cover areas with potentially serious concerns and consist of focused models for early detection. In addition to all these monitors the application provides for several practical tools such as those dealing with suppression of notifications generated from normal/routine operational events and elimination of false positives due to special cause operations such as drum-switching.

A. Operator Interface

The operator user interface is a critical component of the system as it provides the operator with a bird's eye view of the process. The display is intended to give the operator a quick overview of DCU operations and indicate the probability of any developing abnormalities.

Figure 25:
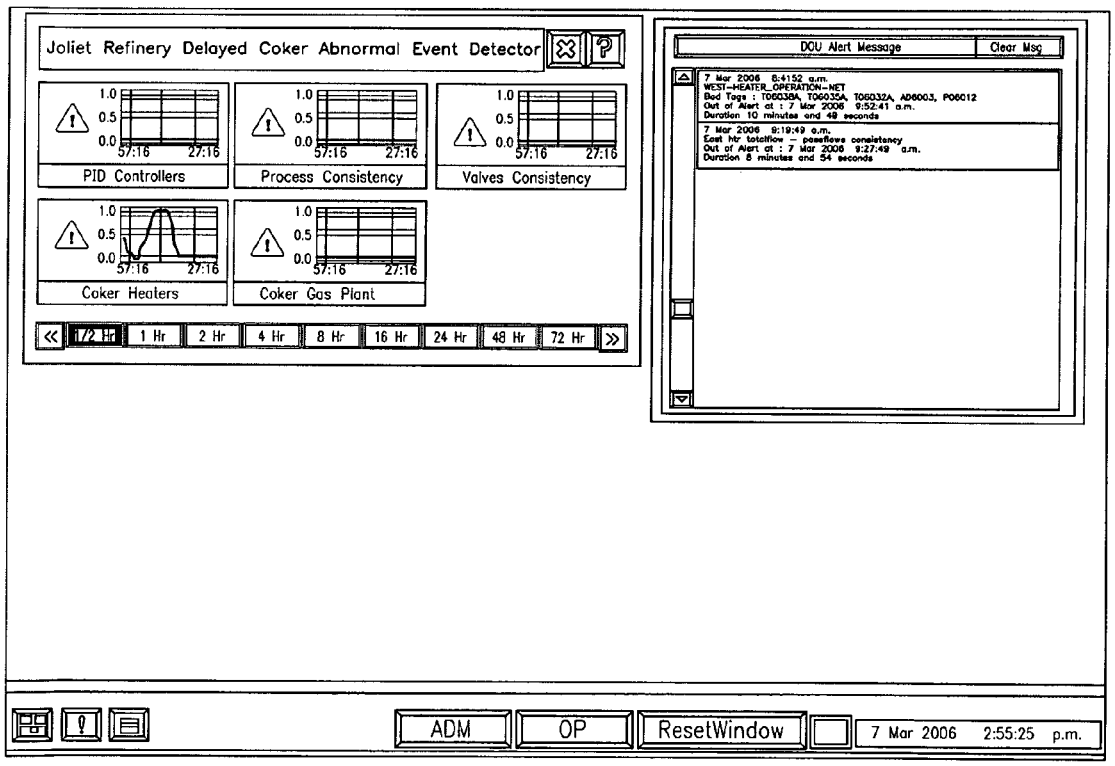
FIG. 25 shows the operator display of all the problem monitors for the DCU operation along with a display of a log of recent alerts.
Figure 26:
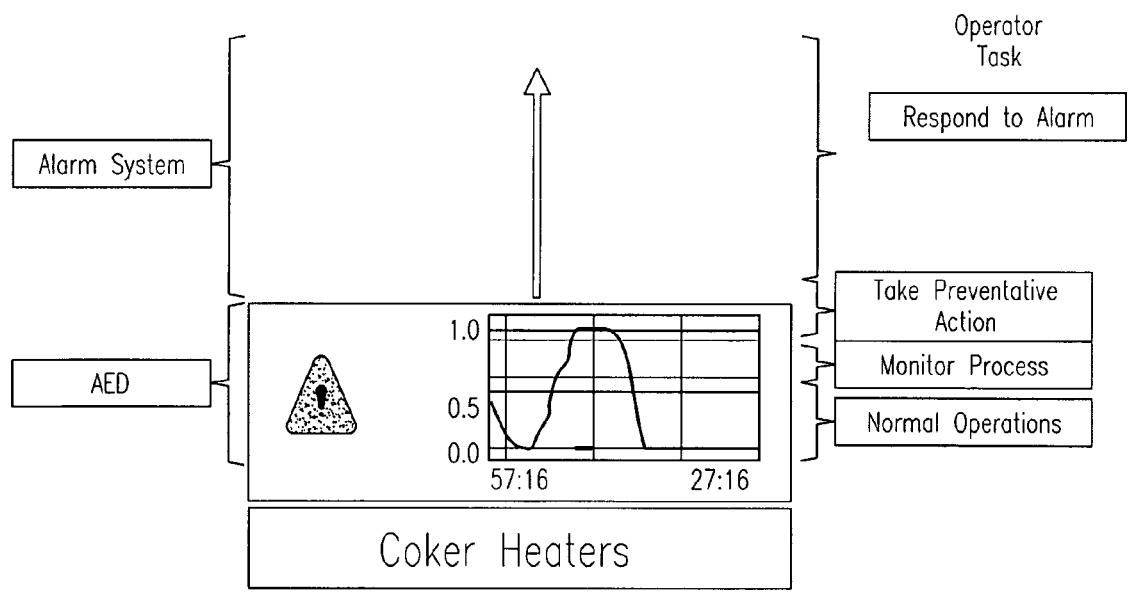
FIG. 26 shows the components of fuzzy logic based continuous abnormality indicator.

FIG. 25 shows the operator interface for the system. The interface consists of the abnormality monitors mentioned above. This was developed to represent the list of important abnormal indications in each operation area. Comparing model results with the state of key sensors generates abnormal indications. Fuzzy logic (described below) is used to aggregate abnormal indications to evaluate a single probability of a problem. Based on specific knowledge about the normal operation of each section, we developed a fuzzy logic network to take the input from sensors and model residuals to evaluate the probability of a problem. FIG. 26 shows the components of the probability indicator.

Figure 27:
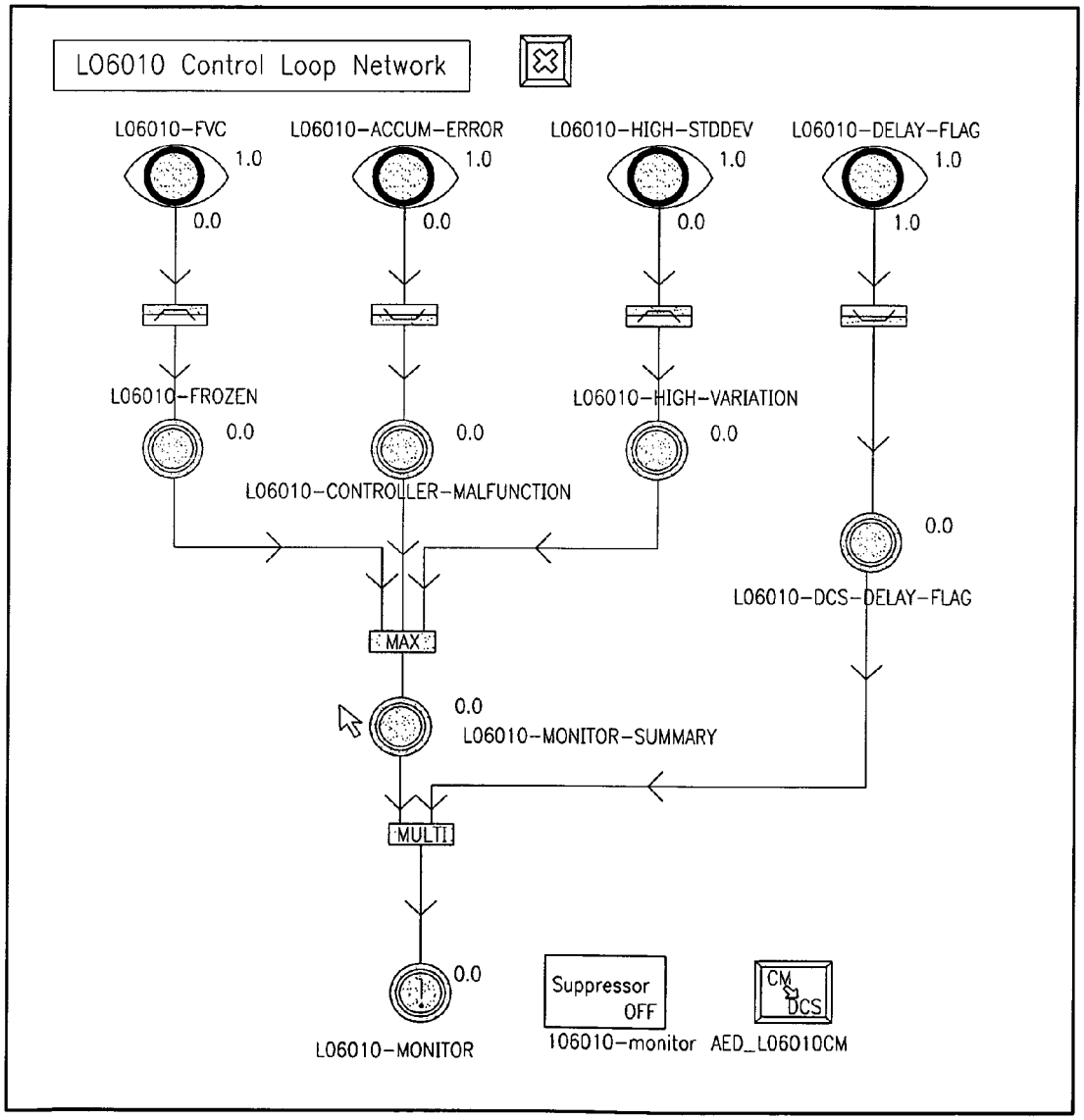
FIG. 27 shows the fuzzy logic network for detecting a level controller monitor problem.

FIG. 27 shows a logic network for a controller monitor. The green nodes show the sub problems that combine together to determine the final certainty of a level controller monitor problem. The estimated probability of an abnormal condition is shown to the operating team in a continuous trend to indicate the condition's progression.

Figure 29:
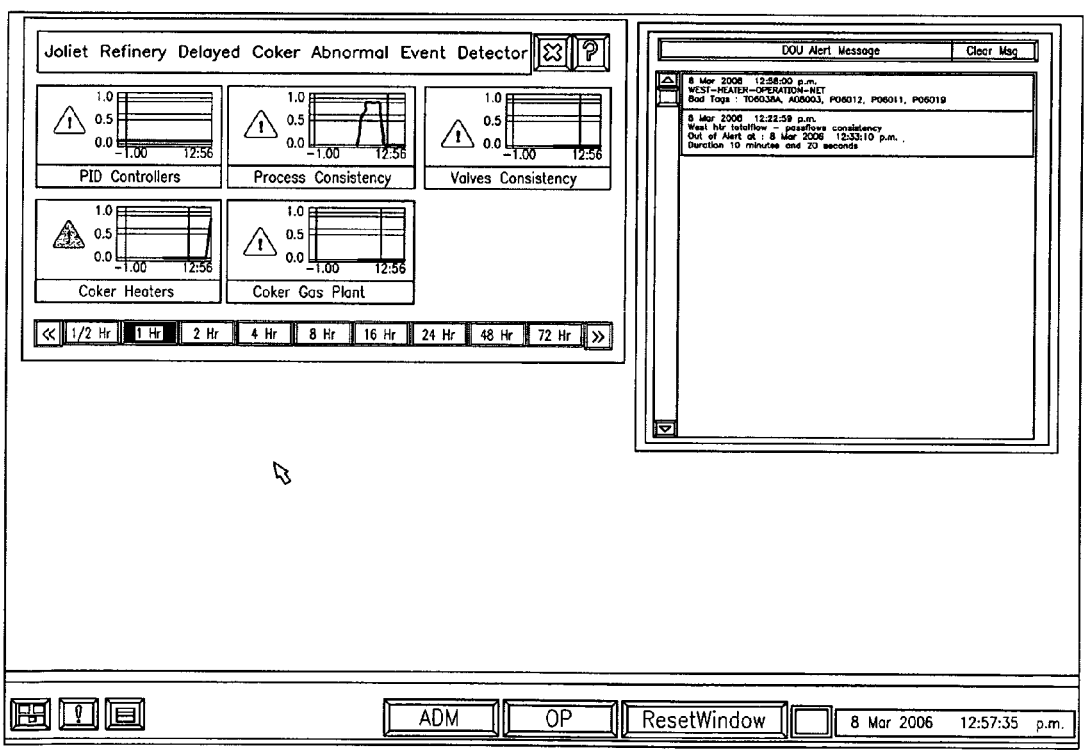
FIG. 29 shows the overview display with a red triangle indicating that the furnace area has a problem. It also shows an alert message log indicating the exact nature of the problem and a list of the worst actors.

FIG. 28 shows the complete drill down of a furnace problem. FIG. 29 shows the operator display of a furnace operation problem along with continuous signal indications for all other problem areas. This display gives the operator a significant advantage to get an overview of the health of the process than having to check the status of each sensor individually. More importantly, it gives the operator 'peace-of-mind'. Due to its extensive coverage, chances of missing any event are remote. So it is also used as a normality-indicator. When the probability of abnormality reaches 0.6, the problem indicator turns yellow (warning) and when the probability reaches 0.9 the indicator turns red (alert).

This invention comprises of Principal Component Analysis (PCA) models to cover the areas of Furnaces (Heaters) and Gas Plant. Each Furnace has its own PCA. The process units in the gas plant can be combined to build a single PCA model or the major gas plant columns can be separated to build multiple PCA models (e.g. absorber, debutanizer). Based on process knowledge, we overlap key sensors that are affected by interacting sections in PCA models. The coverage of the PCA models was determined based on the interactions of the different processing units. In addition there are a number of special concern monitors intended to watch conditions that could escalate into serious events. The objective is to detect the problems early on so that the operator has sufficient lead-time to act.

Under normal operations, the operator executes several routine actions such as fuel gas feed rate changes, decoking operations, cut-down of coker gas to the fluid catalytic cracking unit and set point moves that could produce short-lived high residuals in some sensors in the PCA and other models. Since such notifications are redundant and do not give new information, this invention has mechanism built-in to detect their onset and suppress the notifications. This mechanism is typically a logic network with a set of source conditions, which, when true, will suppress a set of pre-specified models.

Figure 30:
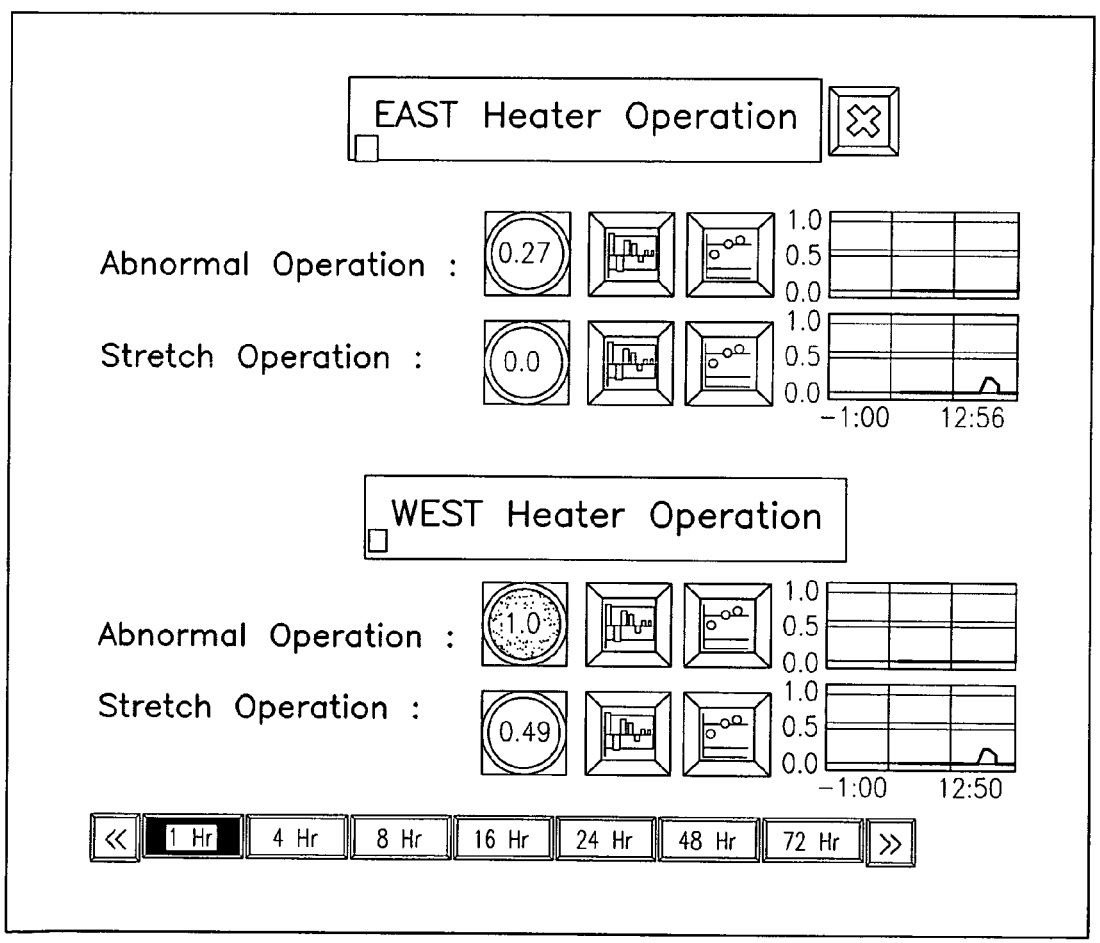
FIG. 30 is a display that is shown to the operator when selecting the red triangle on FIG. 29. This display indicates to the operator the sub-area of the furnace where the problem is most likely occurring.
Figure 31:
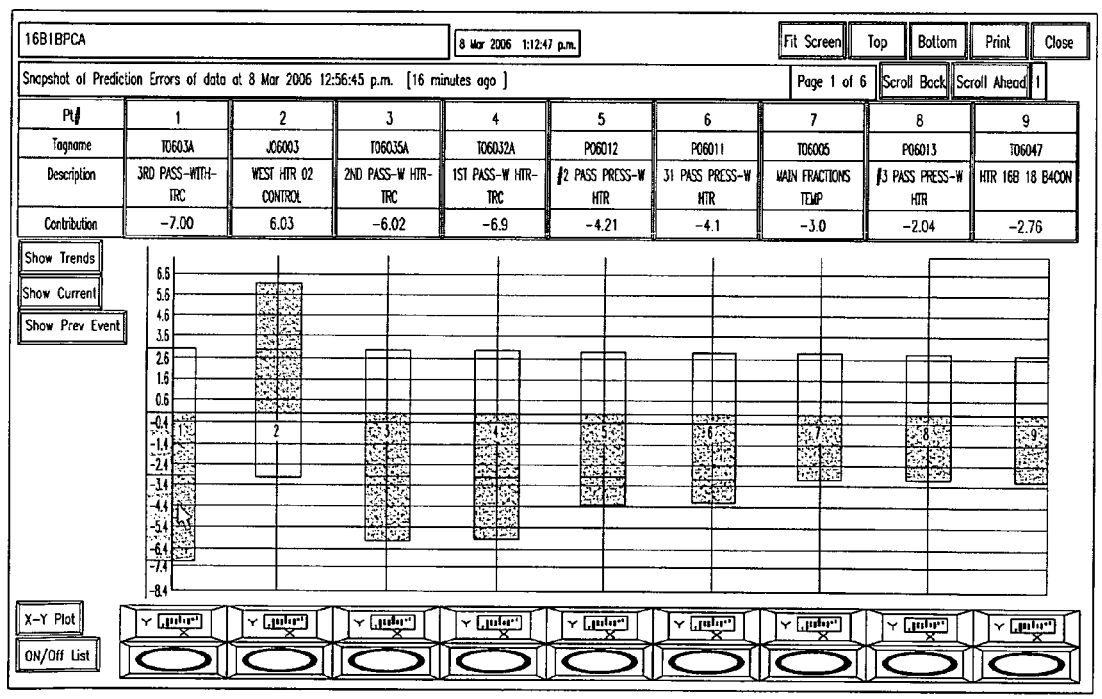
FIG. 31 shows the Pareto chart for the tags involved in the Furnace Abnormal operation scenario in FIG. 30.

The operator is informed of an impending problem through the warning triangles that change color from green to yellow and then to red. The application provides the operator with drill down capability to further investigate the problem by viewing a list of prioritized sub problems. This novel method provides the operator with drill down capabilities to the sub problems. This enables to operator to narrow down the search for the root cause. FIG. 30 shows the result of selecting the red triangle of FIG. 29. It indicates that the West Heater (Furnace) Operation has a problem. This assists the operator in isolating and diagnosing the root cause of the condition so that compensatory or corrective actions can be taken. When the Pareto-chart icon corresponding to the West Heater is selected, a Pareto chart indicating the residual (extent of abnormality) of deviating sensors sorted by their deviations, from worst to best is displayed as shown in FIG. 31.

Figure 32:
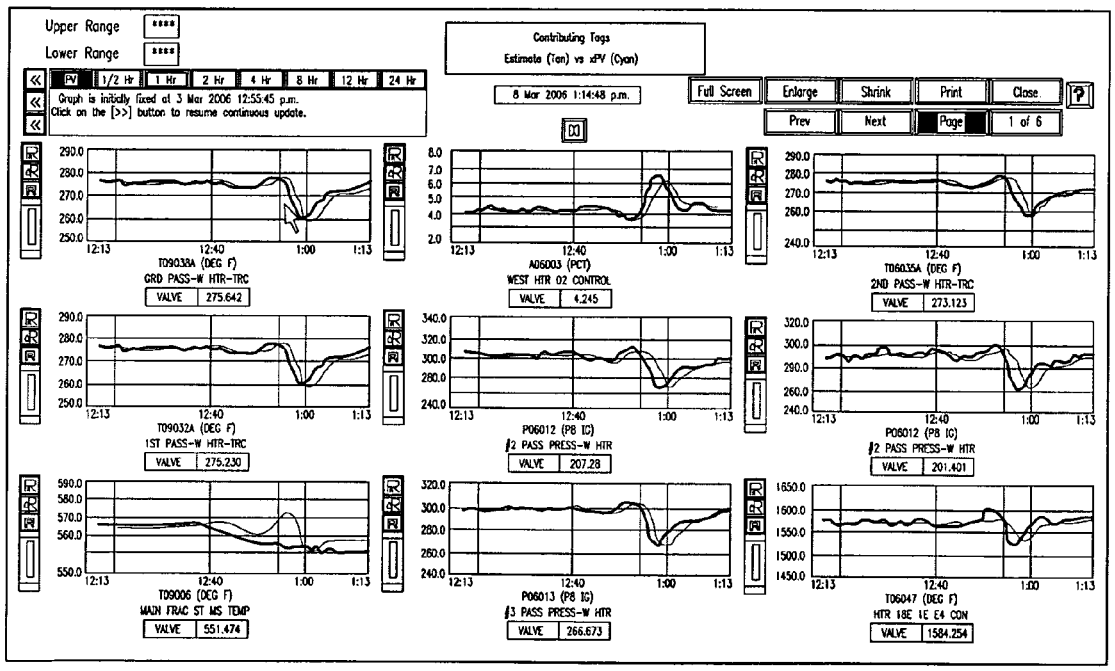
FIG. 32 shows the multi-trends for the tags in FIG. 31. It shows the current tag values and also the model predictions.
Figure 33:
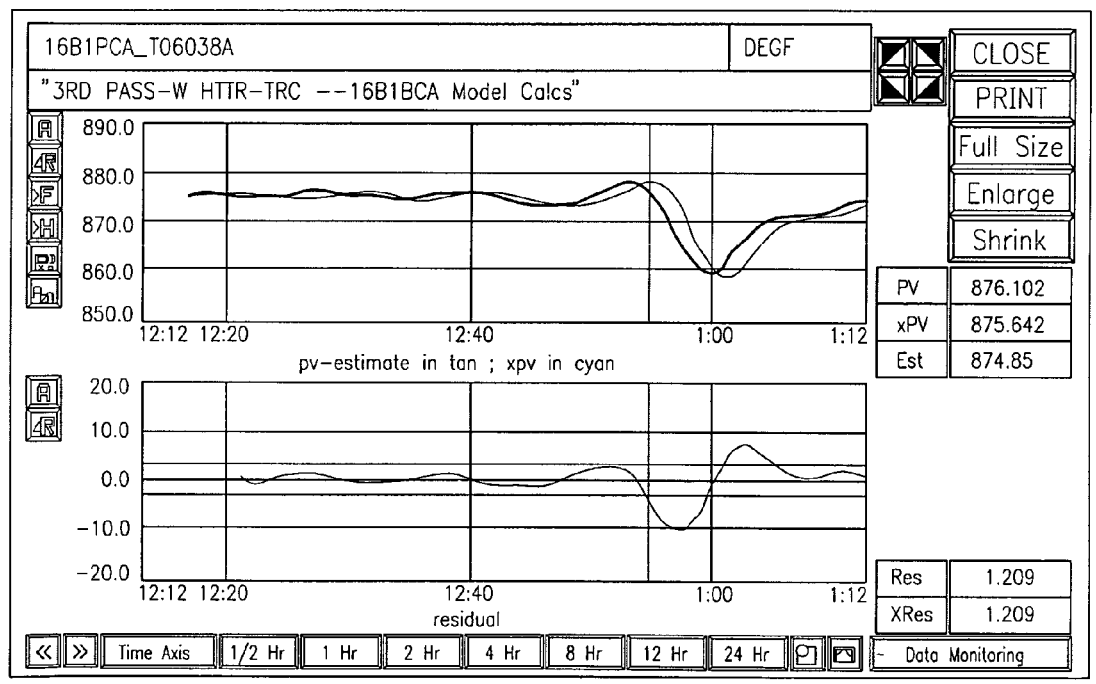
FIG. 33 shows a more detailed trend including the control chart for the worst actor (first bar) shown in the Pareto chart of FIG. 31.
Figure 34:
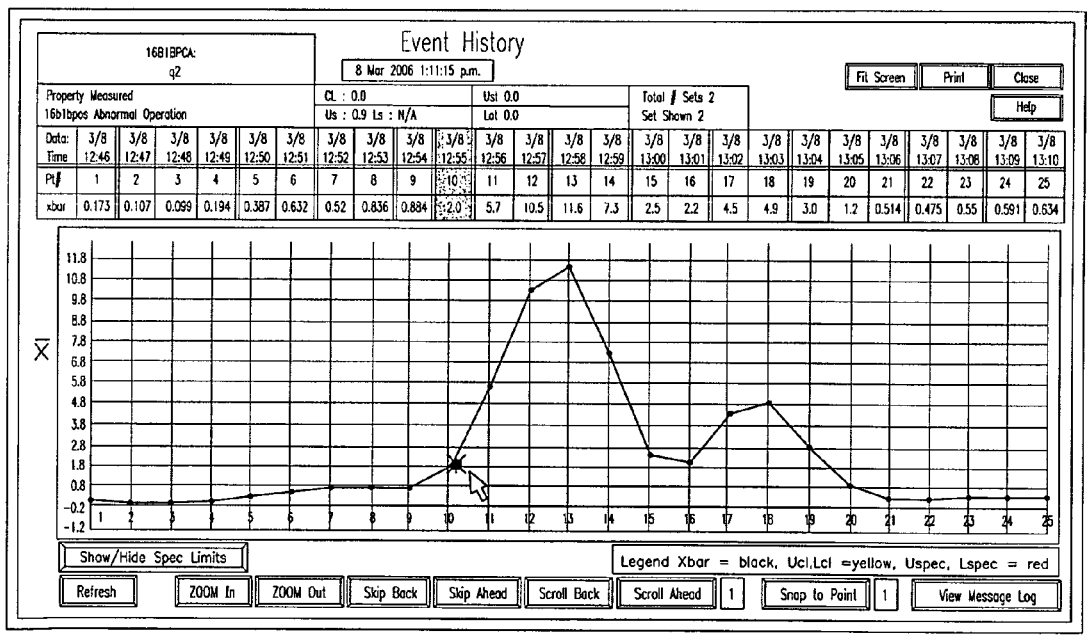
FIG. 34 shows the historical trend of the abnormality of the furnace sub-area. This trend will allow the operator to trace the last several problems and their corresponding drill downs similar to those shown in FIGS. 31 through 33.
Figure 35:
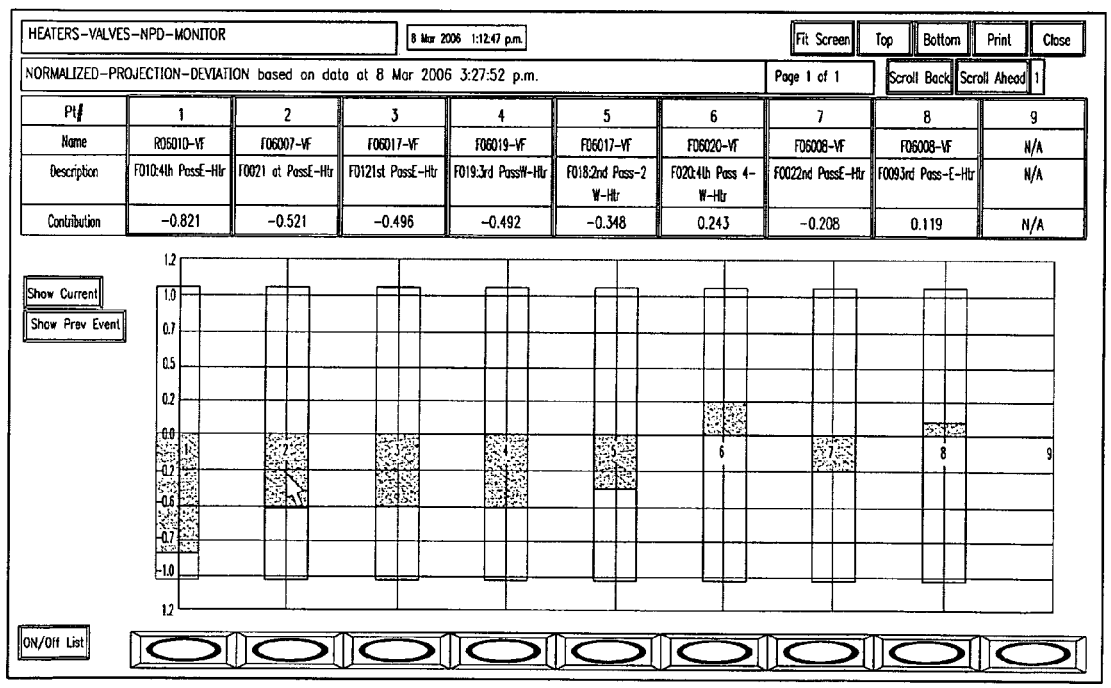
FIG. 35 shows the Pareto chart for the furnace feed valves.

The application uses the Pareto chart approach quite extensively to present information to the operator. The sequence of presentation is in decreasing order of individual deviation from normal operation. This allows a succinct and concise view of the process narrowed down to the few critical bad actors so the console operator can make informed decisions about course of action. FIG. 31 demonstrated this functionality through a list of sensors organized in a Pareto chart. Upon selecting an individual bar, a custom plot showing the tag trend versus model prediction for the sensor is created as shown in FIG. 33. The operator can also look at trends of problem sensors together using the "multi-trend view". For instance, FIG. 32 shows the trends of the value and model predictions of the sensors in the Pareto chart of FIG. 31. FIG. 35 shows the same concept this time applied to the ranking of valve-flow monitors based on the normalized-projection-deviation error. Selecting the bar in this case generates an X-Y scatter plot of FIG. 36 that shows the current operation point in the context of the bounds of normal operation. A history of recent abnormality is also retained. The extent of retention is configurable in the system. FIG. 34 shows the historical trend of the abnormality of the furnace sub-area. This trend will allow the operator to trace the last several problems and their corresponding drill downs similar to those shown in FIGS. 31 through 33. It must be noted that history is retained for the first onset of abnormality as indicated by the red asterisk in FIG. 34, since this is the most relevant snapshot of abnormality.

In addition to the PCA overall monitors, there are a number of special concern monitors built using engineering relationships. These cover critical equipment in the DCU such as the main fractionator accumulator boot. Underlying these monitors are fuzzy-logic networks that generate a single abnormality signal.

In summary, the advantages of this invention include:
1. The decomposition of the entire DCU operation into 3 Operational Areas: Furnaces (Heaters), Main Fractionator, and Gas Plant—for supervision.
2. The operational condition of the entire DCU is summarized into 5 single alerts
3. The PCA models provide model predictions of the 200+ sensors.
4. The abnormal deviations of these 200+ sensors are summarized by the alerts based on the Sum of Square Error of the PCA models
5. Events resulting from special cause/routine operations are suppressed to eliminate the false positives. The enormous dimensionality reduction from 200+ individual tags to a few alert signals significantly cuts down on the false positive rate. The PCA modeling approach inherently resolves the single sensor alarming issue in an elegant manner.
6. The PID Monitors provide a powerful way to monitor level, pressure and other control loops, which effect control actions and thus can be the source of or be affected by process upsets. PID monitors detect four different abnormal process conditions: Frozen process value which is indicative of a faulty instrument or control, highly variant process value, accumulation of significant control error outside a dead band, and process value staying on the same side of the set point for a significant length of time.
7. The Valve-flow models provide a powerful way to monitor flow control loops, which effect control actions and thus can be the source of or be affected by process upsets.
8. The heuristic engineering relationships models provide a simplified way to easily monitor critical engineering relationships between process variables and specific process knowledge acquired over years of operation. An example of this is the relationship between two tray temperatures in the bottom section of the fractionator column to determine if the column is flooding.

B. Development and Deployment of AED Models for a DCU

The application has PCA models, engineering relationship models and heuristics to detect abnormal operation in a DCU. The first steps involve analyzing the concerned unit for historical operational problems. This problem identification step is important to define the scope of the application.

The development of these models is described in general in Appendix 1. Some of the specific concerns around building these models for the DCU are described below.

Problem Identification

The first step in the application development is to identify a significant problem, which will benefit process operations. The abnormal event detection application in general can be applied to two different classes of problems. The first is a generic abnormal event application that monitors an entire process area looking for any abnormal event. This type will use several hundred measurements, but does not require a historical record of any specific abnormal operations. The application will only detect and link an abnormal event to a portion (tags) of the process. Diagnosis of the problem requires the skill of the operator or engineer.

The second type is focused on a specific abnormal operation. This type will provide a specific diagnosis once the abnormality is detected. It typically involves only a small number of measurements (5-20), but requires a historical data record of the event. This model can be a PCA/PLS model or based on simple engineering correlations (e.g. mass/energy-balances, control action and corresponding process changes). This document covers both kinds of applications in order to provide extensive coverage. The operator or the engineer would then rely on their process knowledge/expertise to accurately diagnose the cause. Typically most of the events seem to be primarily the result of problems with the instruments and valves.

When scoping the problem, it is common to get the wrong impression from site personnel that there would not be a sufficient number of abnormal events to justify an abnormal event detection application. In general, an overly low estimate of how frequently abnormal events affect the process occurs because:

Abnormal events are often not recorded and analyzed. Only those that cause significant losses are tracked and analyzed.

Abnormal events are often viewed as part of normal operations since operators deal with them daily.

Unless there is a regularly repeating abnormal event, the application should cover a large enough portion of the process to "see" abnormal events on a regular basis (e.g. More than 5 times each week).

I. PCA Models

The PCA models are the heart of the DCU AED. PCA transforms the actual process variables into a set of 'orthogonal' or independent variables called Principal Components (PC) which are linear combinations of the original variables. It has been observed that the underlying process has a number of degrees of freedom which represent the specific independent effects that influence the process. These different independent effects show up in the process data as process variation. Process variation can be due to intentional changes, such as feed rate changes, or unintentional disturbances, such as ambient temperature variation.

Each principal component captures a unique portion of the process variability caused by these different independent influences on the process. The principal components are extracted in the order of decreasing process variation. Each subsequent principal component captures a smaller portion of the total process variability. The major principal components should represent significant underlying sources of process variation. As an example, the first principal component often represents the effect of feed rate changes since this is usually the largest single source of process changes.

The application is based on a Principal Component Analysis, PCA, of the process, which creates an empirical model of "normal operations". The process of building PCA models is described in detail in the section "Developing PCA Models for AED" in Appendix 1. The following will discuss the special considerations that are necessary to apply PCA toward creating an abnormal event detection application for a DCU.

DCU PCA Model Development

The application has PCA models covering the furnaces area (HEATER-PCA) and light ends towers (GASPLANT-PCA). This allows extensive coverage of the overall DCU operation and early alerts.

The PCA model development comprises of the following steps:
1) Input Data and Operating Range Selection
2) Historical data collection and pre-processing
3) Data and Process Analysis 4) Initial model creation
5) Model Testing and Tuning
6) Model Deployment The general principles involved in building PCA models are described in the subsection I "Conceptual PCA Model Design" under section "Developing PCA Models for AED" in Appendix 1 These steps constitute the primary effort in model development. Since PCA models are data-driven, good quality and quantity of training data representing normal operations is very crucial. The basic development strategy is to start with a very rough model, then to successively improve that model's fidelity. This requires observing how the model compares to the actual process operations and re-training the model based on these observations. The steps are briefly described next.

Input Data and Operating Range Selection

As the list of tags in the PCA model dictates coverage, we start with a comprehensive list of all the tags in the concerned areas. The process of selecting measurements and variables is outlined in subsection II "Input Data and Operating Range Selection" under the section "Developing PCA Models for AED" in Appendix 1. Any measurements that were known to be unreliable or exhibit erratic behavior should be removed from the list. Additional measurement reduction is performed using an iterative procedure once the initial PCA model is obtained.

Historical Data Collection and Pre-Processing

Developing a good model of normal operations requires a training data set of normal operations. This data set should:

Span the normal operating range
Only include normal operating data

Because it is very rare to have a complete record of the abnormal event history at a site, historical data can only be used as a starting point for creating the training data set. Operating records such as Operator logs, Operator Change Journals, Alarm Journals, Instrument Maintenance records provide a partial record of the abnormal process history. The process of data collection is elaborated upon in subsection III "Historical Data collection" under the section "Developing PCA Models for AED" in Appendix I.

In the case of the DCU, the historical data spanned 1.5 years of operation to cover both summer and winter periods. With one-minute averaged data, the number of time stamped values turns out to be around 750,000+ for each tag. In order to make the data-set more manageable while still retaining underlying information, engineering judgment was applied and every 3rd point was retained resulting in about 250,000+ points for each sensor. This allowed the representative behavior to be captured by the PCA models.

Basic statistics such as average, min/max and standard deviation are calculated for all the tags to determine the extent of variation/information contained within. Also, operating logs were examined to remove data contained within windows with known unit shutdowns or abnormal operations. Each candidate measurement was scrutinized to determine appropriateness for inclusion in the training data set.

Creating Balanced Training Data Set

Using the operating logs, the historical data is divided into periods with known abnormal operations and periods with no identified abnormal operations. The data with no identified abnormal operations will be the preliminary training data set used for model development.

Once these exclusions have been made the first rough PCA model can be built. Since this is going to be a very rough model the exact number of principal components (PCs) to be retained is not important. This should be no more than 5% of the number measurements included in the model. The number of PCs should ultimately match the number of degrees of freedom in the process, however this is not usually known since this includes all the different sources of process disturbances. There are several standard methods for determining how many principal components to include. Also at this stage the statistical approach to variable scaling should be used: scale all variables to unit variance.

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data. The process of creating balanced training data sets using data and process analysis is outlined in Section IV "Data & Process Analysis" under the section "Developing PCA Models for AED" in Appendix 1.

Initial Model Creation

The model development strategy is to start with a very rough model (the consequence of a questionable training data set) then use the model to gather a high quality training data set. This data is then used to improve the model, which is then used to continue to gather better quality training data. This process is repeated until the model is satisfactory.

Figure 39:
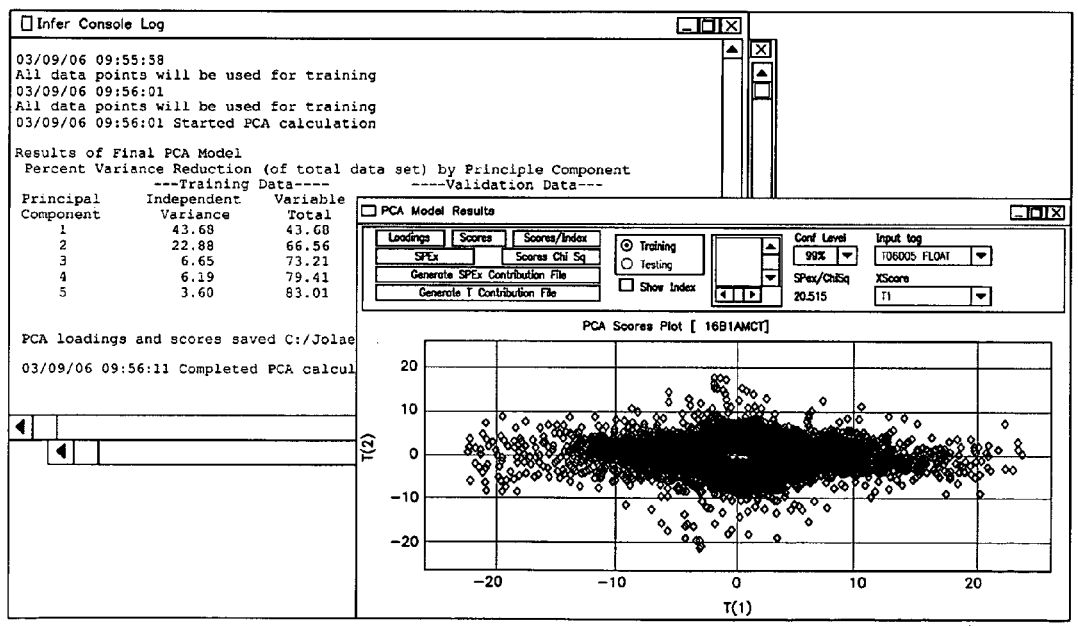
FIG. 39 shows the distribution of principal components during PCA model development.

Once the specific measurements have been selected and the training data set has been built, the model can be built quickly using standard statistical tools. An example of such a program showing the percent variance captured by each principal component is shown in FIG. 39.

The model building process is described in Section V "Model Creation" under the section "Developing PCA Models for AED" in Appendix 1.

Model Testing and Tuning

Once the initial model has been created, it needs to be enhanced by creating a new training data set. This is done by using the model to monitor the process. Once the model indicates a potential abnormal situation, the engineer should investigate and classify the process situation. The engineer will find three different situations, either some special process operation is occurring, an actual abnormal situation is occurring, or the process is normal and it is a false indication.

The process data will not have a Gaussian or normal distribution. Consequently, the standard statistical method of setting the trigger for detecting an abnormal event from the variability of the residual error should not be used. Instead the trigger point needs to be set empirically based on experience with using the model. Section VI "Model Testing & Tuning" under the section "Developing PCA Models for AED" in Appendix 1 describes the Model testing and enhancement procedure.

DCU PCA Model Deployment

Successful deployment of AED on a process unit requires a combination of accurate models, a well designed user interface and proper trigger points. The detailed procedure of deploying PCA model is described under "Deploying PCA Models and Simple Engineering Models for AED" in Appendix 1.

Over time, the developer or site engineer may determine that it is necessary to improve one of the models. Either the process conditions have changed or the model is providing a false indication. In this event, the training data set could be augmented with additional process data and improved model coefficients could be obtained. The trigger points can be recalculated using the same rules of thumb mentioned previously.

Old data that no longer adequately represents process operations should be removed from the training data set. If a particular type of operation is no longer being done, all data from that operation should be removed. After a major process modification, the training data and AED model may need to be rebuilt from scratch.

Figure 24:
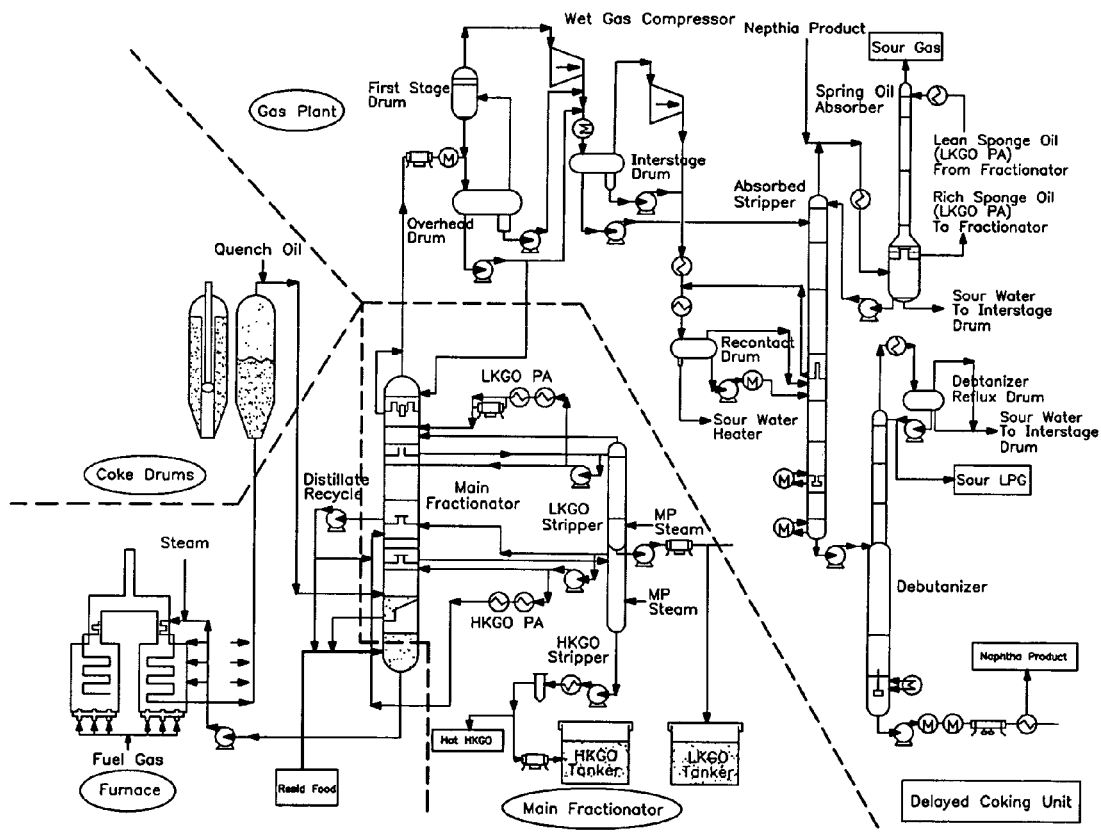
FIG. 24 shows the typical overall schematic of DCU and the light ends towers displayed for monitoring and control at the operator console.

The DCU PCA model started with an initial set of about 600 tags, which was then refined to about 300 tags. The Heater-PCA models include about 60 tags each. The Gas Plant-PCA model includes about 100 tags and covers the sections downstream of the main fractionator involved in the recovery—compressors, absorber and debutanizer (FIG. 24). The details of the Heater-PCA models are shown in Appendix 2A and the Gas Plant-PCA model is described in Appendix 2B.

II. AED Engineering Models

DCU Engineering Models Development

The engineering models comprise of correlation-based models focused on specific detection of abnormal conditions. The detailed description of building engineering models can be found under "Simple Engineering Models for AED" section in Appendix 1.

The engineering model requirements for the DCU application were determined by: performing an engineering evaluation of historical process data and interviews with console operators and equipment specialists. The engineering evaluation included areas of critical concern and worst case scenarios for DCU operation. To address the conclusions from the engineering assessment, the following engineering models were developed for the DCU AED application:

Critical Level and Pressure PID Control Loops Monitor
Process Consistency Monitors
  1. Heater Pass Flow Material Balance Monitor
  2. Main Fractionator Flooding Monitor
  3. Main Fractionator Overhead Accumulator to Flare Monitor
  4. Debutanizer Bottoms Flooding Monitor
  5. Main Fractionator Overhead Accumulator Temperature Monitor
  6. Cat Slurry Oil and Steam Flow Monitor
Flow-Valve Position Consistency Monitor The DCU has about 20 critical level and pressure control loops. These PID control loops are monitored to detect four different abnormal process conditions: Frozen process value which is indicative of a faulty instrument or control, highly variant process value, accumulation of significant control error outside a dead band, and process value staying on the same side of the set point for a significant length of time. The tuning parameters and thresholds for detecting these four conditions are set based on historical and statistical analysis of normal operations for a period of at least 3 months. Details of these control loops are provided in Appendix 3A.

Process Consistency Monitors are checks that the console operator would otherwise perform based on years of process experience. The console operator knowledge, along with thresholds and tuning parameters are captured in these consistency checks. In the initial implementation 6 such checks have been included. Details follow and are also provided in Appendix 3B.

The Heater Pass Flow Material Balance Monitor sums the individual pass flows (for example, sum of four flows in a furnace containing four passes) and compares it to the total pass flow meter. If these are inconsistent it is more than likely that at least one of the flow meters is erroneous.

Main Fractionator Flooding Monitor monitors temperatures of two trays, in the flash zone and the bottom of the column, that are close to each other. If these temperatures are sufficiently close then that is indicative of flooding.

Main Fractionator Overhead Accumulator to Flare Monitor monitors the consistency between two pressures in the overhead vapor line, one is the flare line pressure, and the other is the pressure in the compressor line. Inconsistency between these two could result in an undesirable hydrocarbon release.

Debutanizer Bottoms Flooding Monitor monitors the difference between the debutanizer bottoms and the reboiler inlet temperatures. If this difference is less than a specific threshold while the debutanizer bottoms temperature is greater than a specified maximum, then that is indicative of flooding.

Main Fractionator Overhead Accumulator Temperature Monitor monitors two temperatures in the overhead vapor line, with one of them used to control the fractionator reflux flow. Inconsistency between these temperatures could result undesirable fractionation in the column.

Cat Slurry Oil (CSO) and Steam Flow Monitor monitors the sum of the CSO and velocity steam flows. If there is no flow in this line, then it is possible to plug the line. This will result in improper plugging of the drum at the beginning of the coking cycle, which in turn can affect the type of coke produced and the cutting of coke.

Figure 36:
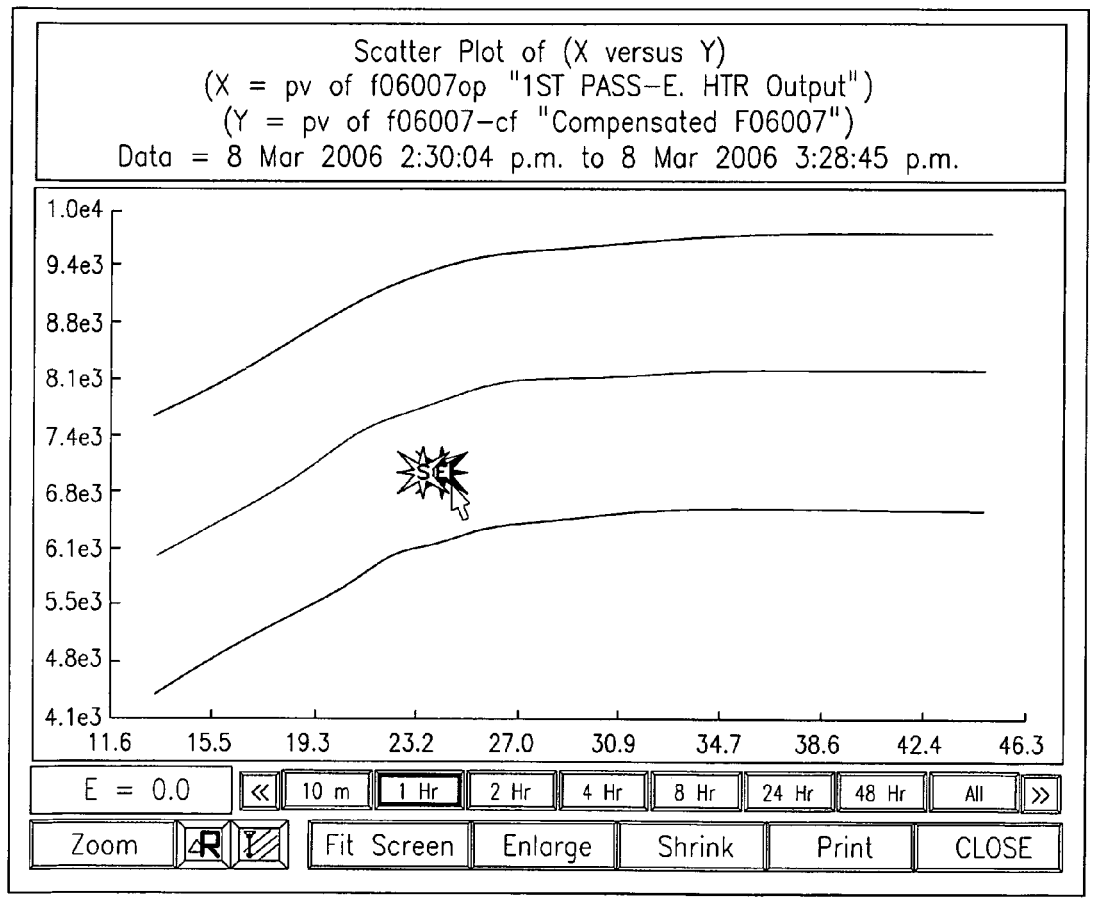
FIG. 36 shows the X-Y plot for one of the furnace feed valves. This is displayed when the operator selects one of the valve bars from the Pareto chart in FIG. 35.

The Flow-Valve position consistency monitor was derived from a comparison of the measured flow (compensated for the pressure drop across the valve) with a model estimate of the flow. These are powerful checks as the condition of the control loops are being directly monitored in the process. The model estimate of the flow is obtained from historical data by fitting coefficients to the valve curve equation (assumed to be either linear or parabolic). In the initial application, 22 flow/valve position consistency models were developed. An example is shown in FIG. 36 for a heater feed valve. This valve is crucial in maintaining the corresponding pass temperature to avoid any tube coking. If allowed to develop, tube coking could bring the entire unit down and can result in several million dollars of production losses. The details of the valve flow models are given in Appendix 3C. A time-varying drift term was added to the model estimate to compensate for long term sensor drift. The operator can also request a reset of the drift term after a sensor recalibration or when a manual bypass valve has been opened or closed. This modification to the flow estimator significantly improved the robustness for implementation within an online detection algorithm.

Figure 37:
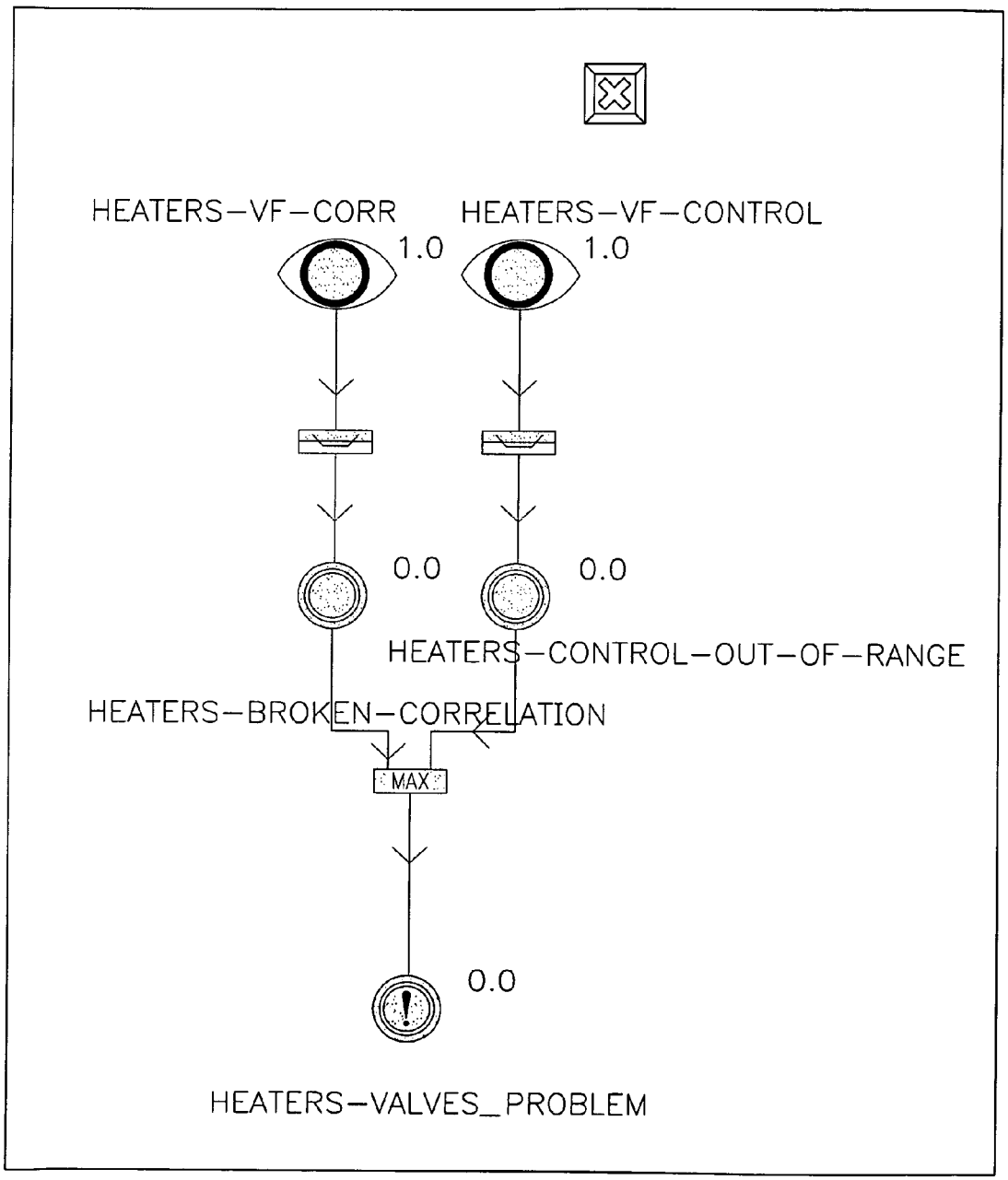
FIG. 37 shows the furnace Valve Flow Monitor fuzzy network
Figure 38:
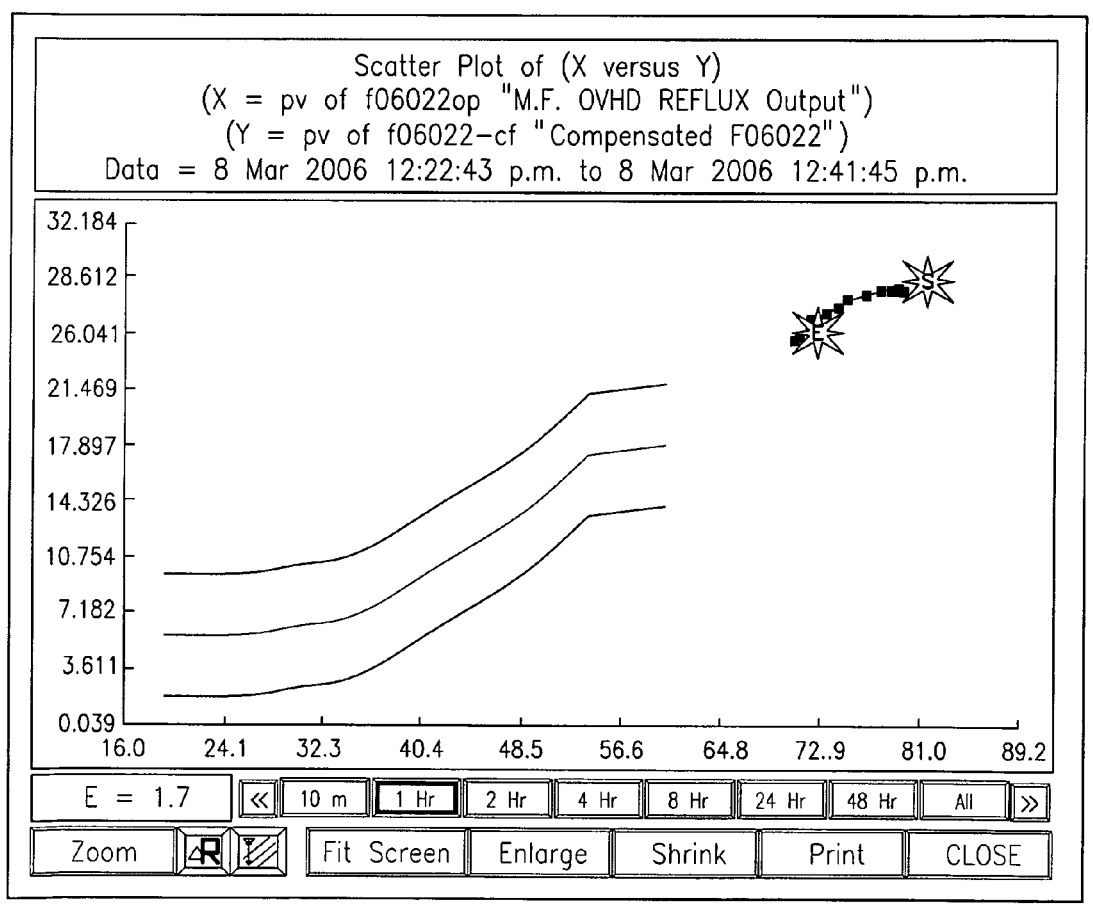
FIG. 38 shows an example of valve out of controllable range.

In addition to the valve-flow model mismatch, there is an additional check to notify the operator in the event that a control valve is beyond controllable range using value-exceedance. FIG. 37 shows both the components of the fuzzy net and an example of value-exceedance is shown in FIG. 38.

DCU Engineering Model Deployment

The procedure for implementing the engineering models within AED is straightforward. For the models which identify specific known types of behavior within the unit (e.g. Main Fractionator Flooding) the trigger points for notification were determined from the statistical analysis of historical data in combination with console operator input. For the computational models (e.g. flow/valve position models), the trigger points for notification were initially derived from the standard deviation of the model residual. For the first several months of operation, known AED indications were reviewed with the operator to ensure that the trigger points were appropriate and modified as necessary. Section "Deploying PCA Models and Simple Engineering Models for AED" in Appendix 1 describes details of engineering model deployment.

Under certain circumstances, the valve/flow diagnostics could provide the operator with redundant notification. Model suppression was applied to the valve/flow diagnostics to provide the operator with a single alert to a problem with a valve/flow pair. For instance, unless the sum of pass flows do not match with the total flow measurement into a heater within a pre-specified tolerance, the pass flow valves will not be activated.

C. AED Additional Tools

In order to facilitate smooth daily AED operation, various tools are provided to help maintain AED models and accommodate real concerns.

Event suppression/Tags Disabling

Figure 40:
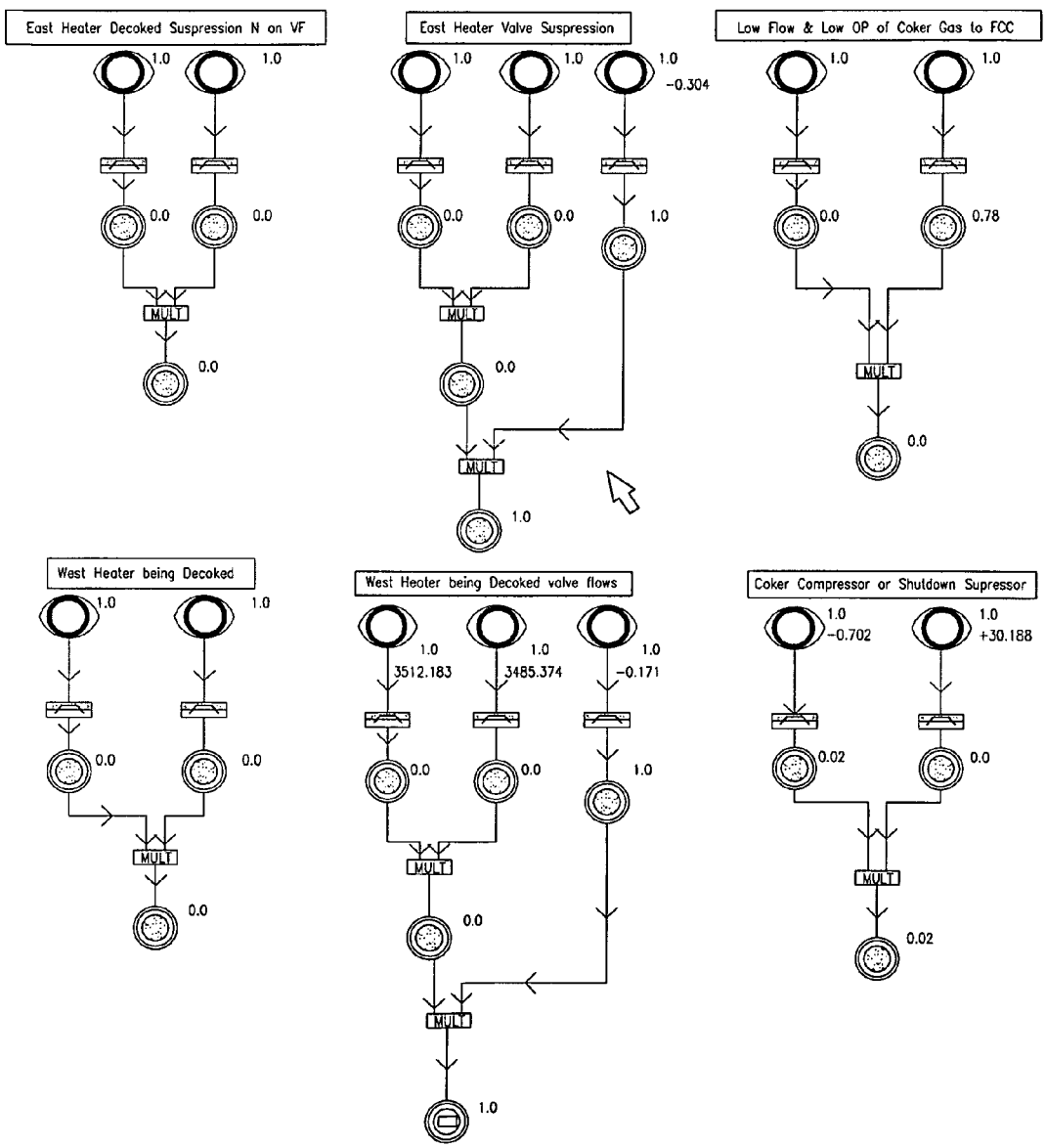
FIG. 40 shows the Alert Suppression networks used to suppress alerts during known events.

The operator typically makes many moves (e.g., set point changes, tags under maintenance, decokes etc.) and other process changes in routine daily operations. In order to suppress such known events beforehand, the system provides for event suppression. Whenever set point moves are implemented, the step changes in the corresponding PV and related tags might generate notifications. In practice if the AED models are not already aware of such changes, the result can be an abnormality signal. To suppress this, fuzzy net uses the condition check and the list of models to be suppressed as shown in FIG. 40. In other situations, tags in PCA models, valve flow models and fuzzy nets can be temporarily disabled for specified time periods by the operator and reactivated using a condition-based algorithm. Also, in such cases, a configurable automatic reactivation time of 12 hours is used to prevent operators from forgetting to reactivate.

Alternative Solutions May be Better—Corrective Actions for Repeated Events

If a particular repeating problem has been identified, the developer should confirm that there is not a better way to solve the problem. In particular the developer should make the following checks before trying to build an abnormal event detection application.

Can the problem be permanently fixed? Often a problem exists because site personnel have not had sufficient time to investigate and permanently solve the problem. Once the attention of the organization is focused on the problem, a permanent solution is often found. This is the best approach.

Can the problem be directly measured? A more reliable way to detect a problem is to install sensors that can directly measure the problem in the process. This can also be used to prevent the problem through a process control application. This is the second best approach.

Can an inferential measurement be developed which will measure the approach to the abnormal operation? Inferential measurements are very close relatives to PCA abnormal event models. If the data exists which can be used to reliably measure the approach to the problem condition (e.g. tower flooding using delta pressure), this can then be used to not only detect when the condition exists but also as the base for a control application to prevent the condition from occurring. This is the third best approach.

Abnormal Event Detection Applications do not Replace the Alarm System

Whenever a process problem occurs quickly, the alarm system will identify the problem as quickly as an abnormal event detection application. The sequence of events (e.g. The order in which measurements become unusual) may be more useful than the order of the alarms for helping the operator diagnose the cause. This possibility should be investigated once the application is on-line.

However, abnormal event detection applications can give the operator advanced warning when abnormal events develop slowly (longer than 15 minutes). These applications are sensitive to a change in the pattern of the process data rather than requiring a large excursion by a single variable. Consequently alarms can be avoided. If the alarm system has been configured to alert the operator when the process moves away from a small operating region (not true safety alarms), this application may be able to replace these alarms.

In addition to just detecting the presence of an abnormal event the AED system also isolates the deviant sensors for the operator to investigate the event. This is a crucial advantage considering that modern plants have thousands of sensors and it is humanly infeasible to monitor them all online. The AED system can thus be thought of as another powerful addition to the operator toolkit to deal with abnormal situations efficiently and effectively.

APPENDIX 1

Events and disturbances of various magnitudes are constantly affecting process operations. Most of the time these events and disturbances are handled by the process control system. However, the operator is required to make an unplanned intervention in the process operations whenever the process control system cannot adequately handle the process event. We define this situation as an abnormal operation and the cause defined as an abnormal event.

A methodology and system has been developed to create and to deploy on-line, sets of models, which are used to detect abnormal operations and help the operator isolate the location of the root cause. In a preferred embodiment, the models employ principal component analysis (PCA). These sets of models are composed of both simple models that represent known engineering relationships and principal component analysis (PCA) models that represent normal data patterns that exist within historical databases. The results from these many model calculations are combined into a small number of summary time trends that allow the process operator to easily monitor whether the process is entering an abnormal operation.

Figure 1:
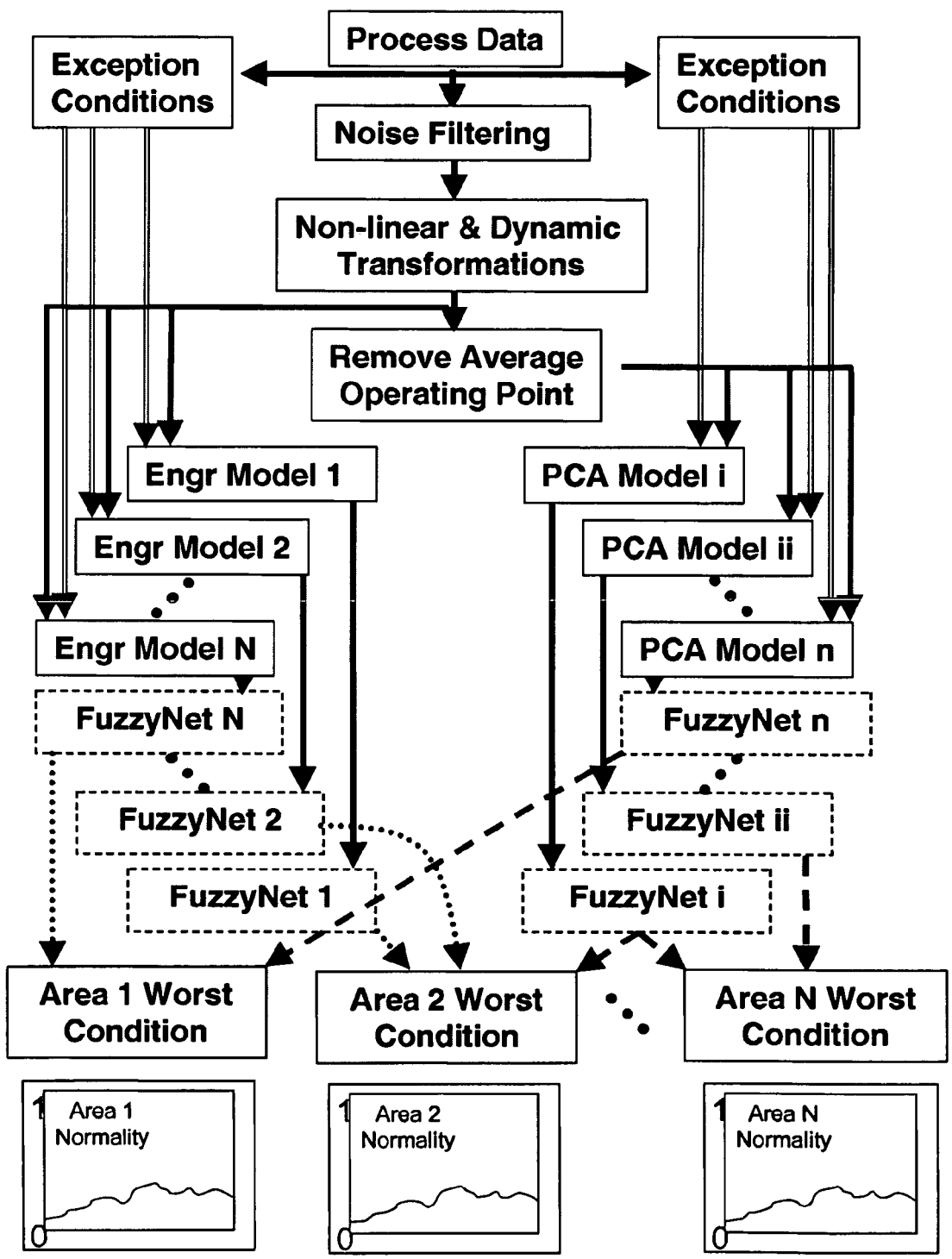
FIG. 1 shows how the information in the online system flows through the various transformations, model calculations, fuzzy Petri nets and consolidation to arrive at a summary trend which indicates the normality/abnormality of the process areas.

FIG. 1 shows how the information in the online system flows through the various transformations, model calculations, fuzzy Petri nets and consolidations to arrive at a summary trend which indicates the normality/abnormality of the process areas. The heart of this system is the various models used to monitor the normality of the process operations.

The PCA models described in this invention are intended to broadly monitor continuous refining and chemical processes and to rapidly detect developing equipment and process problems. The intent is to provide blanket monitoring of all the process equipment and process operations under the span of responsibility of a particular console operator post. This can involve many major refining or chemical process operating units (e.g. distillation towers, reactors, compressors, heat exchange trains, etc.), which have hundreds to thousands of process measurements. The monitoring is designed to detect problems which develop on a minutes to hours timescale, as opposed to long term performance degradation. The process and equipment problems do not need to be specified beforehand. This is in contrast to the use of PCA models cited in the literature which are structured to detect a specific important process problem and to cover a much smaller portion of the process operations.

To accomplish this objective, the method for PCA model development and deployment includes a number of novel extensions required for their application to continuous refining and chemical processes including:

criteria for establishing the equipment scope of the PCA models criteria and methods for selecting, analyzing, and transforming measurement inputs developing of multivariate statistical models based on a variation of principal component models, PCA developing models based on simple engineering relationships restructuring the associated statistical indices preprocessing the on-line data to provide exception calculations and continuous on-line model updating using fuzzy Petri nets to interpret model indices as normal or abnormal using fuzzy Petri nets to combine multiple model outputs into a single continuous summary indication of normality/abnormality for a process area design of operator interactions with the models and fuzzy Petri nets to reflect operations and maintenance activities These extensions are necessary to handle the characteristics of continuous refining and chemical plant operations and the corresponding data characteristics so that PCA and simple engineering models can be used effectively. These extensions provide the advantage of preventing many of the Type I and Type II errors and quicker indications of abnormal events.

This section will not provide a general background to PCA. For that, readers should refer to a standard textbook such as E. Jackson's "*A User's Guide to Principal Component Analysis*" (2)

The classical PCA technique makes the following statistical assumptions all of which are violated to some degree by the data generated from normal continuous refining and chemical plant process operations:

1. The process is stationary—its mean and variance are constant over time.
2. The cross correlation among variables is linear over the range of normal process operations
3. Process noise random variables are mutually independent.
4. The covariance matrix of the process variables is not degenerate (i.e. positive semi-definite).
5. The data are scaled "appropriately" (the standard statistical approach being to scale to unit variance).
6. There are no (uncompensated) process dynamics (a standard partial compensation for this being the inclusion of lag variables in the model)
7. All variables have some degree of cross correlation.
8. The data have a multivariate normal distribution Consequently, in the selection, analysis and transformation of inputs and the subsequent in building the PCA model, various adjustments are made to evaluate and compensate for the degree of violation.

Once these PCA models are deployed on-line the model calculations require specific exception processing to remove the effect of known operation and maintenance activities, to disable failed or "bad acting" inputs, to allow the operator observe and acknowledge the propagation of an event through the process and to automatically restore the calculations once the process has returned to normal.

Use of PCA models is supplemented by simple redundancy checks that are based on known engineering relationships that must be true during normal operations. These can be as simple as checking physically redundant measurements, or as complex as material and engineering balances.

The simplest form of redundancy checks are simple 2×2 checks, e.g.

temperature 1=temperature 2 flow 1=valve characteristic curve 1 (valve 1 position)

material flow into process unit 1=material flow out of process unit 1

Figure 2:
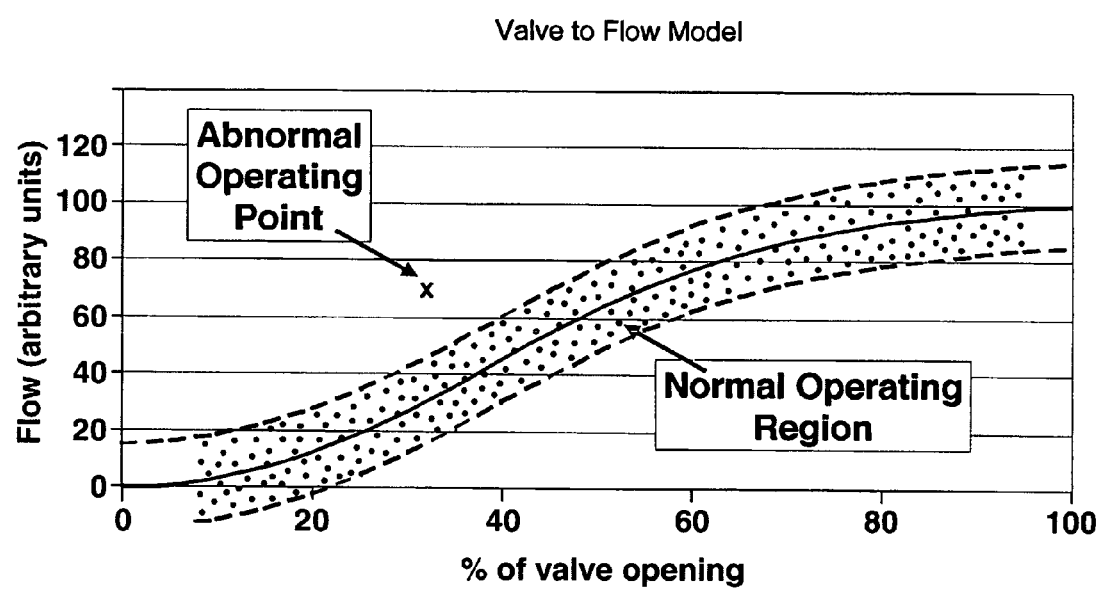
FIG. 2 shows a valve flow plot to the operator as a simple x-y plot.

These are shown to the operator as simple x-y plots, such as the valve flow plot in FIG. 2. Each plot has an area of normal operations, shown on this plot by the gray area. Operations outside this area are signaled as abnormal.

Multiple redundancy can also be checked through a single multidimensional model. Examples of multidimensional redundancy are:

pressure 1=pressure 2= . . . =pressure n material flow into process unit 1=material flow out of process unit 1= . . . =material flow into process unit 2

Figure 3:
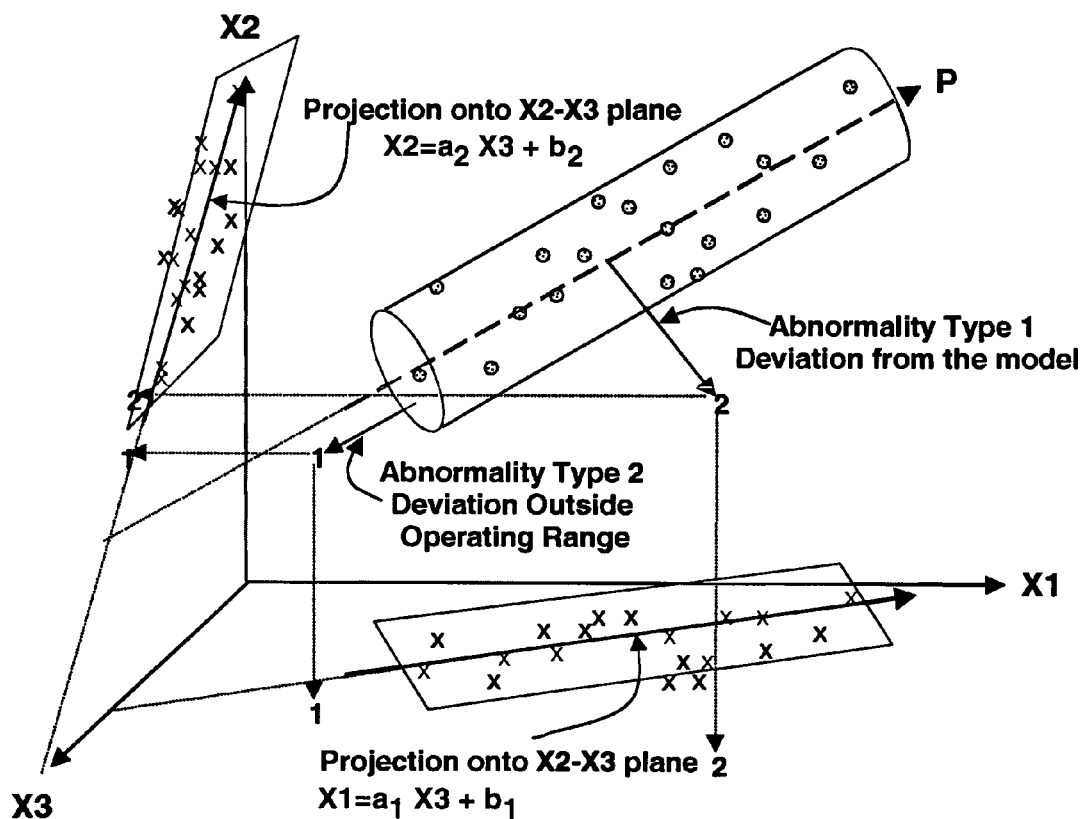
FIG. 3 shows three-dimensional redundancy expressed as a PCA model.

Multidimensional checks are represented with "PCA like" models. In FIG. 3, there are three independent and redundant measures, X1, X2, and X3. Whenever X3 changes by one, X1 changes by $a_{13}$ and X2 changes by $a_{23}$. This set of relationships is expressed as a PCA model with a single principal component direction, P. This type of model is presented to the operator in a manner similar to the broad PCA models. As with the two dimensional redundancy checks the gray area shows the area of normal operations. The principal component loadings of P are directly calculated from the engineering equations, not in the traditional manner of determining P from the direction of greatest variability.

Figure 4:
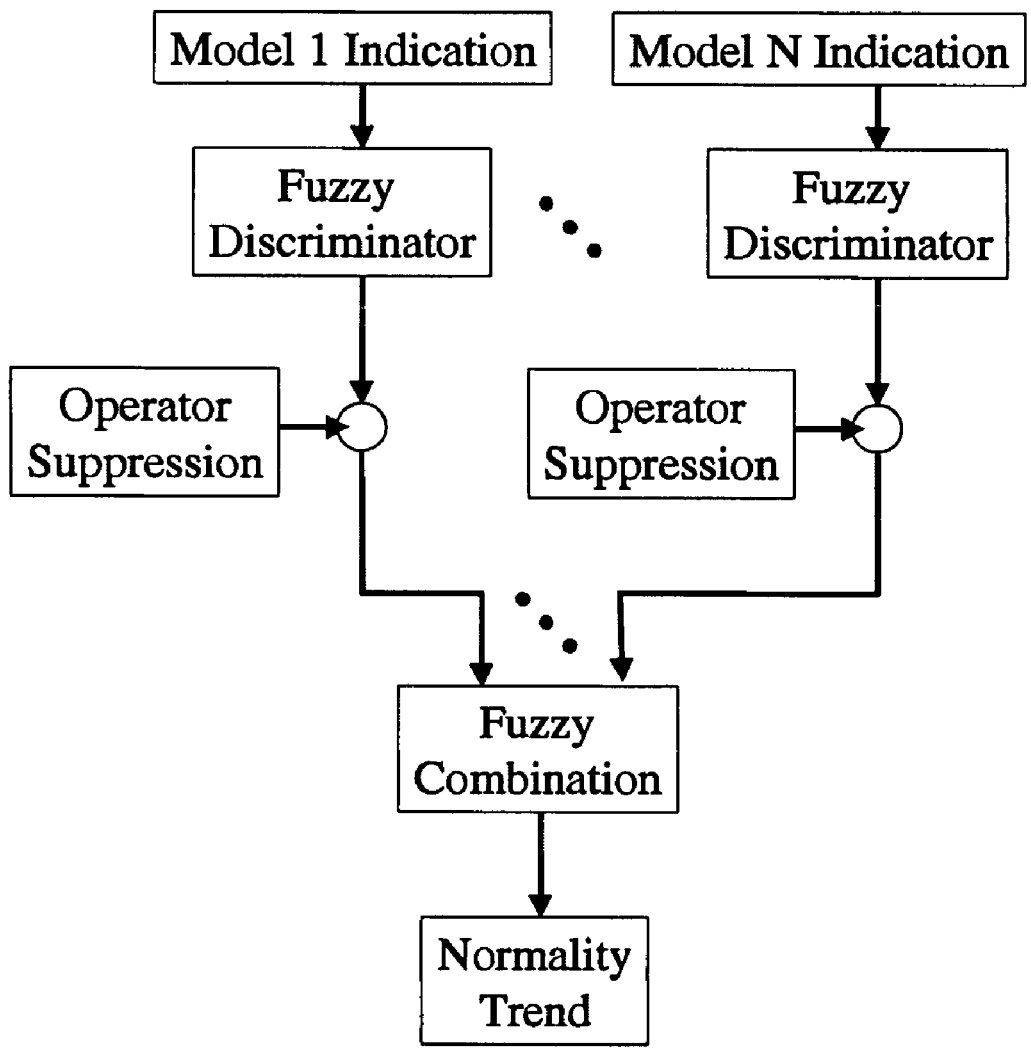
FIG. 4 shows a schematic diagram of a fuzzy network setup.

The characteristics of the process operation require exception operations to keep these relationships accurate over the normal range of process operations and normal field equipment changes and maintenance activities. Examples of Exception Operations are:

opening of bypass valves around flow meters compensating for upstream/downstream pressure changes recalibration of field measurements redirecting process flows based on operating modes The PCA models and the engineering redundancy checks are combined using fuzzy Petri nets to provide the process operator with a continuous summary indication of the normality of the process operations under his control (FIG. 4).

Multiple statistical indices are created from each PCA model so that the indices correspond to the configuration and hierarchy of the process equipment that the process operator handles. The sensitivity of the traditional sum of Squared Prediction Error, SPE, index is improved by creating subset indices, which only contain the contribution to the SPE index for the inputs which come from designated portions of the complete process area covered by the PCA model. Each statistical index from the PCA models is fed into a fuzzy Petri net to convert the index into a zero to one scale, which continuously indicates the range from normal operation (value of zero) to abnormal operation (value of one).

Each redundancy check is also converted to a continuous normal—abnormal indication using fuzzy nets. There are two different indices used for these models to indicate abnormality; deviation from the model and deviation outside the operating range (shown on FIG. 3). These deviations are equivalent to the sum of the square of the error and the Hotelling T square indices for PCA models. For checks with dimension greater than two, it is possible to identify which input has a problem. In FIG. 3, since the X3–X2 relationship is still within the normal envelope, the problem is with input X1. Each deviation measure is converted by the fuzzy Petri net into a zero to one scale that will continuously indicate the range from normal operation (value of zero) to abnormal operation (value of one).

For each process area under the authority of the operator, the applicable set of normal—abnormal indicators is combined into a single normal—abnormal indicator. This is done by using fuzzy Petri logic to select the worst case indication of abnormal operation. In this way the operator has a high level summary of all the checks within the process area. This section will not provide a general background to fuzzy Petri nets. For that, readers should refer to Cardoso, et al, *Fuzzy Petri Nets: An Overview* (1)

Figure 5:
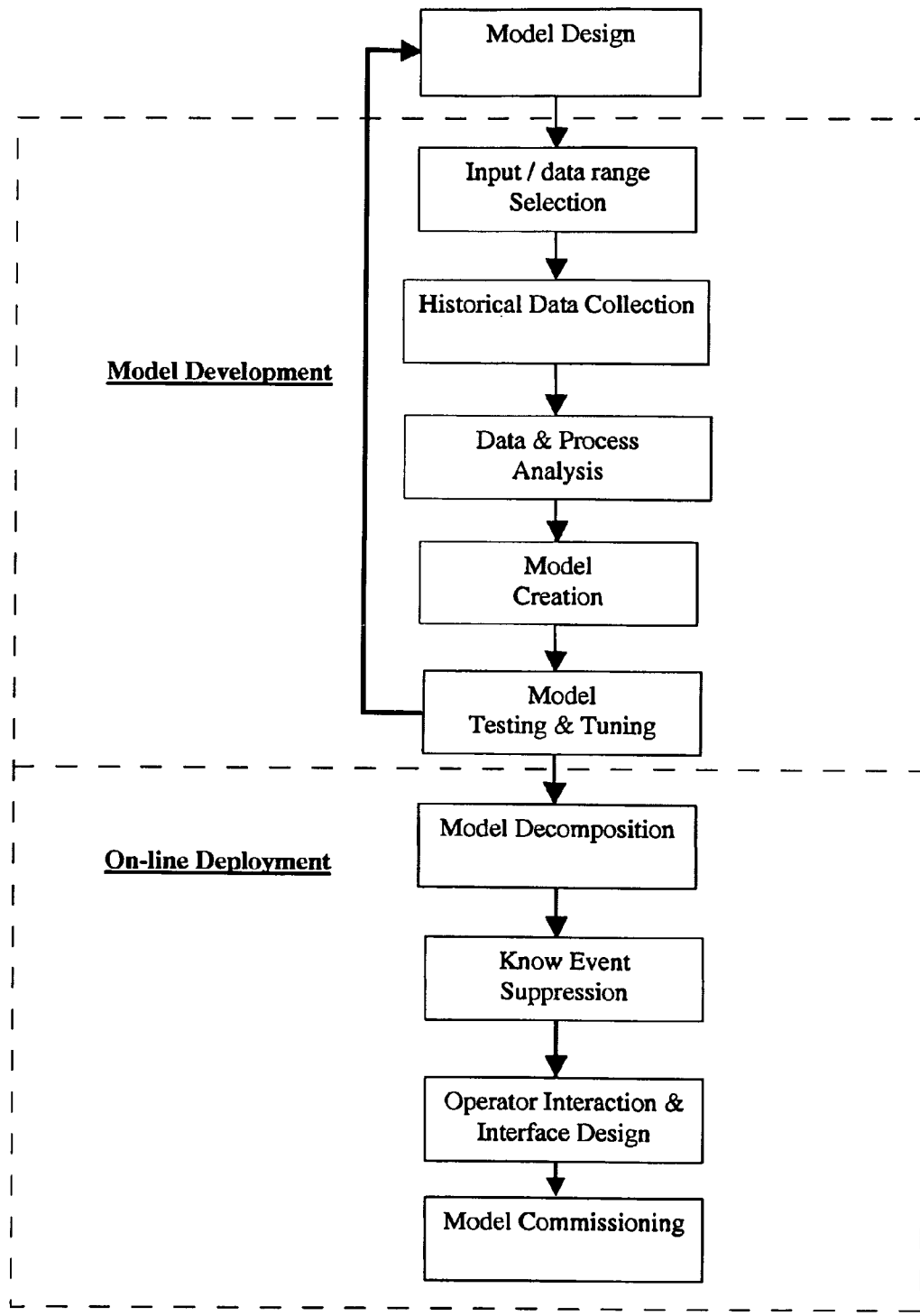
FIG. 5 shows a schematic diagram of the overall process for developing an abnormal event application.

The overall process for developing an abnormal event application is shown in FIG. 5. The basic development strategy is iterative where the developer starts with a rough model, then successively improves that model's capability based on observing how well the model represents the actual process operations during both normal operations and abnormal operations. The models are then restructured and retrained based on these observations.

Developing PCA Models for Abnormal Event Detection

I. Conceptual PCA Model Design

The overall design goals are to:

provide the console operator with a continuous status (normal vs. abnormal) of process operations for all of the process units under his operating authority provide him with an early detection of a rapidly developing (minutes to hours) abnormal event within his operating authority provide him with only the key process information needed to diagnose the root cause of the abnormal event.

Actual root cause diagnosis is outside the scope of this invention. The console operator is expected to diagnosis the process problem based on his process knowledge and training.

Having a broad process scope is important to the overall success of abnormal operation monitoring. For the operator to learn the system and maintain his skills, he needs to regularly use the system. Since specific abnormal events occur infrequently, abnormal operations monitoring of a small portion of the process would be infrequently used by the operator, likely leading the operator to disregard the system when it finally detects an abnormal event. This broad scope is in contrast to the published modeling goal which is to design the model based on detecting a specific process problem of significant economic interest (see Kourti, 2004).

There are thousands of process measurements within the process units under a single console operator's operating authority. Continuous refining and chemical processes exhibit significant time dynamics among these measurements, which break the cross correlation among the data. This requires dividing the process equipment into separate PCA models where the cross correlation can be maintained.

Conceptual model design is composed of four major decisions:

Subdividing the process equipment into equipment groups with corresponding PCA models Subdividing process operating time periods into process operating modes requiring different PCA models Identifying which measurements within an equipment group should be designated as inputs to each PCA model Identifying which measurements within an equipment group should act as flags for suppressing known events or other exception operations A. Process Unit Coverage The initial decision is to create groups of equipment that will be covered by a single PCA model. The specific process units included requires an understanding of the process integration/interaction. Similar to the design of a multivariable constraint controller, the boundary of the PCA model should encompass all significant process interactions and key upstream and downstream indications of process changes and disturbances.

The following rules are used to determined these equipment groups:

Equipment groups are defined by including all the major material and energy integrations and quick recycles in the same equipment group. If the process uses a multivariable constraint controller, the controller model will explicitly identify the interaction points among the process units. Otherwise the interactions need to be identified through an engineering analysis of the process.

Process groups should be divided at a point where there is a minimal interaction between the process equipment groups. The most obvious dividing point occurs when the only interaction comes through a single pipe containing the feed to the next downstream unit. In this case the temperature, pressure, flow, and composition of the feed are the primary influences on the downstream equipment group and the pressure in the immediate downstream unit is the primary influence on the upstream equipment group. These primary influence measurements should be included in both the upstream and downstream equipment group PCA models.

Include the influence of the process control applications between upstream and downstream equipment groups. The process control applications provide additional influence paths between upstream and downstream equipment groups. Both feedforward and feedback paths can exist. Where such paths exist the measurements which drive these paths need to be included in both equipment groups. Analysis of the process control applications will indicate the major interactions among the process units.

Divide equipment groups wherever there are significant time dynamics (e.g. storage tanks, long pipelines etc.). The PCA models primarily handle quick process changes (e.g. those which occur over a period of minutes to hours). Influences, which take several hours, days or even weeks to have their effect on the process, are not suitable for PCA models. Where these influences are important to the normal data patterns, measurements of these effects need to be dynamically compensated to get their effect time synchronized with the other process measurements (see the discussion of dynamic compensation).

B. Process Operating Modes

Process operating modes are defined as specific time periods where the process behavior is significantly different. Examples of these are production of different grades of product (e.g. polymer production), significant process transitions (e.g. startups, shutdowns, feedstock switches), processing of dramatically different feedstock (e.g. cracking naphtha rather than ethane in olefins production), or different configurations of the process equipment (different sets of process units running).

Where these significant operating modes exist, it is likely that separate PCA models will need to be developed for each major operating mode. The fewer models needed the better. The developer should assume that a specific PCA model could cover similar operating modes. This assumption must be tested by running new data from each operating mode through the model to see if it behaves correctly.

C. Historical Process Problems

In order for there to be organizational interest in developing an abnormal event detection system, there should be an historical process problem of significant economic impact. However, these significant problems must be analyzed to identify the best approach for attacking these problems. In particular, the developer should make the following checks before trying to build an abnormal event detection application:

1. Can the problem be permanently fixed? Often a problem exists because site personnel have not had sufficient time to investigate and permanently solve the problem. Once the attention of the organization is focused on the problem, a permanent solution is often found. This is the best approach.
2. Can the problem be directly measured? A more reliable way to detect a problem is to install sensors that can directly measure the problem in the process. This can also be used to prevent the problem through a process control application. This is the second best approach.
3. Can an inferential measurement be developed which will measure the approach to the abnormal operation? Inferential measurements are usually developed using partial least squares, PLS, models which are very close relatives to PCA abnormal event models. Other common alternatives for developing inferential measurements include Neural Nets and linear regression models. If the data exists which can be used to reliably measure the approach to the problem condition (e.g. tower flooding using delta pressure), this can then be used to not only detect when the condition exists but also as the base for a control application to prevent the condition from occurring. This is the third best approach.

Both direct measurements of problem conditions and inferential measurements of these conditions can be easily integrated into the overall network of abnormal detection models.

II. Input Data and Operating Range Selection

Within an equipment group, there will be thousands of process measurements. For the preliminary design:

Select all cascade secondary controller measurements, and especially ultimate secondary outputs (signals to field control valves) on these units Select key measurements used by the console operator to monitor the process (e.g. those which appear on his operating schematics)

Select any measurements used by the contact engineer to measure the performance of the process Select any upstream measurement of feed rate, feed temperature or feed quality Select measurements of downstream conditions which affect the process operating area, particularly pressures.

Select extra redundant measurements for measurements that are important

Select measurements that may be needed to calculate non-linear transformations.

Select any external measurement of a disturbance (e.g. ambient temperature)

Select any other measurements, which the process experts regard as important measures of the process condition From this list only include measurements which have the following characteristics:

The measurement does not have a history of erratic or problem performance

The measurement has a satisfactory signal to noise ratio

The measurement is cross-correlated with other measurements in the data set

The measurement is not saturated for more than 10% of the time during normal operations.

The measurement is not tightly controlled to a fixed set point, which rarely changes (the ultimate primary of a control hierarchy).

The measurement does not have long stretches of "Bad Value" operation or saturated against transmitter limits.

The measurement does not go across a range of values, which is known to be highly non-linear The measurement is not a redundant calculation from the raw measurements The signals to field control valves are not saturated for more than 10% of the time A. Evaluations for Selecting Model Inputs There are two statistical criteria for prioritizing potential inputs into the PCA Abnormal Detection Model, Signal to Noise Ratio and Cross-Correlation.

1) Signal to Noise Test

The signal to noise ratio is a measure of the information content in the input signal.

The signal to noise ratio is calculated as follows:

1. The raw signal is filtered using an exponential filter with an approximate dynamic time constant equivalent to that of the process. For continuous refining and chemical processes this time constant is usually in the range of 30 minutes to 2 hours. Other low pass filters can be used as well. For the exponential filter the equations are:

$$Y_n = P*Y_{n-1} + (1-P)*X_n \quad \text{Exponential filter equation} \quad \text{Equation 1}$$

$$P = \text{Exp}(-T_s/T_f) \quad \text{Filter constant calculation} \quad \text{Equation 2}$$

where:

$Y_n$ the current filtered value
$Y_{n-1}$ the previous filtered value
$X_n$ the current raw value
P the exponential filter constant
$T_s$ the sample time of the measurement
$T_f$ the filter time constant 2. A residual signal is created by subtracting the filtered signal from the raw signal $$R_n = X_n - Y_n \quad \text{Equation 3}$$

3. The signal to noise ratio is the ratio of the standard deviation of the filtered signal divided by the standard deviation of the residual signal $$S/N = \sigma_Y/\sigma_R \quad \text{Equation 4}$$

It is preferable to have all inputs exhibit a S/N which is greater than a predetermined minimum, such as 4. Those inputs with S/N less than this minimum need individual examination to determine whether they should be included in the model The data set used to calculate the S/N should exclude any long periods of steady-state operation since that will cause the estimate for the noise content to be excessively large.

2) Cross Correlation Test

The cross correlation is a measure of the information redundancy the input data set. The cross correlation between any two signals is calculated as:

1. Calculate the co-variance, $S_{ik}$, between each input pair, i and k $$S_{ik} = \frac{N*\Sigma(X_i*X_k) - (\Sigma X_i)*(\Sigma X_k)}{N*(N-1)} \quad \text{Equation 5}$$

2. Calculate the correlation coefficient for each pair of inputs from the co-variance:

$$CC_{ik}=S_{ik}/(S_{ii}*S_{kk})^{1/2}$$ Equation 6

There are two circumstances, which flag that an input should not be included in the model. The first circumstance occurs when there is no significant correlation between a particular input and the rest of the input data set. For each input, there must be at least one other input in the data set with a significant correlation coefficient, such as 0.4.

The second circumstance occurs when the same input information has been (accidentally) included twice, often through some calculation, which has a different identifier. Any input pairs that exhibit correlation coefficients near one (for example above 0.95) need individual examination to determine whether both inputs should be included in the model. If the inputs are physically independent but logically redundant (i.e., two independent thermocouples are independently measuring the same process temperature) then both these inputs should be included in the model.

If two inputs are transformations of each other (i.e., temperature and pressure compensated temperature) the preference is to include the measurement that the operator is familiar with, unless there is a significantly improved cross correlation between one of these measurements and the rest of the dataset. Then the one with the higher cross correlation should be included.

3) Identifying & Handling Saturated Variables

Refining and chemical processes often run against hard and soft constraints resulting in saturated values and "Bad Values" for the model inputs. Common constraints are: instrument transmitter high and low ranges, analyzer ranges, maximum and minimum control valve positions, and process control application output limits. Inputs can fall into several categories with regard to saturation which require special handling when pre-processing the inputs, both for model building and for the on-line use of these models.

For standard analog instruments (e.g., 4-20 milliamp electronic transmitters), bad values can occur because of two separate reasons:

The actual process condition is outside the range of the field transmitter

The connection with the field has been broken

When either of these conditions occur, the process control system could be configured on an individual measurement basis to either assign a special code to the value for that measurement to indicate that the measurement is a Bad Value, or to maintain the last good value of the measurement. These values will then propagate throughout any calculations performed on the process control system. When the "last good value" option has been configured, this can lead to erroneous calculations that are difficult to detect and exclude. Typically when the "Bad Value" code is propagated through the system, all calculations which depend on the bad measurement will be flagged bad as well.

Regardless of the option configured on the process control system, those time periods, which include Bad Values should not be included in training or test data sets. The developer needs to identify which option has been configured in the process control system and then configure data filters for excluding samples, which are Bad Values. For the on-line implementation, inputs must be pre-processed so that Bad Values are flagged as missing values, regardless of which option had been selected on the process control system.

Those inputs, which are normally Bad Value for extensive time periods should be excluded from the model.

Constrained variables are ones where the measurement is at some limit, and this measurement matches an actual process condition (as opposed to where the value has defaulted to the maximum or minimum limit of the transmitter range—covered in the Bad Value section). This process situation can occur for several reasons:

Portions of the process are normally inactive except under special override conditions, for example pressure relief flow to the flare system. Time periods where these override conditions are active should be excluded from the training and validation data set by setting up data filters. For the on-line implementation these override events are trigger events for automatic suppression of selected model statistics The process control system is designed to drive the process against process operating limits, for example product spec limits. These constraints typically fall into two categories:—those, which are occasionally saturated and those, which are normally saturated. Those inputs, which are normally saturated, should be excluded from the model. Those inputs, which are only occasionally saturated (for example less than 10% of the time) can be included in the model however, they should be scaled based on the time periods when they are not saturated.

B. Input from Process Control Applications

The process control applications have a very significant effect on the correlation structure of the process data. In particular:

The variation of controlled variables is significantly reduced so that movement in the controlled variables is primarily noise except for those brief time periods when the process has been hit with a significant process disturbance or the operator has intentionally moved the operating point by changing key set points.

The normal variation in the controlled variables is transferred by the control system to the manipulated variables (ultimately the signals sent to the control valves in the field).

Figure 6:
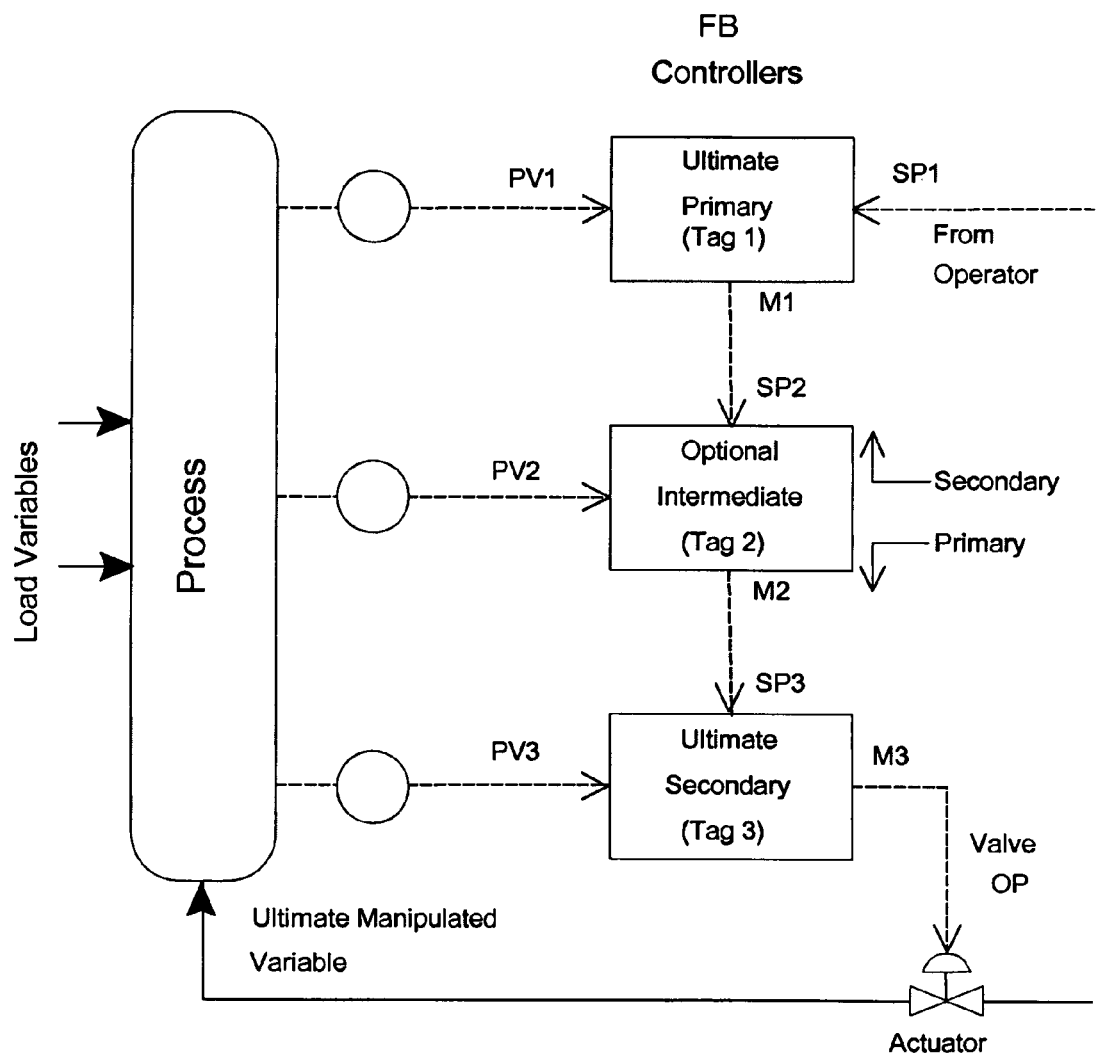
FIG. 6 shows a schematic diagram of the anatomy of a process control cascade.
Figure 7:
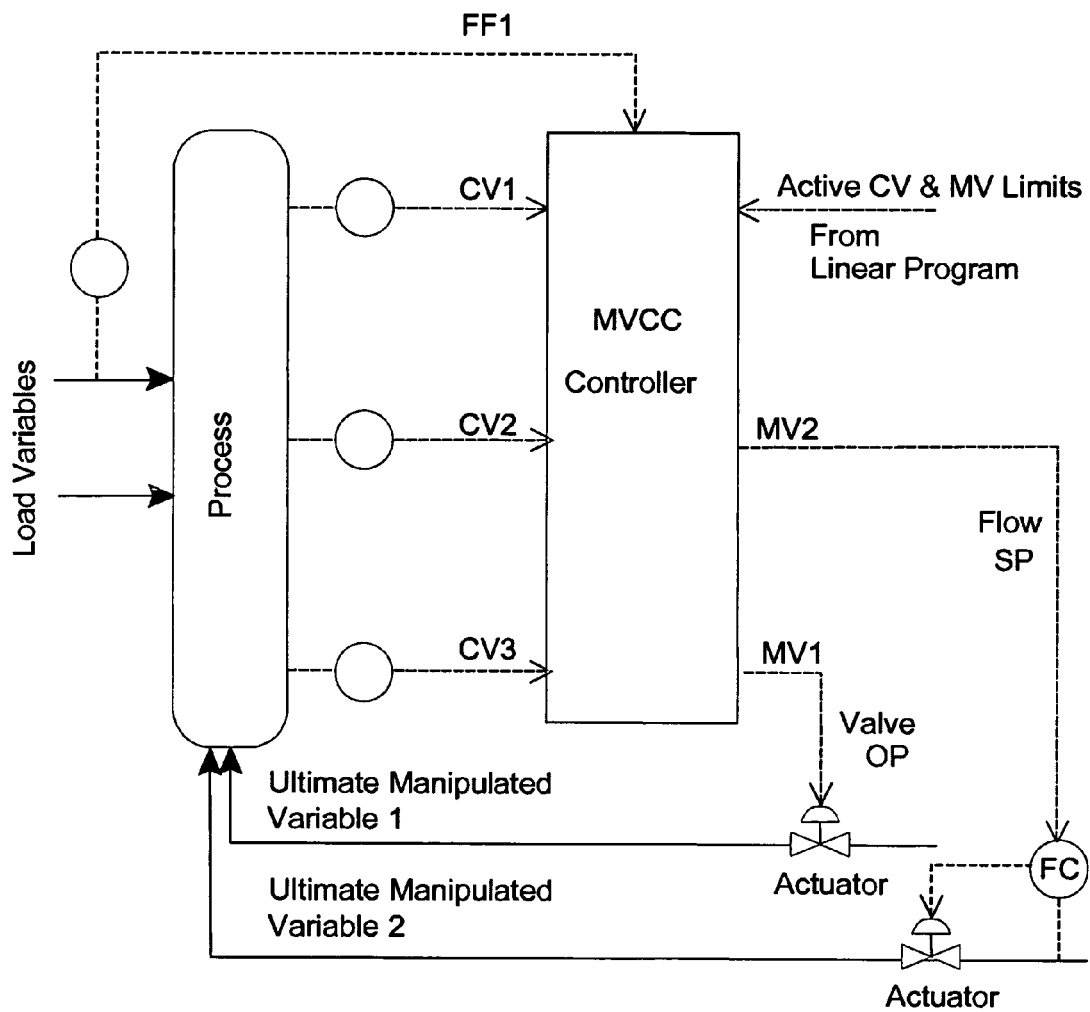
FIG. 7 shows a schematic diagram of the anatomy of a multivariable constraint controller, MVCC.

The normal operations of refinery and chemical processes are usually controlled by two different types of control structures: the classical control cascades (shown in FIG. 6) and the more recent multivariable constraint controllers, MVCC (shown in FIG. 7).

1) Selecting Model Inputs from Cascade Structures

FIG. 6 shows a typical "cascade" process control application, which is a very common control structure for refining and chemical processes. Although there are many potential model inputs from such an application, the only ones that are candidates for the model are the raw process measurements (the "PVs" in this figure) and the final output to the field valve.

Although it is a very important measurement, the PV of the ultimate primary of the cascade control structure is a poor candidate for inclusion in the model. This measurement usually has very limited movement since the objective of the control structure is to keep this measurement at the set point. There can be movement in the PV of the ultimate primary if its set point is changed but this usually is infrequent. The data patterns from occasional primary set point moves will usually not have sufficient power in the training dataset for the model to characterize the data pattern.

Because of this difficulty in characterizing the data pattern resulting from changes in the set point of the ultimate primary, when the operator makes this set point move, it is likely to cause a significant increase in the sum of squared prediction error, SPE, index of the model. Consequently, any change in the set point of the ultimate primary is a candidate trigger for a "known event suppression". Whenever the operator changes an ultimate primary set point, the "known event suppression" logic will automatically remove its effect from the SPE calculation.

Should the developer include the PV of the ultimate primary into the model, this measurement should be scaled based on those brief time periods during which the operator has changed the set point and until the process has moved close to the vale of the new set point (for example within 95% of the new set point change thus if the set point change is from 10 to 11, when the PV reaches 10.95)

There may also be measurements that are very strongly correlated (for example greater than 0.95 correlation coefficient) with the PV of the Ultimate Primary, for example redundant thermocouples located near a temperature measurement used as a PV for an Ultimate Primary. These redundant measurements should be treated in the identical manner that is chosen for the PV of the Ultimate Primary.

Cascade structures can have set point limits on each secondary and can have output limits on the signal to the field control valve. It is important to check the status of these potentially constrained operations to see whether the measurement associated with a set point has been operated in a constrained manner or whether the signal to the field valve has been constrained. Date during these constrained operations should not be used.

2) Selecting/Calculating Model Inputs from Multivariable Constraint Controllers, MVCC FIG. 7 shows a typical MVCC process control application, which is a very common control structure for refining and chemical processes. An MVCC uses a dynamic mathematical model to predict how changes in manipulated variables, MVs, (usually valve positions or set points of regulatory control loops) will change control variables, CVs (the dependent temperatures, pressures, compositions and flows which measure the process state). An MVCC attempts to push the process operation against operating limits. These limits can be either MV limits or CV limits and are determined by an external optimizer. The number of limits that the process operates against will be equal to the number of MVs the controller is allowed to manipulate minus the number of material balances controlled. So if an MVCC has 12 MVs, 30 CVs and 2 levels then the process will be operated against 10 limits. An MVCC will also predict the effect of measured load disturbances on the process and compensate for these load disturbances (known as feed forward variables, FF).

Whether or not a raw MV or CV is a good candidate for inclusion in the PCA model depends on the percentage of time that MV or CV is held against its operating limit by the MVCC. As discussed in the Constrained Variables section, raw variables that are constrained more than 10% of the time are poor candidates for inclusion in the PCA model. Normally unconstrained variables should be handled per the Constrained Variables section discussion.

If an unconstrained MV is a set point to a regulatory control loop, the set point should not be included; instead the measurement of that regulatory control loop should be included. The signal to the field valve from that regulatory control loop should also be included.

If an unconstrained MV is a signal to a field valve position, then it should be included in the model.

C. Redundant Measurements

The process control system databases can have a significant redundancy among the candidate inputs into the PCA model. One type of redundancy is "physical redundancy", where there are multiple sensors (such as thermocouples) located in close physical proximity to each other within the process equipment. The other type of redundancy is "calculational redundancy", where raw sensors are mathematically combined into new variables (e.g. pressure compensated temperatures or mass flows calculated from volumetric flow measurements).

As a general rule, both the raw measurement and an input which is calculated from that measurement should not be included in the model. The general preference is to include the version of the measurement that the process operator is most familiar with. The exception to this rule is when the raw inputs must be mathematically transformed in order to improve the correlation structure of the data for the model. In that case the transformed variable should be included in the model but not the raw measurement.

Physical redundancy is very important for providing cross validation information in the model. As a general rule, raw measurements, which are physically redundant, should be included in the model. When there are a large number of physically redundant measurements, these measurements must be specially scaled so as to prevent them from overwhelming the selection of principal components (see the section on variable scaling). A common process example occurs from the large number of thermocouples that are placed in reactors to catch reactor runaways.

When mining a very large database, the developer can identify the redundant measurements by doing a cross-correlation calculation among all of the candidate inputs. Those measurement pairs with a very high cross-correlation (for example above 0.95) should be individually examined to classify each pair as either physically redundant or calculationally redundant.

III. Historical Data Collection

A significant effort in the development lies in creating a good training data set, which is known to contain all modes of normal process operations. This data set should:

Span the normal operating range: Datasets, which span small parts of the operating range, are composed mostly of noise. The range of the data compared to the range of the data during steady state operations is a good indication of the quality of the information in the dataset.

Include all normal operating modes (including seasonal mode variations). Each operating mode may have different correlation structures. Unless the patterns, which characterize the operating mode, are captured by the model, these unmodeled operating modes will appear as abnormal operations.

Only include normal operating data: If strong abnormal operating data is included in the training data, the model will mistakenly model these abnormal operations as normal operations. Consequently, when the model is later compared to an abnormal operation, it may not detect the abnormality operations.

History should be as similar as possible to the data used in the on-line system: The online system will be providing spot values at a frequency fast enough to detect the abnormal event. For continuous refining and chemical operations this sampling frequency will be around one minute. Within the limitations of the data historian, the training data should be as equivalent to one-minute spot values as possible.

The strategy for data collection is to start with a long operating history (usually in the range of 9 months to 18 months), then try to remove those time periods with obvious or documented abnormal events. By using such a long time period, the smaller abnormal events will not appear with sufficient strength in the training data set to significantly influence the model parameters most operating modes should have occurred and will be represented in the data.

A. Historical Data Collection Issues

1) Data Compression

Many historical databases use data compression to minimize the storage requirements for the data. Unfortunately, this practice can disrupt the correlation structure of the data. At the beginning of the project the data compression of the database should be turned off and the spot values of the data historized. Final models should be built using uncompressed data whenever possible. Averaged values should not be used unless they are the only data available, and then with the shortest data average available.

2) Length of Data History

For the model to properly represent the normal process patterns, the training data set needs to have examples of all the normal operating modes, normal operating changes and changes and normal minor disturbances that the process experiences. This is accomplished by using data from over a long period of process operations (e.g. 9-18 months). In particular, the differences among seasonal operations (spring, summer, fall and winter) can be very significant with refinery and chemical processes.

Sometimes these long stretches of data are not yet available (e.g. after a turnaround or other significant reconfiguration of the process equipment). In these cases the model would start with a short initial set of training data (e.g. 6 weeks) then the training dataset is expanded as further data is collected and the model updated monthly until the models are stabilized (e.g. the model coefficients don't change with the addition of new data)

3) Ancillary Historical Data

The various operating journals for this time period should also be collected. This will be used to designate operating time periods as abnormal, or operating in some special mode that needs to be excluded from the training dataset. In particular, important historical abnormal events can be selected from these logs to act as test cases for the models.

4) Lack of Specific Measurement History

Often set points and controller outputs are not historized in the plant process data historian. Historization of these values should immediately begin at the start of the project.

5) Operating Modes

Old data that no longer properly represents the current process operations should be removed from the training data set. After a major process modification, the training data and PCA model may need to be rebuilt from scratch. If a particular type of operation is no longer being done, all data from that operation should be removed from the training data set.

Operating logs should be used to identify when the process was run under different operating modes. These different modes may require separate models. Where the model is intended to cover several operating modes, the number of samples in the training dataset from each operating model should be approximately equivalent.

6) Sampling Rate

The developer should gather several months of process data using the site's process historian, preferably getting one minute spot values. If this is not available, the highest resolution data, with the least amount of averaging should be used.

7) Infrequently Sampled Measurements

Figure 8:
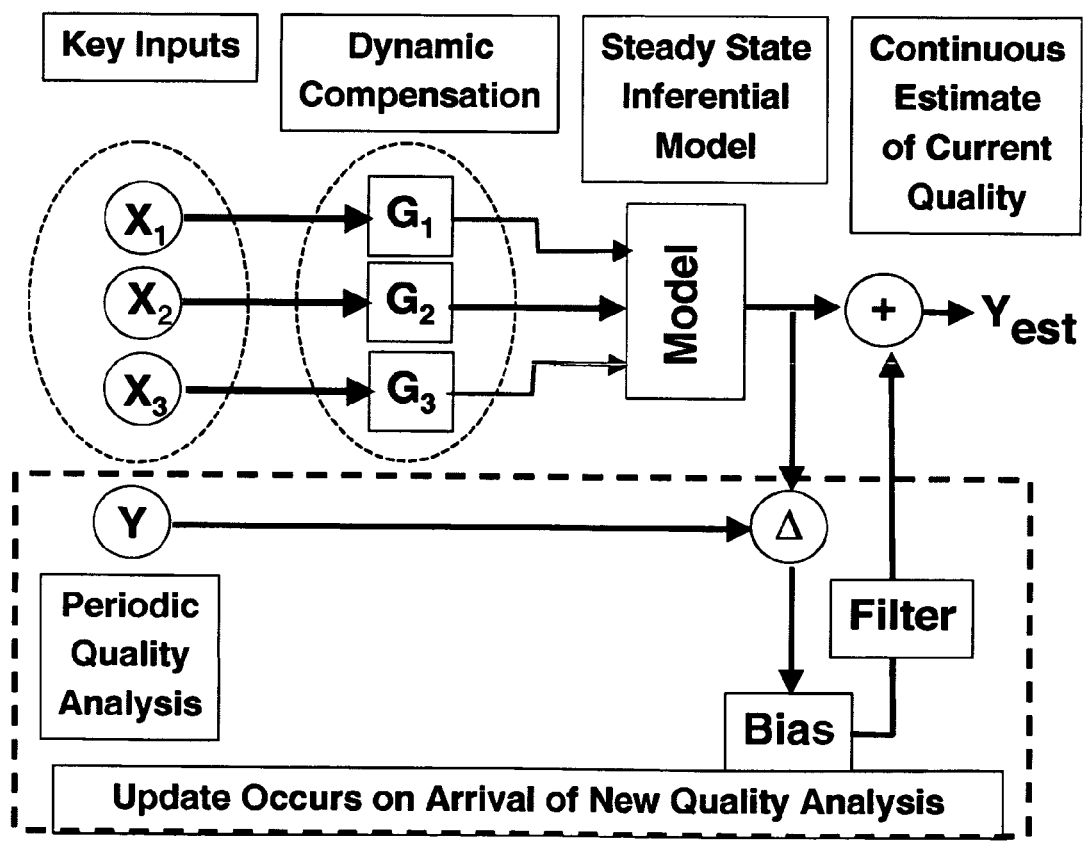
FIG. 8 shows a schematic diagram of the on-line inferential estimate of current quality.

Quality measurements (analyzers and lab samples) have a much slower sample frequency than other process measurements, ranging from tens of minutes to daily. In order to include these measurements in the model a continuous estimate of these quality measurements needs to be constructed. FIG. 8 shows the online calculation of a continuous quality estimate. This same model structure should be created and applied to the historical data. This quality estimate then becomes the input into the PCA model.

8) Model Triggered Data Annotation

Except for very obvious abnormalities, the quality of historical data is difficult to determine. The inclusion of abnormal operating data can bias the model. The strategy of using large quantities of historical data will compensate to some degree the model bias caused by abnormal operating in the training data set. The model built from historical data that predates the start of the project must be regarded with suspicion as to its quality. The initial training dataset should be replaced with a dataset, which contains high quality annotations of the process conditions, which occur during the project life.

The model development strategy is to start with an initial "rough" model (the consequence of a questionable training data set) then use the model to trigger the gathering of a high quality training data set. As the model is used to monitor the process, annotations and data will be gathered on normal operations, special operations, and abnormal operations. Anytime the model flags an abnormal operation or an abnormal event is missed by the model, the cause and duration of the event is annotated. In this way feedback on the model's ability to monitor the process operation can be incorporated in the training data. This data is then used to improve the model, which is then used to continue to gather better quality training data. This process is repeated until the model is satisfactory.

IV. Data & Process Analysis

A. Initial Rough Data Analysis

Using the operating logs and examining the process key performance indicators, the historical data is divided into periods with known abnormal operations and periods with no identified abnormal operations. The data with no identified abnormal operations will be the training data set.

Now each measurement needs to be examined over its history to see whether it is a candidate for the training data set. Measurements which should be excluded are:

Those with many long periods of time as "Bad Value"

Those with many long periods of time pegged to their transmitter high or low limits Those, which show very little variability (except those, which are tightly controlled to their set points)

Those that continuously show very large variability relative to their operating range Those that show little or no cross correlation with any other measurements in the data set Those with poor signal to noise ratios While examining the data, those time periods where measurements are briefly indicating "Bad Value" or are briefly pegged to their transmitter high or low limits should also be excluded.

Once these exclusions have been made the first rough PCA model should be built. Since this is going to be a very rough model the exact number of principal components to be retained is not important. This will typically be around 5% of the number measurements included in the model. The number of PCs should ultimately match the number of degrees of freedom in the process, however this is not usually known since this includes all the different sources of process disturbances. There are several standard methods for determining how many principal components to include. Also at this stage the statistical approach to variable scaling should be used: scale all variables to unit variance.

$$X' = (X - X_{avg})/\sigma \qquad \text{Equation 7}$$

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data.

B. Removing Outliers and Periods of Abnormal Operations

Eliminating obvious abnormal events will be done through the following:

Removing documented events. It is very rare to have a complete record of the abnormal event history at a site. However, significant operating problems should be documented in operating records such as operator logs, operator change journals, alarm journals, and instrument maintenance records. These are only providing a partial record of the abnormal event history.

Figure 9:
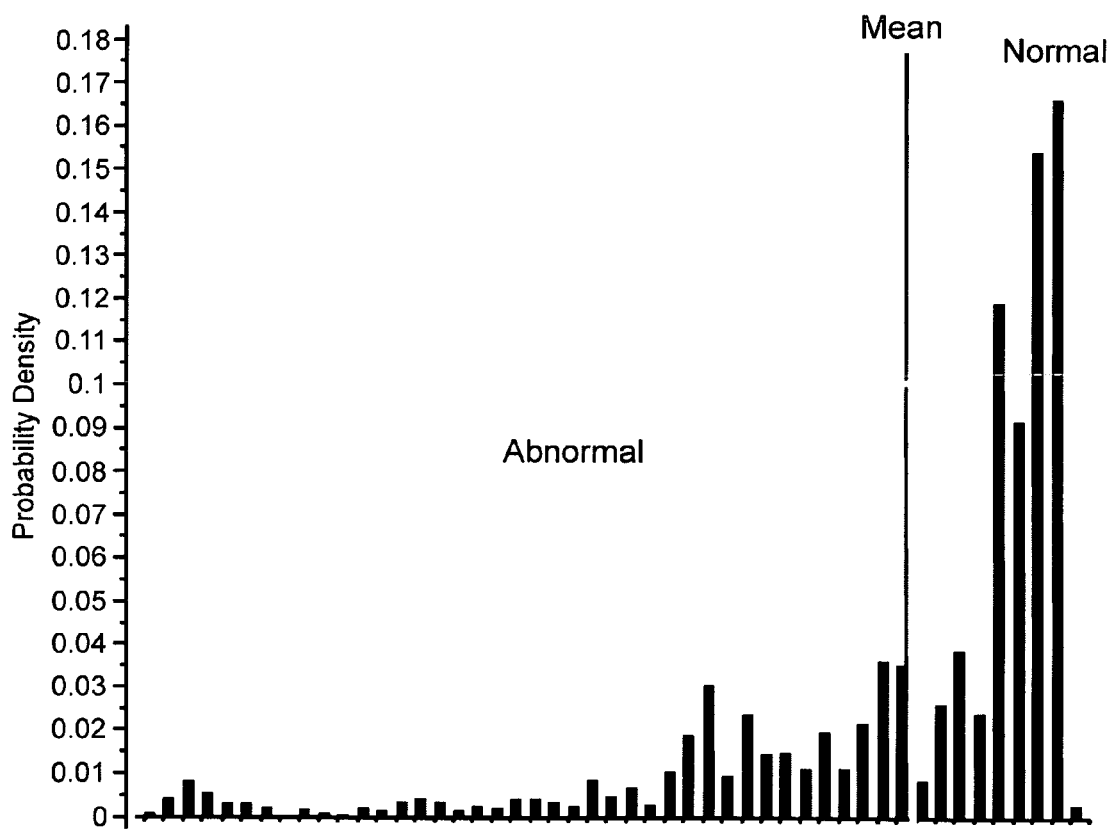
FIG. 9 shows the KPI analysis of historical data.

Removing time periods where key performance indicators, KPIs, are abnormal. Such measurements as feed rates, product rates, product quality are common key performance indicators. Each process operation may have additional KPIs that are specific to the unit. Careful examination of this limited set of measurements will usually give a clear indication of periods of abnormal operations. FIG. 9 shows a histogram of a KPI. Since the operating goal for this KPI is to maximize it, the operating periods where this KPI is low are likely abnormal operations. Process qualities are often the easiest KPIs to analyze since the optimum operation is against a specification limit and they are less sensitive to normal feed rate variations.

C. Compensating for Noise

By noise we are referring to the high frequency content of the measurement signal which does not contain useful information about the process. Noise can be caused by specific process conditions such as two-phase flow across an orifice plate or turbulence in the level. Noise can be caused by electrical inductance. However, significant process variability, perhaps caused by process disturbances is useful information and should not be filtered out.

There are two primary noise types encountered in refining and chemical process measurements: measurement spikes and exponentially correlated continuous noise. With measurement spikes, the signal jumps by an unreasonably large amount for a short number of samples before returning to a value near its previous value. Noise spikes are removed using a traditional spike rejection filter such as the Union filter.

Figure 10:
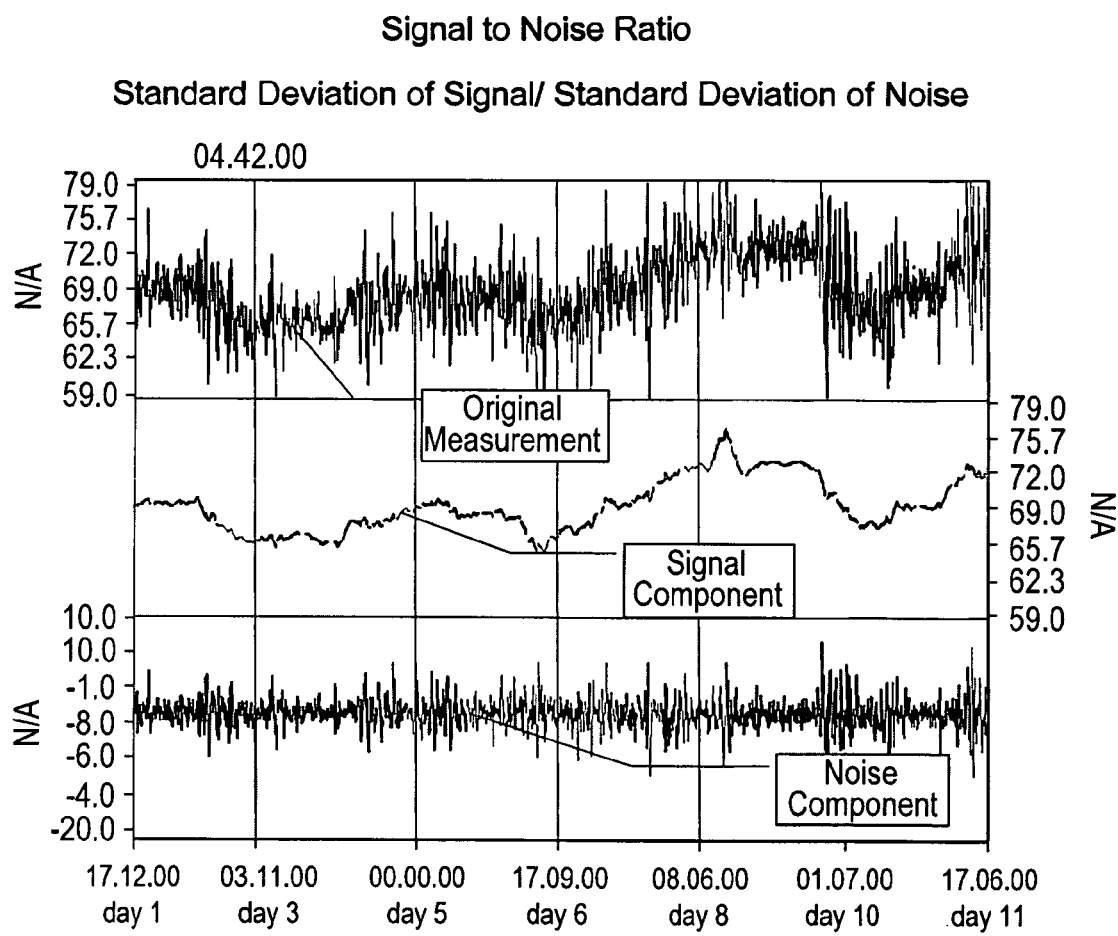
FIG. 10 shows a diagram of signal to noise ratio.

The amount of noise in the signal can be quantified by a measure known as the signal to noise ratio (see FIG. 10). This is defined as the ratio of the amount of signal variability due to process variation to the amount of signal variability due to high frequency noise. A value below four is a typical value for indicating that the signal has substantial noise, and can harm the model's effectiveness.

Whenever the developer encounters a signal with significant noise, he needs to make one of three choices. In order of preference, these are:

Fix the signal by removing the source of the noise (the best answer)

Remove/minimize the noise through filtering techniques

Exclude the signal from the model

Typically for signals with signal to noise ratios between 2 and 4, the exponentially correlated continuous noise can be removed with a traditional low pass filter such as an exponential filter. The equations for the exponential filter are:

$$Y^n = P*Y^{n-1} + (1-P)*X^n \text{ Exponential filter equation} \qquad \text{Equation 8}$$

$$P = \text{Exp}(-T_s/T_f) \text{ Filter constant calculation} \qquad \text{Equation 9}$$

$Y_n$ is the current filtered value
$Y^{n-1}$ is the previous filtered value
$X^n$ is the current raw value
P is the exponential filter constant
$T_s$ is the sample time of the measurement
$T_f$ is the filter time constant Signals with very poor signal to noise ratios (for example less than 2) may not be sufficiently improved by filtering techniques to be directly included in the model. If the input is regarded as important, the scaling of the variable should be set to de-sensitize the model by significantly increasing the size of the scaling factor (typically by a factor in the range of 2-10).

D. Transformed Variables

Transformed variables should be included in the model for two different reasons.

First, based on an engineering analysis of the specific equipment and process chemistry, known non-linearities in the process should be transformed and included in the model. Since one of the assumptions of PCA is that the variables in the model are linearly correlated, significant process or equipment non-linearities will break down this correlation structure and show up as a deviation from the model. This will affect the usable range of the model.

Examples of well known non-linear transforms are:

Reflux to feed ratio in distillation columns
Log of composition in high purity distillation
Pressure compensated temperature measurement
Sidestream yield
Flow to valve position (FIG. 2)
Reaction rate to exponential temperature change Second, the data from process problems, which have occurred historically, should also be examined to understand how these problems show up in the process measurements. For example, the relationship between tower delta pressure and feedrate is relatively linear until the flooding point is reached, when the delta pressure will increase exponentially. Since tower flooding is picked up by the break in this linear correlation, both delta pressure and feed rate should be included. As another example, catalyst flow problems can often be seen in the delta pressures in the transfer line. So instead of including the absolute pressure measurements in the model, the delta pressures should be calculated and included.

E. Dynamic Transformations

Figure 11:
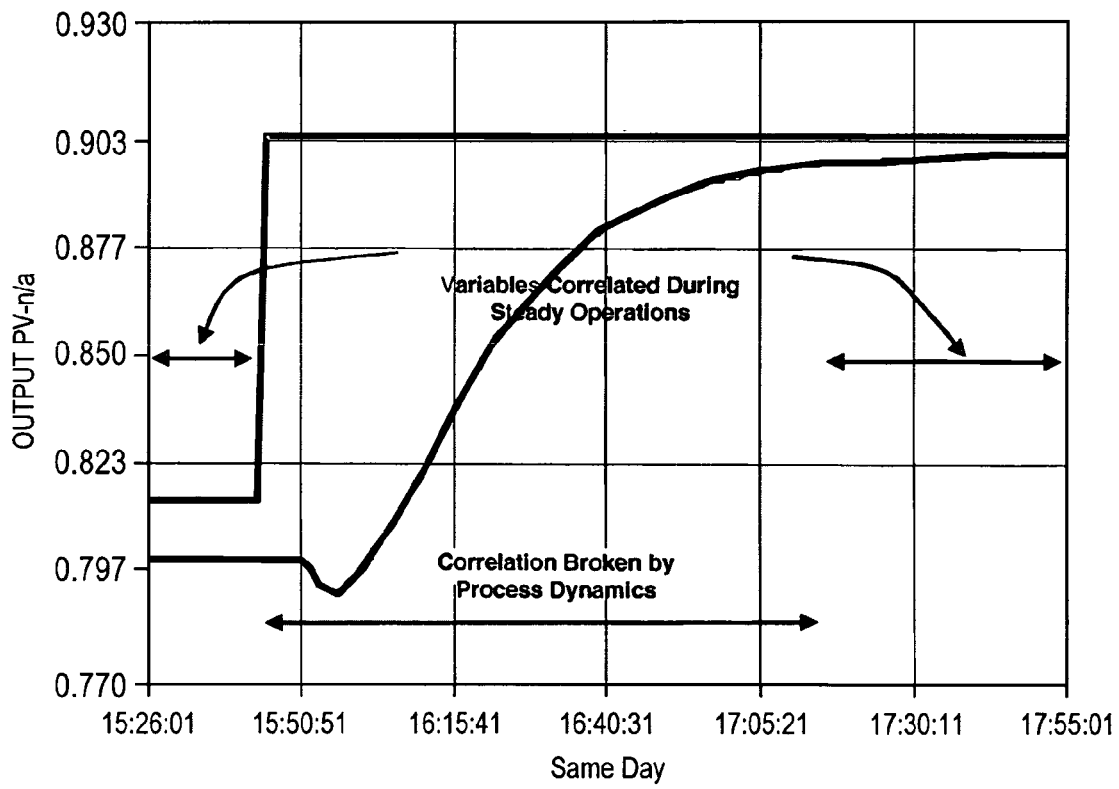
FIG. 11 shows how the process dynamics can disrupt the correlation between the current values of two measurements.

FIG. 11 shows how the process dynamics can disrupt the correlation between the current values of two measurements. During the transition time one value is constantly changing while the other is not, so there is no correlation between the current values during the transition. However these two measurements can be brought back into time synchronization by transforming the leading variable using a dynamic transfer function. Usually a first order with deadtime dynamic model (shown in Equation 9 in the Laplace transform format) is sufficient to time synchronize the data.

$$Y'(s) = \frac{e^{-\Theta s} Y(s)}{Ts + 1} \quad \text{Equation 9}$$

Y—raw data
Y'—time synchronized data
T—time constant
Θ—deadtime
S—Laplace Transform parameter This technique is only needed when there is a significant dynamic separation between variables used in the model. Usually only 1-2% of the variables requires this treatment. This will be true for those independent variables such as set points which are often changed in large steps by the operator and for the measurements which are significantly upstream of the main process units being modeled.

F. Removing Average Operating Point

Continuous refining and chemical processes are constantly being moved from one operating point to another. These can be intentional, where the operator or an optimization program makes changes to a key set points, or they can be due to slow process changes such as heat exchanger fouling or catalyst deactivation. Consequently, the raw data is not stationary. These operating point changes need to be removed to create a stationary dataset. Otherwise these changes erroneously appear as abnormal events.

The process measurements are transformed to deviation variables: deviation from a moving average operating point. This transformation to remove the average operating point is required when creating PCA models for abnormal event detection. This is done by subtracting the exponentially filtered value (see Equations 8 and 9 for exponential filter equations) of a measurement from its raw value and using this difference in the model.

$$X' = X - X_{filtered} \quad \text{Equation 10}$$

X'—measurement transformed to remove operating point changes
X—original raw measurement
$X_{filtered}$—exponentially filtered raw measurement The time constant for the exponential filter should be about the same size as the major time constant of the process. Often a time constant of around 40 minutes will be adequate. The consequence of this transformation is that the inputs to the PCA model are a measurement of the recent change of the process from the moving average operating point.

In order to accurately perform this transform, the data should be gathered at the sample frequency that matches the on-line system, often every minute or faster. This will result in collecting 525,600 samples for each measurement to cover one year of operating data. Once this transformation has been calculated, the dataset is resampled to get down to a more manageable number of samples, typically in the range of 30,000 to 50,000 samples.

V. Model Creation

Once the specific measurements have been selected and the training data set has been built, the model can be built quickly using standard tools.

A. Scaling Model Inputs

The performance of PCA models is dependent on the scaling of the inputs. The traditional approach to scaling is to divide each input by its standard deviation, σ, within the training data set.

$$X_i' = X_i / \sigma_i \quad \text{Equation 11}$$

For input sets that contain a large number of nearly identical measurements (such as multiple temperature measurements of fixed catalyst reactor beds) this approach is modified to further divide the measurement by the square root of the number of nearly identical measurements.

For redundant data groups $$X_i' = X_i / (\sigma_i * \text{sqrt}(N)) \quad \text{Equation 12}$$

Where N=number of inputs in redundant data group

These traditional approaches can be inappropriate for measurements from continuous refining and chemical processes. Because the process is usually well controlled at specified operating points, the data distribution is a combination of data from steady state operations and data from "disturbed" and operating point change operations. These data will have overly small standard deviations from the preponderance of steady state operation data. The resulting PCA model will be excessively sensitive to small to moderate deviations in the process measurements.

For continuous refining and chemical processes, the scaling should be based on the degree of variability that occurs during normal process disturbances or during operating point changes not on the degree of variability that occurs during continuous steady state operations. For normally unconstrained variables, there are two different ways of determining the scaling factor.

First is to identify time periods where the process was not running at steady state, but was also not experiencing a significant abnormal event. A limited number of measurements act as the key indicators of steady state operations. These are typically the process key performance indicators and usually include the process feed rate, the product production rates and the product quality. These key measures are used to segment the operations into periods of normal steady state operations, normally disturbed operations, and abnormal operations. The standard deviation from the time periods of normally disturbed operations provides a good scaling factor for most of the measurements.

Figure 12:
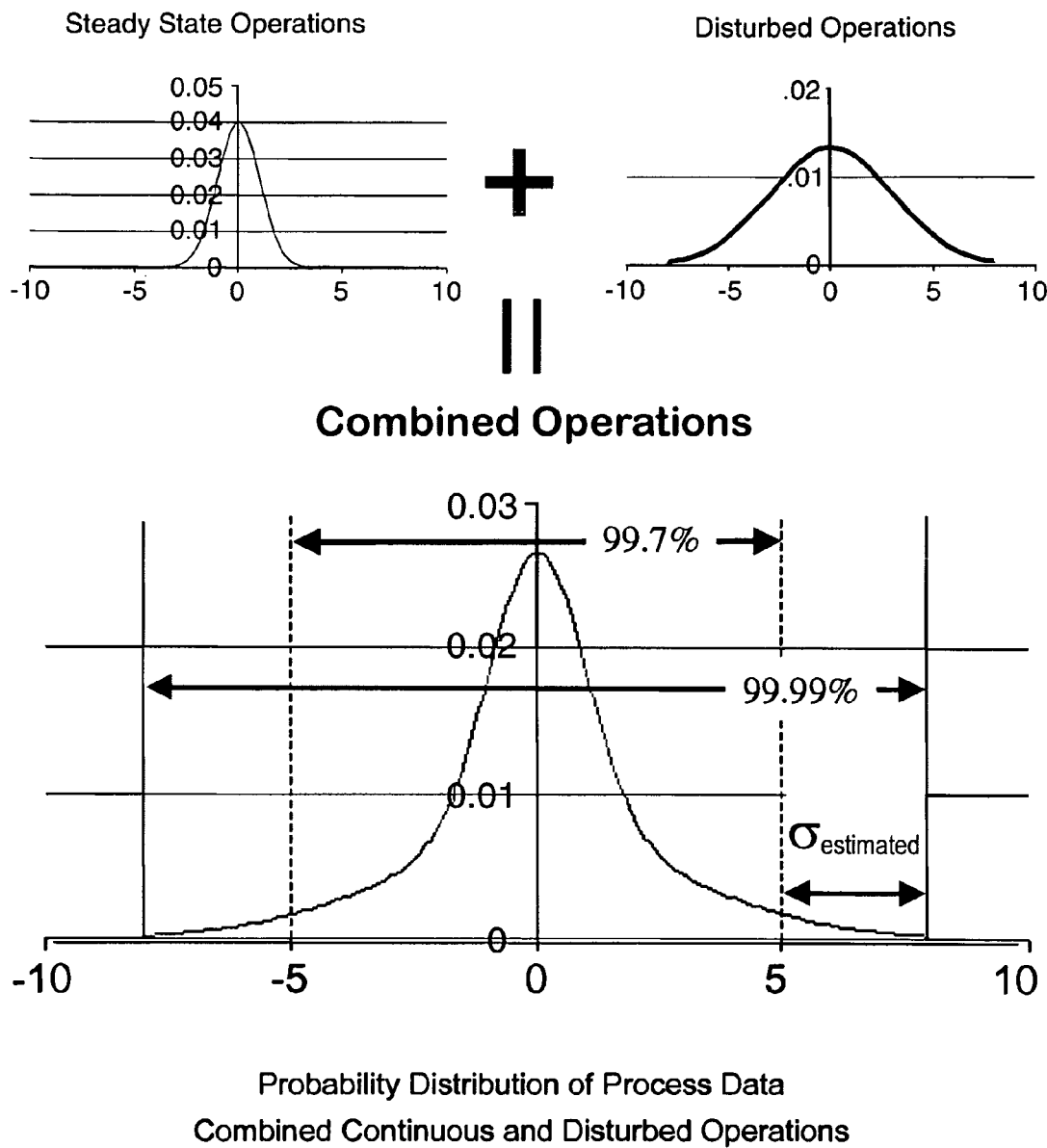
FIG. 12 shows the probability distribution of process data.

An alternative approach to explicitly calculating the scaling based on disturbed operations is to use the entire training data set as follows. The scaling factor can be approximated by looking at the data distribution outside of 3 standard deviations from the mean. For example, 99.7% of the data should lie, within 3 standard deviations of the mean and that 99.99% of the data should lie, within 4 standard deviations of the mean. The span of data values between 99.7% and 99.99% from the mean can act as an approximation for the standard deviation of the "disturbed" data in the data set. See FIG. 12.

Finally, if a measurement is often constrained (see the discussion on saturated variables) only those time periods where the variable is unconstrained should be used for calculating the standard deviation used as the scaling factor.

B. Selecting the Number of Principal Components

PCA transforms the actual process variables into a set of independent variables called Principal Components, PC, which are linear combinations of the original variables (Equation 13).

$$PC_i = A_{i,1} * X_1 + A_{i,2} * X_2 + A_{i,3} * X_3 + \ldots \quad \text{Equation 13}$$

The process will have a number of degrees of freedom, which represent the specific independent effects that influence the process. These different independent effects show up in the process data as process variation. Process variation can be due to intentional changes, such as feed rate changes, or unintentional disturbances, such as ambient temperature variation.

Each principal component models a part of the process variability caused by these different independent influences on the process. The principal components are extracted in the direction of decreasing variation in the data set, with each subsequent principal component modeling less and less of the process variability. Significant principal components represent a significant source of process variation, for example the first principal component usually represents the effect of feed rate changes since this is usually the source of the largest process changes. At some point, the developer must decide when the process variation modeled by the principal components no longer represents an independent source of process variation.

The engineering approach to selecting the correct number of principal components is to stop when the groups of variables, which are the primary contributors to the principal component no longer make engineering sense. The primary cause of the process variation modeled by a PC is identified by looking at the coefficients, $A_{i,n}$, of the original variables (which are called loadings). Those coefficients, which are relatively large in magnitude, are the major contributors to a particular PC. Someone with a good understanding of the process should be able to look at the group of variables, which are the major contributors to a PC and assign a name (e.g. feed rate effect) to that PC. As more and more PCs are extracted from the data, the coefficients become more equal in size. At this point the variation being modeled by a particular PC is primarily noise.

Figure 13:
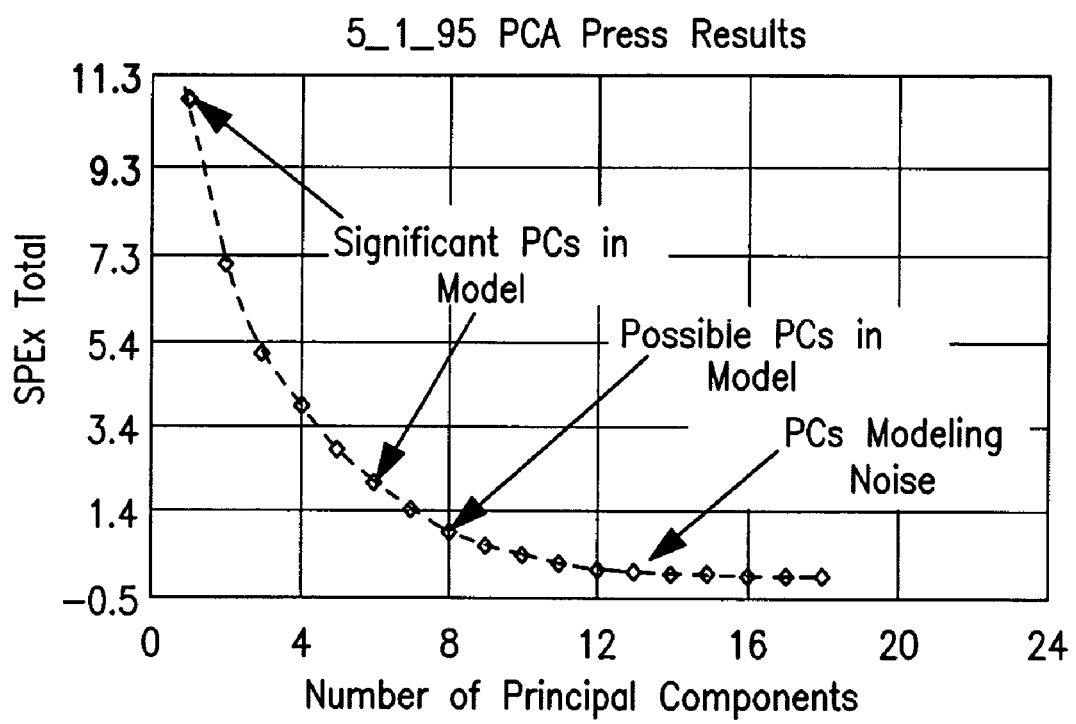
FIG. 13 shows illustration of the press statistic.

The traditional statistical method for determining when the PC is just modeling noise is to identify when the process variation being modeled with each new PC becomes constant. This is measured by the PRESS statistic, which plots the amount of variation modeled by each successive PC (FIG. 13). Unfortunately this test is often ambiguous for PCA models developed on refining and chemical processes.

VI. Model Testing & Tuning

The process data will not have a gaussian or normal distribution. Consequently, the standard statistical method of setting the trigger for detecting an abnormal event at 3 standard deviations of the error residual should not be used. Instead the trigger point needs to be set empirically based on experience with using the model.

Initially the trigger level should be set so that abnormal events would be signaled at a rate acceptable to the site engineer, typically 5 or 6 times each day. This can be determined by looking at the $SPE_x$ statistic for the training data set (this is also referred to as the Q statistic or the $DMOD_x$ statistic). This level is set so that real abnormal events will not get missed but false alarms will not overwhelm the site engineer.

A. Enhancing the Model

Once the initial model has been created, it needs to be enhanced by creating a new training data set. This is done by using the model to monitor the process. Once the model indicates a potential abnormal situation, the engineer should investigate and classify the process situation. The engineer will find three different situations, either some special process operation is occurring, an actual abnormal situation is occurring, or the process is normal and it is a false indication.

The new training data set is made up of data from special operations and normal operations. The same analyses as were done to create the initial model need to be performed on the data, and the model re-calculated. With this new model the trigger lever will still be set empirically, but now with better annotated data, this trigger point can be tuned so as to only give an indication when a true abnormal event has occurred.

Simple Engineering Models for Abnormal Event Detection

The physics, chemistry, and mechanical design of the process equipment as well as the insertion of multiple similar measurements creates a substantial amount of redundancy in the data from continuous refining and chemical processes. This redundancy is called physical redundancy when identical measurements are present, and calculational redundancy when the physical, chemical, or mechanical relationships are used to perform independent but equivalent estimates of a process condition. This class of model is called an engineering redundancy model.

I. Two Dimensional Engineering Redundancy Models

This is the simplest form of the model and it has the generic form:

$$F(y_i) = G(x_i) + \text{filtered bias}_i + \text{operator bias} + \text{error}_i \quad \text{Equation 14}$$

$$\text{raw bias}_i = F(y_i) - \{G(x_i) + \text{filtered bias}_i + \text{operator bias}\} = \text{error}_i \quad \text{Equation 15}$$

$$\text{filtered bias}_i = \text{filtered bias}_{i-1} + N^* \text{raw bias}_{i-1} \quad \text{Equation 16}$$

N—convergence factor (e.g. 0.0001)

Normal operating range: xmin<x<xmax

Normal model deviation: −(max_error)<error<(max_error)

The "operator bias" term is updated whenever the operator determines that there has been some field event (e.g. opening a bypass flow) which requires the model to be shifted. On the operator's command, the operator bias term is updated so that Equation 14 is exactly satisfied ($\text{error}_i = 0$)

The "filtered bias" term updates continuously to account for persistent unmeasured process changes that bias the engineering redundancy model. The convergence factor, "N", is set to eliminate any persistent change after a user specified time period, usually on the time scale of days.

The "normal operating range" and the "normal model deviation" are determined from the historical data for the engineering redundancy model. In most cases the max_error value is a single value; however this can also be a vector of values that is dependent on the x axis location.

Figure 14:
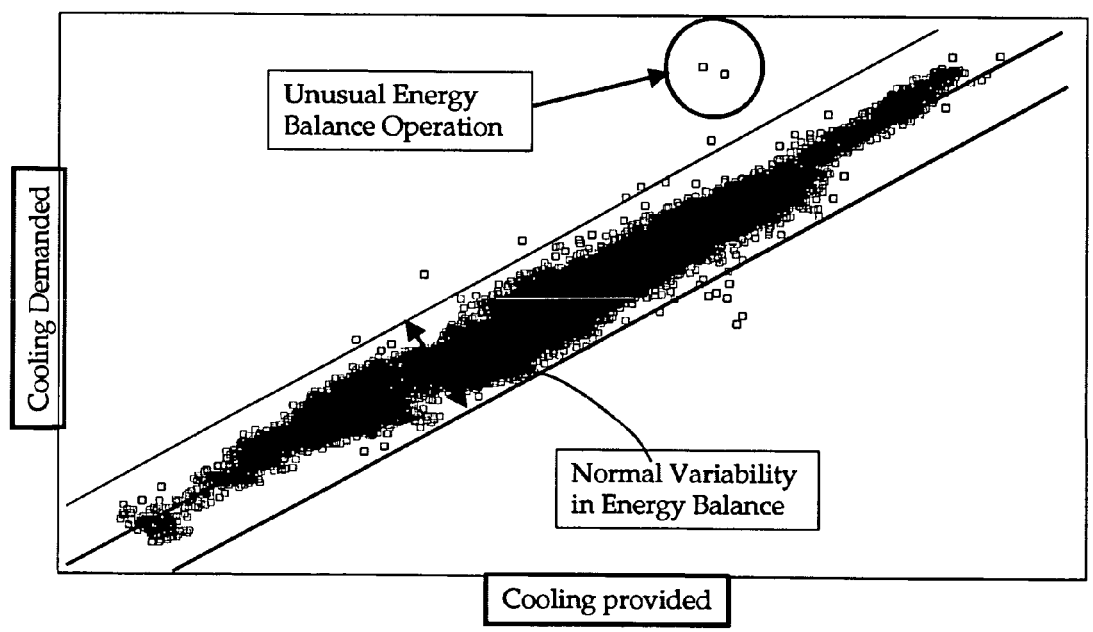
FIG. 14 shows the two-dimensional energy balance model.

Any two dimensional equation can be represented in this manner. Material balances, energy balances, estimated analyzer readings versus actual analyzer readings, compressor curves, etc. FIG. 14 shows a two dimensional energy balance.

As a case in point the flow versus valve position model is explained in greater detail.

A. The Flow Versus Valve Position Model

A particularly valuable engineering redundancy model is the flow versus valve position model. This model is graphically shown in FIG. 2. The particular form of this model is:

$$\frac{\text{Flow}}{(\text{Delta\_Pressure}/\text{Delta\_Pressure}_{reference})^a} + \text{filtered bias} + \text{operator bias} = Cv(VP) \quad \text{Equation 17}$$

where:
Flow: measured flow through a control valve
Delta_Pressure=closest measured upstream pressure–closest measured downstream pressure
Delta_Pressure$_{reference}$: average Delta_Pressure during normal operation
a: model parameter fitted to historical data
Cv: valve characteristic curve determined empirically from historical data
VP: signal to the control valve (not the actual control valve position)

The objectives of this model are to:
Detecting sticking/stuck control valves
Detecting frozen/failed flow measurements
Detecting control valve operation where the control system loses control of the flow This particular arrangement of the flow versus valve equation is chosen for human factors reasons: the x-y plot of the equation in this form is the one most easily understood by the operators. It is important for any of these models that they be arranged in the way which is most likely to be easily understood by the operators.

B. Developing the Flow versus Valve Position Model

Figure 15:
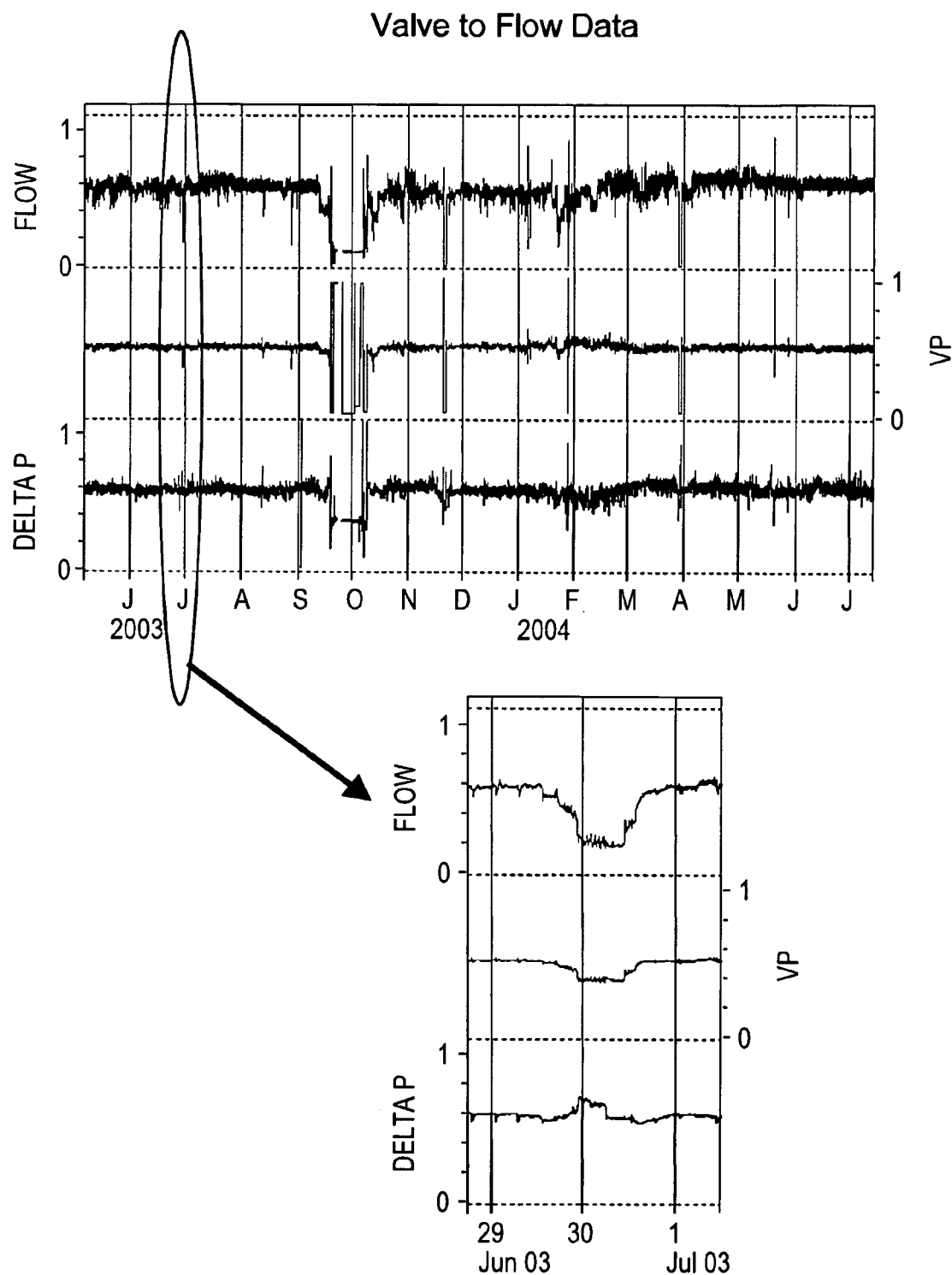
FIG. 15 shows a typical stretch of Flow, Valve Position, and Delta Pressure data with the long period of constant operation.

Because of the long periods of steady state operation experienced by continuous refining and chemical processes, a long historical record (1 to 2 years) may be required to get sufficient data to span the operation of the control valve. FIG. 15 shows a typical stretch of Flow, Valve Position, and Delta Pressure data with the long periods of constant operation. The first step is to isolate the brief time periods where there is some significant variation in the operation, as shown. This should be then mixed with periods of normal operation taken from various periods in history.

Often, either the Upstream Pressure (often a pump discharge) or the Downstream Pressure is not available. In those cases the missing measurement becomes a fixed model parameter in the model. If both pressures are missing then it is impossible to include the pressure effect in the model.

The valves characteristic curve can be either fit with a linear valve curve, with a quadratic valve curve or with a piecewise linear function. The piecewise linear function is the most flexible and will fit any form of valve characteristic curve.

The theoretical value for "a" is ½ if the measurements are taken directly across the valve. Rarely are the measurements positioned there. "a" becomes an empirically determined parameter to account for the actual positioning of the pressure measurements.

Often there will be very few periods of time with variations in the Delta Pressure. The noise in the Delta Pressure during the normal periods of operation can confuse the model-fitting program. To overcome this, the model is developed in two phases, first where a small dataset, which only contains periods of Delta Pressure variation is used to fit the model. Then the pressure dependent parameters ("a" and perhaps the missing upstream or downstream pressure) are fixed at the values determined, and the model is re-developed with the larger dataset.

C. Fuzzy-Net Processing of Flow Versus Valve Abnormality Indications

Figure 16:
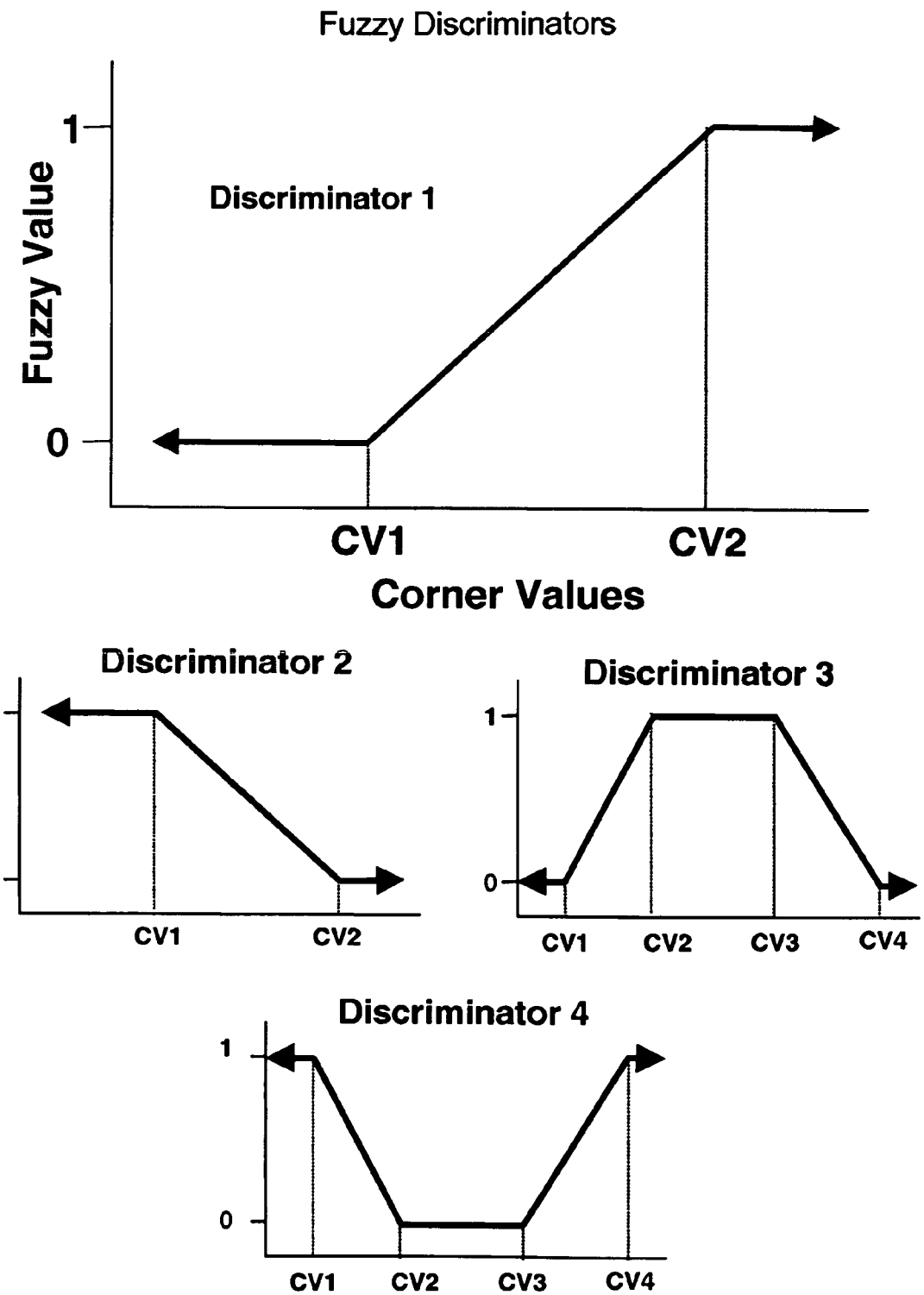
FIG. 16 shows a type 4 fuzzy discriminator.

As with any two-dimensional engineering redundancy model, there are two measures of abnormality, the "normal operating range" and the "normal model deviation". The "normal model deviation" is based on a normalized index: the error/max_error. This is fed into a type 4 fuzzy discriminator (FIG. 16). The developer can pick the transition from normal (value of zero) to abnormal (value of 1) in a standard way by using the normalized index.

The "normal operating range" index is the valve position distance from the normal region. It typically represents the operating region of the valve where a change in valve position will result in little or no change in the flow through the valve. Once again the developer can use the type 4 fuzzy discriminator to cover both the upper and lower ends of the normal operating range and the transition from normal to abnormal operation.

D. Grouping Multiple Flow/Valve Models

A common way of grouping Flow/Valve models which is favored by the operators is to put all of these models into a single fuzzy network so that the trend indicator will tell them that all of their critical flow controllers are working. In that case, the model indications into the fuzzy network (FIG. 4) will contain the "normal operating range" and the "normal model deviation" indication for each of the flow/valve models. The trend will contain the discriminator result from the worst model indication.

Figure 17:
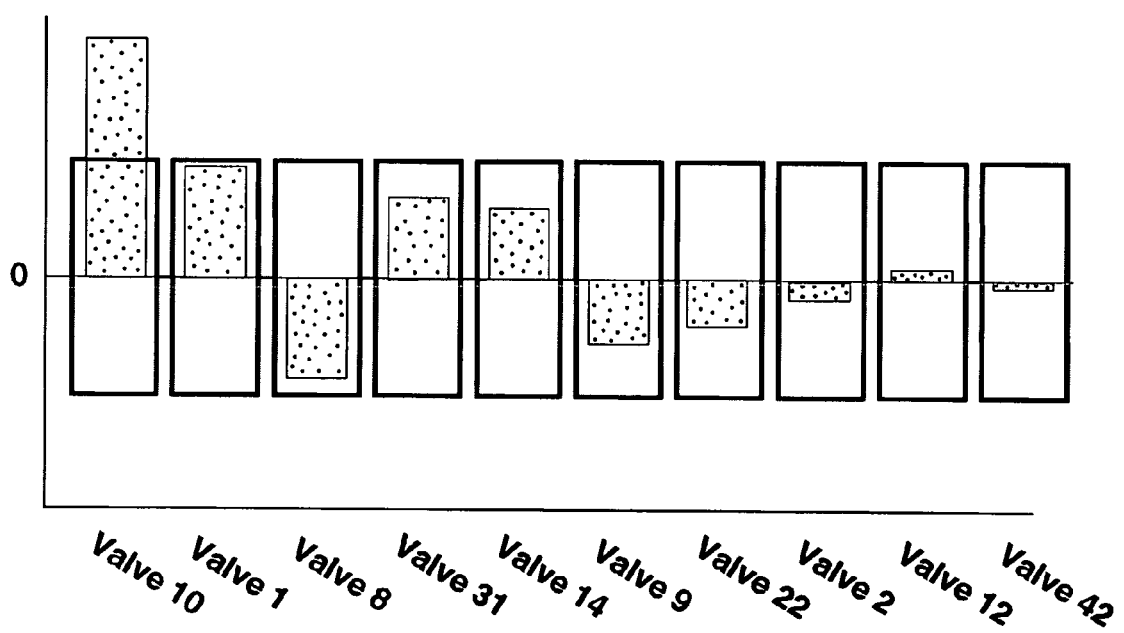
FIG. 17 shows a flow versus valve Pareto chart.

When a common equipment type is grouped together, another operator favored way to look at this group is through a Pareto chart of the flow/valves (FIG. 17). In this chart, the top 10 abnormal valves are dynamically arranged from the most abnormal on the left to the least abnormal on the right. Each Pareto bar also has a reference box indicating the degree of variation of the model abnormality indication that is within normal. The chart in FIG. 17 shows that "Valve 10" is substantially outside the normal box but that the others are all behaving normally. The operator would next investigate a plot for "Valve 10" similar to FIG. 2 to diagnose the problem with the flow control loop.

II. Multidimensional Engineering Redundancy Models

Once the dimensionality gets larger than 2, a single "PCA like" model is developed to handle a high dimension engineering redundancy check. Examples of multidimensional redundancy are:

pressure 1=pressure 2= . . . =pressure n
material flow into process unit 1=material flow out of process unit 1= . . . =material flow into process unit 2

Because of measurement calibration errors, these equations will each require coefficients to compensate. Consequently, the model set that must be first developed is:

$$F_1(y_i)=a_1G_1(x_i)+\text{filtered bias}_{1,i}+\text{operator bias}_1+\text{error}_{1,i}$$

$$F_2(y_i)=a_nG_2(x_i)+\text{filtered bias}_{2,i}+\text{operator bias}_2+\text{error}_{2,i}$$

$$F_n(y_i)=a_nG_n(x_i)+\text{filtered bias}_{n,i}+\text{operator bias}_n+\text{error}_{n,i} \quad \text{Equation 18}$$

These models are developed in the identical manner that the two dimensional engineering redundancy models were developed.

This set of multidimensional checks are now converted into "PCA like" models. This conversion relies on the interpretation of a principal component in a PCA model as a model of an independent effect on the process where the principal component coefficients (loadings) represent the proportional change in the measurements due to this independent effect. In FIG. 3, there are three independent and redundant measures, X1, X2, and X3. Whenever X3 changes by one, X1 changes by $a_1$ and X2 changes by $a_2$. This set of relationships is expressed as a single principal component model, P, with coefficients in unscaled engineering units as:

$$P=a_1X1+a_2X2+a_3X3 \quad \text{Equation 19}$$

Where $a_3=1$

This engineering unit version of the model can be converted to a standard PCA model format as follows:

Drawing analogies to standard statistical concepts, the conversion factors for each dimension, X, can be based on the normal operating range. For example, using $3\sigma$ around the mean to define the normal operating range, the scaled variables are defined as:

$$X_{scale} = X_{normal\ operating\ range}/6\sigma \qquad \text{Equation 20}$$

(99.7% of normal operating data should fall within $3\sigma$ of the mean)

$$X_{mid} = X_{mid\ point\ of\ operating\ range} \qquad \text{Equation 21}$$

(explicitly defining the "mean" as the mid point of the normal operating range)

$$X' = (X - X_{mid})/X_{scale} \qquad \text{Equation 22}$$

(standard PCA scaling once mean and $\sigma$ are determined)

Then the P' loadings for $X_i$ are:

$$b_i = (a_i / X_{i\text{-}scale}) / \left( \sum_{k=1}^{N} (a_k / X_{k\text{-}scale})^2 \right)^{1/2} \qquad \text{Equation 23}$$

(the requirement that the loading vector be normalized)

This transforms P to $$P' = b_1 * X1 + b_2 * X2 + \ldots + b_n * XN \qquad \text{Equation 24}$$

$$P'\text{"standard deviation"} = b_1 + b_2 + \ldots + b_n \qquad \text{Equation 25}$$

With this conversion, the multidimensional engineering redundancy model can now be handled using the standard PCA structure for calculation, exception handling, operator display and interaction.

Deploying PCA models and Simple Engineering Models for Abnormal Event Detection

I. Operator and Known Event Suppression

Suppression logic is required for the following:

Provide a way to eliminate false indications from measurable unusual events

Provide a way to clear abnormal indications that the operator has investigated

Provide a way to temporarily disable models or measurements for maintenance

Provide a way to disable bad acting models until they can be returned

Provide a way to permanently disable bad acting instruments.

Figure 18:
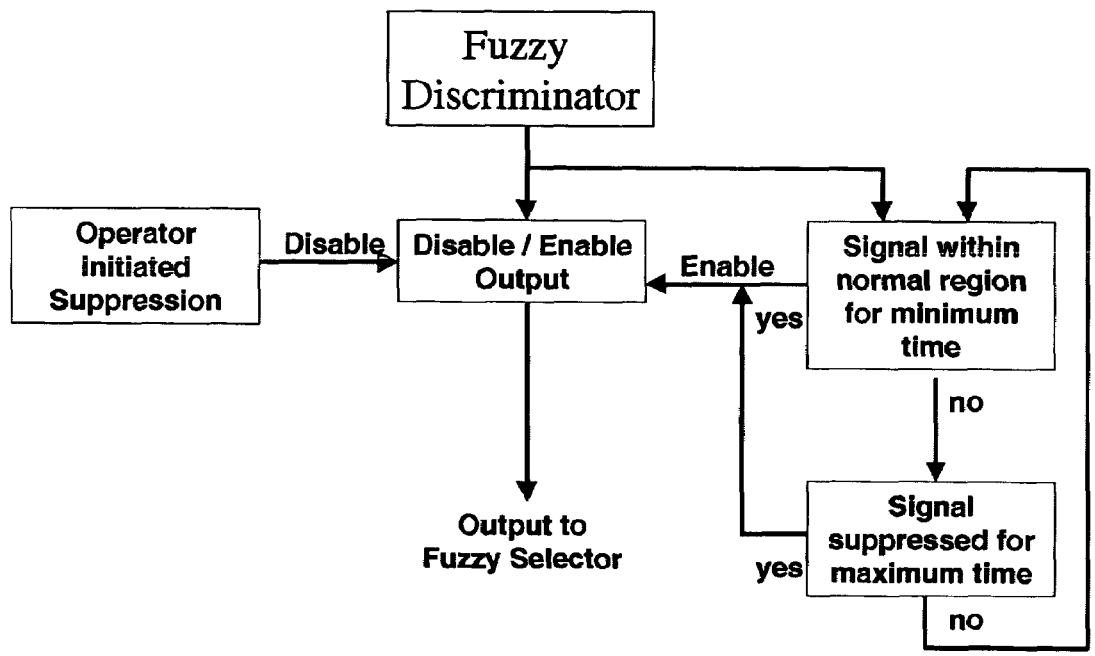
FIG. 18 shows a schematic diagram of operator suppression logic.
Figure 19:
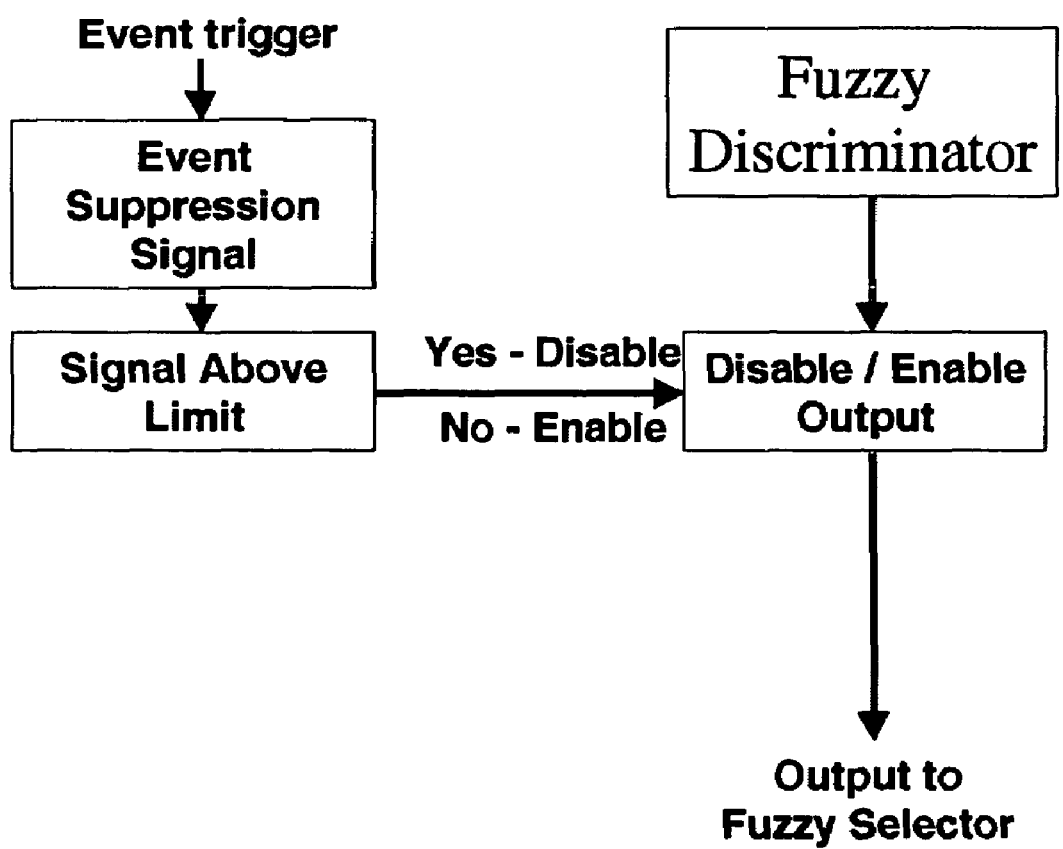
FIG. 19 shows a schematic diagram of event suppression logic.

There are two types of suppression. Suppression which is automatically triggered by an external, measurable event and suppression which is initiated by the operator. The logic behind these two types of suppression is shown in FIGS. 18 and 19. Although these diagrams show the suppression occurring on a fuzzified model index, suppression can occur on a particular measurement, on a particular model index, on an entire model, or on a combination of models within the process area.

For operator initiated suppression, there are two timers, which determine when the suppression is over. One timer verifies that the suppressed information has returned to and remains in the normal state. Typical values for this timer are from 15-30 minutes. The second timer will reactivate the abnormal event check, regardless of whether it has returned to the normal state. Typical values for this timer are either equivalent to the length of the operator's work shift (8 to 12 hours) or a very large time for semi-permanent suppression.

Figure 20:
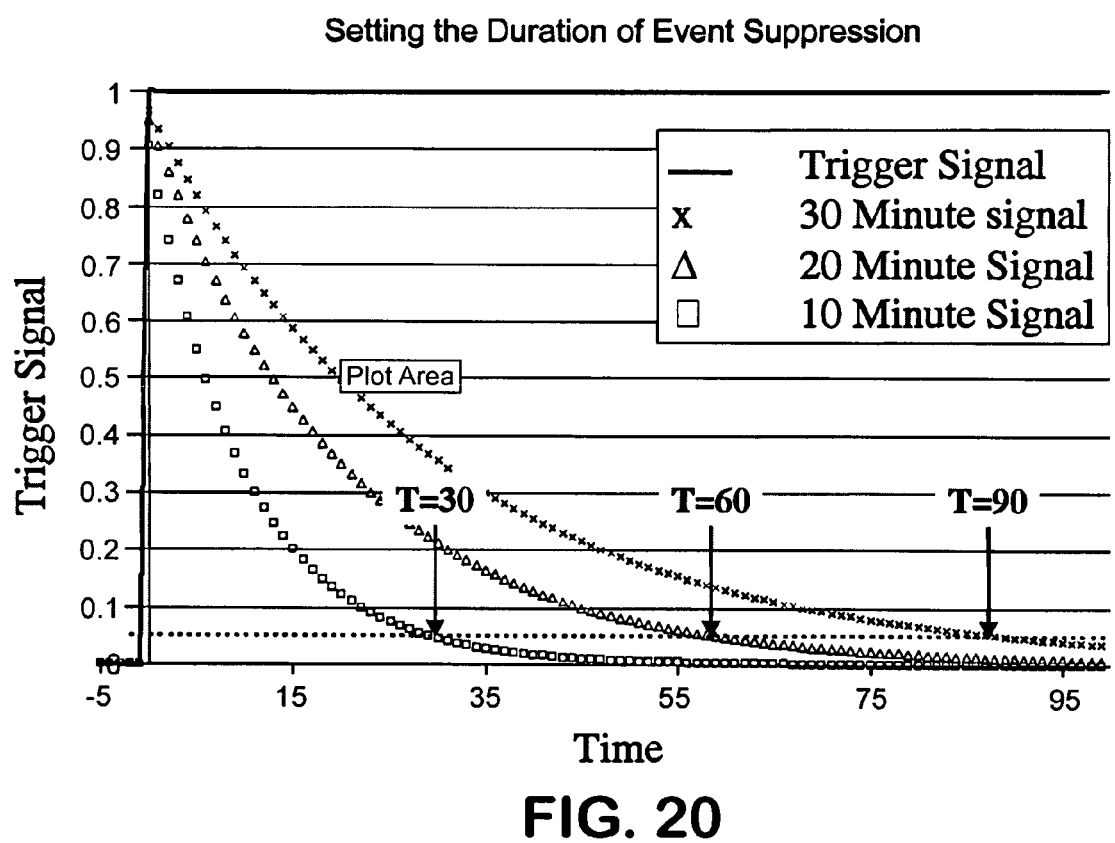
FIG. 20 shows the setting of the duration of event suppression.

For event based suppression, a measurable trigger is required. This can be an operator set point change, a sudden measurement change, or a digital signal. This signal is converted into a timing signal, shown in FIG. 20. This timing signal is created from the trigger signal using the following equations:

$$Y_n = P * Y_{n-1} + (1-P) * X_n \text{ Exponential filter equation} \qquad \text{Equation 26}$$

$$P = \text{Exp}(-T_s/T_f) \text{ Filter constant calculation} \qquad \text{Equation 27}$$

$$Z_n = X_n - Y_n \text{ Timing signal calculation} \qquad \text{Equation 28}$$

where:

$Y_n$ the current filtered value of the trigger signal $Y_{n-1}$ the previous filtered value of the trigger signal $X_n$ the current value of the trigger signal $Z_n$ the timing signal shown in FIG. 20

P the exponential filter constant $T_s$ the sample time of the measurement $T_f$ the filter time constant As long as the timing signal is above a threshold (shown as 0.05 in FIG. 20), the event remains suppressed. The developer sets the length of the suppression by changing the filter time constant, $T_f$. Although a simple timer could also be used for this function, this timing signal will account for trigger signals of different sizes, creating longer suppressions for large changes and shorter suppressions for smaller changes.

Figure 21:
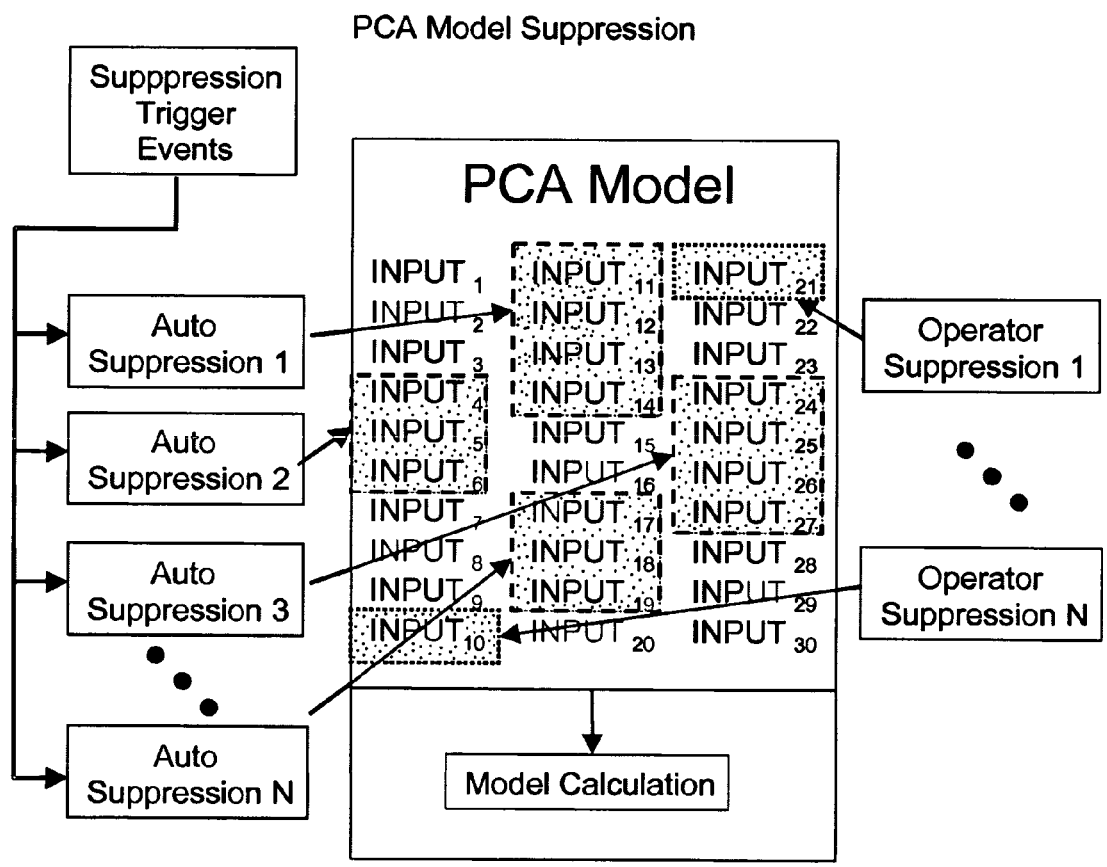
FIG. 21 shows the event suppression and the operator suppression disabling predefined sets of inputs in the PCA model.

FIG. 21 shows the event suppression and the operator suppression disabling predefined sets of inputs in the PCA model. The set of inputs to be automatically suppressed is determined from the on-line model performance. Whenever the PCA model gives an indication that the operator does not want to see, this indication can be traced to a small number of individual contributions to the Sum of Error Square index. To suppress these individual contributions, the calculation of this index is modified as follows:

$$E^2 = \sum_{i=1}^{n} w_i e_i^2 \qquad \text{Equation 29}$$

$w_i$—the contribution weight for input i (normally equal to 1)

$e_i$—the contribution to the sum of error squared from input i

When a trigger event occurs, the contribution weights are set to zero for each of the inputs that are to be suppressed. When these inputs are to be reactivated, the contribution weight is gradually returned to a value of 1.

II. PCA Model Decomposition

Although the PCA model is built using a broad process equipment scope, the model indices can be segregated into groupings that better match the operators' view of the process and can improve the sensitivity of the index to an abnormal event.

Referring again to Equation 29, we can create several Sum of Error Square groupings:

$$E_1^2 = \sum_{i=1}^{l} w_i e_i^2 \qquad \text{Equation 30}$$

-continued $$E_2^2 = \sum_{i=l}^{k} w_i e_i^2$$

$$\vdots$$

$$E_m^2 = \sum_{i=k}^{n} w_i e_i^2$$

Usually these groupings are based around smaller sub-units of equipment (e.g. reboiler section of a tower), or are sub-groupings, which are relevant to the function of the equipment (e.g. product quality).

Since each contributor, $e_i$, is always adding to the sum of error square based on process noise, the size of the index due to noise increases linearly with the number of inputs contributing to the index. With fewer contributors to the sum of error square calculation, the signal to noise ratio for the index is improved, making the index more responsive to abnormal events.

In a similar manner, each principal component can be subdivided to match the equipment groupings and an index analogous to the Hotelling $T^2$ index can be created for each subgroup.

$$P_{1,a} = \sum_{i=1}^{l} b_{1,i} x_i \quad \text{Equation 31}$$

$$P_{1,b} = \sum_{i=l}^{k} b_{1,i} x_i$$

$$P_{1,c} = \sum_{i=k}^{n} b_{1,i} x_i$$

$$P_{2,a} = \sum_{i=1}^{l} b_{2,i} x_i$$

$$P_{2,b} = \sum_{i=l}^{k} b_{2,i} x_i$$

$$P_{2,c} = \sum_{i=k}^{n} b_{2,i} x_i$$

$$T_a^2 = \sum_{i=1}^{m} P_{i,a}^2$$

$$T_b^2 = \sum_{i=1}^{m} P_{i,b}^2$$

$$T_c^2 = \sum_{i=1}^{m} P_{i,c}^2$$

The thresholds for these indices are calculated by running the testing data through the models and setting the sensitivity of the thresholds based on their performance on the test data.

These new indices are interpreted for the operator in the identical manner that a normal PCA model is handled. Pareto charts based on the original inputs are shown for the largest contributors to the sum of error square index, and the largest contributors to the largest P in the $T^2$ calculation.

III. Overlapping PCA models

Inputs will appear in several PCA models so that all interactions affecting the model are encompassed within the model. This can cause multiple indications to the operator when these inputs are the major contributors to the sum of error squared index.

To avoid this issue, any input, which appears in multiple PCA models, is assigned one of those PCA models as its primary model. The contribution weight in Equation 29 for the primary PCA model will remain at one while for the non-primary PCA models, it is set to zero.

IV. Operator Interaction & Interface Design

Figure 22:
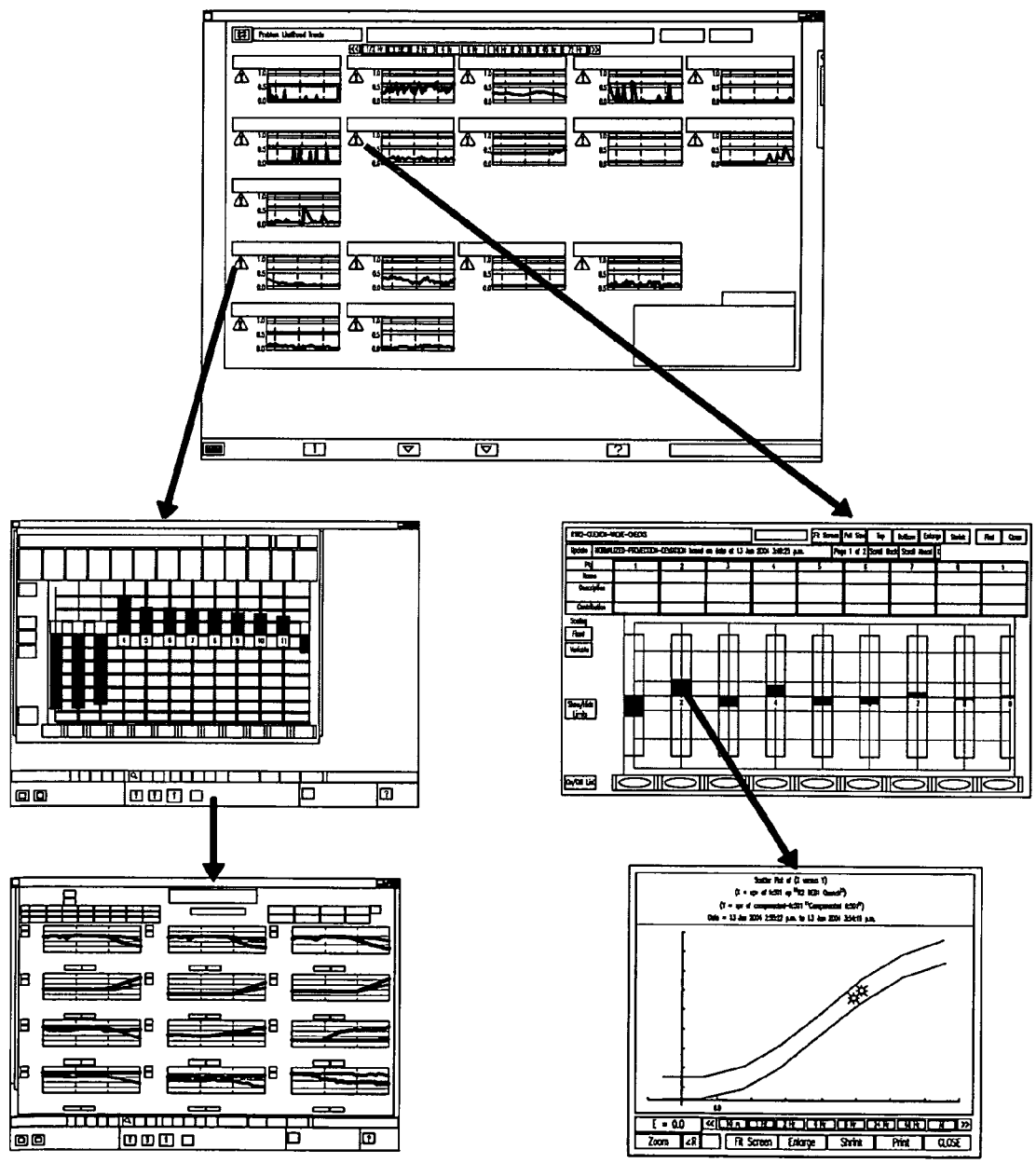
FIG. 22 shows how design objectives are expressed in the primary interfaces used by the operator.
Figure 23:
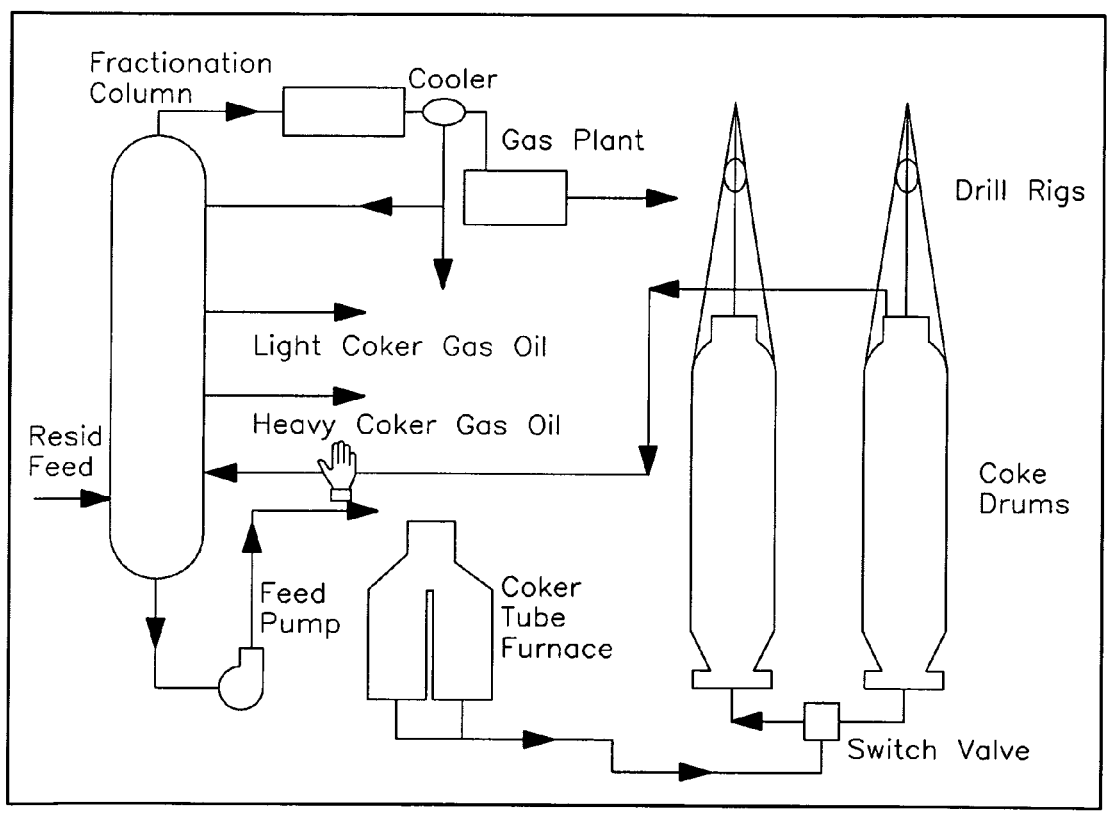
FIG. 23 shows the schematic layout of a DCU.

The primary objectives of the operator interface are to:

Provide a continuous indication of the normality of the major process areas under the authority of the operator Provide rapid (1 or 2 mouse clicks) navigation to the underlying model information Provide the operator with control over which models are enabled. FIG. 22 shows how these design objectives are expressed in the primary interfaces used by the operator.

The final output from a fuzzy Petri net is a normality trend as is shown in FIG. 4. This trend represents the model index that indicates the greatest likelihood of abnormality as defined in the fuzzy discriminate function. The number of trends shown in the summary is flexible and decided in discussions with the operators. On this trend are two reference lines for the operator to help signal when they should take action, a yellow line typically set at a value of 0.6 and a red line typically set at a value of 0.9. These lines provide guidance to the operator as to when he is expected to take action. When the trend crosses the yellow line, the green triangle in FIG. 4 will turn yellow and when the trend crosses the red line, the green triangle will turn red. The triangle also has the function that it will take the operator to the display associated with the model giving the most abnormal indication.

If the model is a PCA model or it is part of an equipment group (e.g. all control valves), selecting the green triangle will create a Pareto chart. For a PCA model, of the dozen largest contributors to the model index, this will indicate the most abnormal (on the left) to the least abnormal (on the right) Usually the key abnormal event indicators will be among the first 2 or 3 measurements. The Pareto chart includes a red box around each bar to provide the operator with a reference as to how unusual the measurement can be before it is regarded as an indication of abnormality.

For PCA models, operators are provided with a trend Pareto, which matches the order in the bar chart Pareto. With the trend Pareto, each plot has two trends, the actual measurement (in cyan) and an estimate from the PCA model of what that measurements should have been if everything was normal (in tan).

For valve/flow models, the detail under the Pareto will be the two dimensional flow versus valve position model plot. From this plot the operator can apply the operator bias to the model.

If there is no equipment grouping, selecting the green triangle will take the operator right to the worst two-dimensional model under the summary trend.

Operator suppression is done at the Pareto chart level by selecting the on/off button beneath each bar.

BIBLIOGRAPHY

I. U.S. Patent Documents

| 1 | 5,859,964 | Jan. 12, 1999 | Wang, et al, "System and method for performing real time data acquisition, process modeling and fault detection of wafer fabrication processes" |
| 2 | 5,949,678 | Sep. 7, 1999 | Wold, et al, "Method for Monitoring Multivariable Processes" |
| 3 | 6,522,978 | Feb. 18, 2002 | Chen, et al, "Paper web breakage prediction using principal components analysis and classification and regression trees" |
| 4 | 6,368,975 | Apr. 9, 2002 | Balasubramhanya, et al, "Method and apparatus for monitoring a process by employing principal component analysis" |
| 5 | 6,466,877 | Oct. 15, 2002 | Chen, et al, "Paper web breakage prediction using principal components analysis and classification and regression trees" |
| 6 | 6,521,080 | Feb. 18, 2003 | Balasubramhanya, et al, "Method and apparatus for monitoring a process by employing principal component analysis" |
| 7 | 6,564,119 | May 13, 2003 | Vaculik, et al, "Multivariate Statistical Model Based System for Monitoring the Operation of a Continuous Caster and Detecting the Onset of Impending Breakouts" |
| 8 | 6,636,842 | Oct. 21, 2003 | Zambrano, et al, "System and method for controlling an industrial process utilizing process trajectories" |

II. Literature

| 1. | Cardoso, J. et al | "Fuzzy Petri Nets: An Overview", 13$^{th}$ Word Congress of IFAC, Vol. I: Identification II, Discrete Event Systems, San Francisco, CA, USA, Jun. 30-Jul. 5, 1996, pp. 443-448. |
| 2. | Jackson, E. | "A User's Guide to Principal Component Analysis", John Wiley & Sons, 1991 |
| 3. | Kourti, T. | "Process Analysis and Abnormal Situation Detection: From Theory to Practice", IEEE Control Systems Magazine, October 2002, pp. 10-25 |
| 4. | Ku, W. | "Disturbance Detection and Isolation for Statistical Process Control in Chemical Processes", PhD Thesis, Lehigh University, Aug. 17, 1994 |
| 5. | Martens, H., & Naes, T., | "Multivariate Calibration", John Wiley & Sons, 1989 |
| 6. | Piovoso, M. J., et al. | "Process Data Chemometrics", IEEE Trans on Instrumentation and Measurement, Vol. 41, No. 2, April 1992, pp. 262-268 |

APPENDIX 2

Principal Component Analysis Models

APPENDIX 2A

The HEATER PCA Model: 5 Principal Components (Named) With Sensor Description, Engineering Units, and Principal Component Loading 1. Oil Flow Control

| 1 | $1^{ST}$ PASS HYDROCARBON FLOW | BBL/D | −2.56E−01 |
| 2 | $3^{RD}$ PASS HYDROCARBON FLOW | BBL/D | −2.55E−01 |
| 3 | $2^{ND}$ PASS HYDROCARBON FLOW | BBL/D | −2.54E−01 |
| 4 | $4^{TH}$ PASS HYDROCARBON FLOW | BBL/D | −2.51E−01 |

2. Oil Side Heat Input

| 1 | $3^{RD}$ PASS CONTROL TEMPERATURE | DEGF | 3.40E−01 |
| 2 | $1^{ST}$ PASS CONTROL TEMPERATURE | DEGF | 3.29E−01 |
| 3 | $2^{ND}$ PASS CONTROL TEMPERATURE | DEGF | 3.27E−01 |
| 4 | $4^{TH}$ PASS CONTROL TEMPERATURE | DEGF | 3.26E−01 |
| 5 | TRANSFER LINE TEMPERATURE | DEGF | 2.39E−01 |
| 6 | $3^{RD}$ PASS OUTLET TEMPERATURE | DEGF | 2.21E−01 |
| 7 | $1^{ST}$ PASS OUTLET TEMPETRATURE | DEGF | 2.20E−01 |
| 8 | $2^{ND}$ PASS OUTLET TEMPETATURE | DEGF | 2.08E−01 |
| 9 | $4^{TH}$ PASS OUTLET TEMPERATURE | DEGF | 1.94E−01 |

3. Fuel Gas Flow

| 1 | $1^{ST}$ PASS FUEL GAS FLOW | MSCF/D | 2.23E−01 |
| 2 | $4^{TH}$ PASS FUEL GAS FLOW | MSCF/D | 2.18E−01 |
| 3 | $3^{RD}$ PASS FUEL GAS FLOW | MSCF/D | 2.09E−01 |
| 4 | $2^{ND}$ PASS FUEL GAS FLOW | MSCF/D | 1.87E−01 |

4. Steam Flow Control

| 1 | $1^{ST}$ PASS STEAM FLOW | LB/HR | 5.62E−01 |
| 2 | $2^{ND}$ PASS STEAM FLOW | LB/HR | 2.79E−01 |
| 3 | $3^{RD}$ PASS STEAM FLOW | LB/HR | 2.78E−01 |
| 4 | $4^{TH}$ PASS STEAM FLOW | LB/HR | 2.78E−01 |

5. Excess Heat

| | | | |
|---|---|---|---|
| 1 | EAST HTR O2 CONTROL | PCT | 6.26E−01 |
| 2 | $3^{RD}$ PASS MID TEMPERATURE | DEGF | 3.07E−01 |
| 3 | $4^{TH}$ PASS MID TEMPERATURE | DEGF | 2.55E−01 |
| 4 | $2^{ND}$ PASS BOX TEMPERATURE | DEGF | −2.48E−01 |
| 5 | FLUE GAS TO PREHEATER TEMPERATURE | DEGF | −2.17E−01 |
| 6 | STACK TEMPERATURE | DEGF | 2.10E−01 |
| 7 | $1^{ST}$ PASS MID TEMPERATURE | DEGF | 1.94E−01 |
| 8 | $1^{ST}$ PASS BOX TEMPERATURE | DEGF | −1.84E−01 |
| 9 | $4^{TH}$ PASS BOX TEMPERATURE | DEGF | −1.84E−01 |
| 10 | $3^{RD}$ PASS BOX TEMPERATURE | DEGF | −1.71E−01 |
| 11 | $2^{ND}$ PASS MID TEMPERATURE | DEGF | 1.49E−01 |

APPENDIX 2B

The GASPLANT PCA Model: 6 Principal Components (Named) With Sensor Description, Engineering Units, and Principal Component Loading

1. Gas Plant Feed

| | | | |
|---|---|---|---|
| 1 | ABSORBER OFF GAS | MSCF/D | −1.76E−01 |
| 2 | COMP DISCH-2ND STAGE Output | % | 1.71E−01 |
| 3 | ABS PRESS CONTRL Output | % | −1.71E−01 |
| 4 | M.F. OFF GAS Output | % | 1.66E−01 |
| 5 | COMPR 2ND STAGE PRESS | PSIG | −1.61E−01 |
| 6 | COMP STG 2 INLET | DEGF | −1.57E−01 |
| 7 | COMPR 1ST STAGE PRESS | PSIG | −1.55E−01 |
| 8 | M.F. BACK PRESS CONTRL Output | % | −1.54E−01 |
| 9 | I-STAGE KO DRM 6D9 PRESS | PSIG | −1.52E−01 |
| 10 | M.F. OVHD REFLUX Output | % | −1.51E−01 |
| 11 | M.F. OFF GAS | MSCF/D | −1.51E−01 |
| 12 | MAIN FRAC OVHD PRESSURE | PSIG | −1.51E−01 |

2. Gas Plant Heat Balance

| | | | |
|---|---|---|---|
| 1 | DEB REBLR DRAW | DEGF | −1.27E−01 |
| 2 | DEBUT BOTTOMS | DEGF | −9.21E−02 |
| 3 | DEB REBLR RETURN | DEGF | −7.34E−02 |
| 4 | MF OVHD ACCUM LIQ | DEGF | −4.00E−02 |
| 5 | HGO FROM GP TO MF | DEGF | −6.71E−02 |
| 6 | DEB BTMS REB TEMP | DEGF | −1.67E−01 |
| 7 | LEAN OIL TO E12 | DEGF | −7.11E−02 |
| 8 | DEBUT TRAY 2 | DEGF | −1.72E−01 |
| 9 | ABS MID REB RETN | DEGF | −9.60E−02 |

3. Gas Plant Fuel Production

| | | | |
|---|---|---|---|
| 1 | ABS TOP CLR DRAW | DEGF | −1.98E−01 |
| 2 | M.F. BACK PRESS CONTRL | PSIG | 1.97E−01 |
| 3 | M.F. OVHD ACC TO FLARE | PSIG | 1.97E−01 |
| 4 | ABS MID CLR DRAW | DEGF | −1.94E−01 |
| 5 | COMPR 2ND DISCHARGE | DEGF | −1.85E−01 |
| 6 | COMP SUCTION PRESS | PSIG | 1.77E−01 |
| 7 | ABS TRAY 29 VAP | DEGF | −1.77E−01 |
| 8 | DEBUT TRAY 2 | DEGF | −1.72E−01 |
| 9 | I-STAGE KO DRM 6D9 PRESS | PSIG | 1.70E−01 |
| 10 | DEB BTMS REB TEMP | DEGF | −1.67E−01 |
| 11 | ABS TRAY 2 | DEGF | −1.66E−01 |
| 12 | COMPR 1ST STAGE PRESS | PSIG | 1.64E−01 |
| 13 | ABSORBER TRAY 2 TEMP | DEGF | −1.58E−01 |
| 14 | MAIN FRAC OVHD PRESSURE | PSIG | 1.56E−01 |
| 15 | DISCH KO DRM 6D20 Output | % | −1.53E−01 |
| 16 | ABS TOP CLR RETN | DEGF | −1.51E−01 |
| 17 | COLAESCER DRAW | DEGF | −1.42E−01 |
| 18 | ABS MID REB DRAW | DEGF | −1.41E−01 |
| 19 | DEBUT OVHD VAPOR | DEGF | −1.38E−01 |
| 20 | NAPTHA TO ABS Output | % | 1.28E−01 |
| 21 | DEB REBLR DRAW | DEGF | −1.27E−01 |
| 22 | M.F. OVHD ACC LVL Output | % | 1.26E−01 |
| 23 | NAPTHA TO ABS | KBBL/D | 1.25E−01 |
| 24 | HGO TO ABS REB Output | % | 1.21E−01 |
| 25 | ABS MID CLR RETN | DEGF | −1.18E−01 |
| 26 | ABSORBER OFF-GAS | DEGF | −1.16E−01 |
| 27 | M.F. OVHD OUTLET TEMP | DEGF | 1.15E−01 |
| 28 | LEAN OIL FROM E9 | DEGF | −1.14E−01 |

4. Gas Plant Gasoline Production

| | | | |
|---|---|---|---|
| 1 | ABS REFLUX-LEAN OIL | KBBL/D | 3.32E−01 |
| 2 | ABS REFLUX-LEAN OIL Output | % | 2.87E−01 |
| 3 | DEB BTMS LVL Output | % | −2.84E−01 |
| 4 | NAPHTHA TO STORAGE | KBBL/D | −2.81E−01 |
| 5 | NAPHTHA TO STORAGE Output | % | −2.63E−01 |
| 6 | NAPTHA TO ABS | KBBL/D | −2.59E−01 |
| 7 | M.F. OVHD ACC LVL Output | % | −2.58E−01 |
| 8 | NAPTHA TO ABS Output | % | −2.32E−01 |
| 9 | #1 INTERCOOLER FLW | KBBL/D | 1.95E−01 |
| 10 | ABSORBER OFF-GAS | DEGF | −1.84E−01 |
| 11 | #1 INTERCOOLER LVL Output | % | 1.82E−01 |
| 12 | ABS BTMS LVL Output | % | 1.54E−01 |
| 13 | ABS NAP > DEB | KBBL/D | 1.53E−01 |
| 14 | HGO FROM ABS REB | DEGF | −1.52E−01 |
| 15 | ABSORBER BOTTOMS TEMP | DEGF | −1.29E−01 |
| 16 | ABS TRAY 2 | DEGF | −1.27E−01 |
| 17 | ABSORBER TRAY 2 TEMP | DEGF | −1.19E−01 |
| 18 | ABS NAP > DEB Output | % | 1.06E−01 |
| 19 | M.F. OFF GAS | MSCF/D | 9.98E−02 |
| 20 | COMPRESSOR 6-G-14 AMPS | AMP | 9.96E−02 |
| 21 | COMP DISCH-2ND STAGE | MSCF/D | 9.90E−02 |
| 22 | MF 16D1 TRAY 21 TEMP | DEGF | −9.09E−02 |
| 23 | ABS TOP CLR DRAW | DEGF | −8.87E−02 |
| 24 | ABS TOP REFLUX | DEGF | −8.62E−02 |
| 25 | DISCH KO DRM 6D20 INTRFC Output | % | 7.99E−02 |
| 26 | ABS TOP CLR RETN | DEGF | 7.76E−02 |
| 27 | 16G14M MAX STATOR TEMP | DEGF | 7.45E−02 |
| 28 | M.F. BACK PRESS CONTRL Output | % | 6.27E−02 |
| 29 | DEB ACC LVL Output | % | 6.25E−02 |

5. Gas Plant Debutanizer Feed

| | | | |
|---|---|---|---|
| 1 | ABSORBER BOTTOMS TEMP | DEGF | 2.64E−01 |
| 2 | ABS MID REB RETN | DEGF | 2.47E−01 |
| 3 | ABSORBER TRAY 2 TEMP | DEGF | 2.10E−01 |
| 4 | ABS TRAY 2 | DEGF | 2.08E−01 |
| 5 | HGO TO ABS REB Output | % | −1.98E−01 |
| 6 | HGO FROM ABS REB | DEGF | 1.93E−01 |
| 7 | COMPR 1ST DISCHARGE | DEGF | −1.90E−01 |
| 8 | DISCH KO DRM 6D20 Output | % | −1.80E−01 |
| 9 | LEAN OIL FROM E9 | DEGF | 1.80E−01 |
| 10 | COMPR 2ND DISCHARGE | DEGF | −1.77E−01 |
| 11 | ABS NAP > DEB Output | % | −1.76E−01 |
| 12 | ABS BTMS LVL Output | % | −1.74E−01 |
| 13 | ABS NAP > DEB | KBBL/D | −1.72E−01 |
| 14 | M.F. BACK PRESS CONTRL | PSIG | 1.69E−01 |
| 15 | M.F. OVHD ACC TO FLARE | PSIG | 1.69E−01 |
| 16 | I-STAGE KO DM 6D9 Output | % | −1.53E−01 |
| 17 | COMP SUCTION PRESS | PSIG | 1.48E−01 |
| 18 | ABSORBER BOTTOMS TEMP Output | % | −1.48E−01 |
| 19 | COMP KO DRUM IN | DEGF | −1.43E−01 |
| 20 | HGO TO ABS REB | KBBL/D | −1.42E−01 |
| 21 | ABS BTM REB DRAW | DEGF | 1.33E−01 |
| 22 | I-STAGE KO DRM 6D9 PRESS | PSIG | 1.27E−01 |

-continued

| | | | |
|---|---|---|---|
| 23 | MF OVHD COND OUT | DEGF | -1.22E-01 |
| 24 | COMPR 1ST STAGE PRESS | PSIG | 1.21E-01 |

6. Gas Plant Olefin Production

| | | | |
|---|---|---|---|
| 1 | DEBUT REFLUX | DEGF | 2.64E-01 |
| 2 | HGO FROM GP TO MF | DEGF | 2.56E-01 |
| 3 | DEBUT BOTTOMS | DEGF | 2.48E-01 |
| 4 | DEB REBLR RETURN | DEGF | 2.46E-01 |
| 5 | DEB REBLR DRAW | DEGF | 2.30E-01 |

-continued

| | | | |
|---|---|---|---|
| 6 | C3 TOTAL IN DEBUT OVHD | PCT | 1.97E-01 |
| 7 | HGO TO DEB REB | KBBL/D | 1.92E-01 |
| 8 | DEB BTMS REB TEMP Output | % | 1.91E-01 |
| 9 | ABS TOP CLR RETN | DEGF | 1.68E-01 |
| 10 | C4 = 'S IN DEBUT BOTTOMS | PCT | 1.55E-01 |
| 11 | #1 INTERCOOLER FLW | KBBL/D | 1.54E-01 |

APPENDIX 3

Engineering Models

A. PID Controller Monitors

| Controller Descripiton | Standard Deviation Time Window | Frozen Value Threshold | Frozen Value Tolerance (Minutes) | Offset Duration Tolerance (Minutes) | Control Deadband | Accumulated Error Tolerance | High Standard Deviation Threshold | High Standard Deviation Tolerance |
|---|---|---|---|---|---|---|---|---|
| MF Btms Lvl | 15 | 0.02 | 15 | 120 | 3 | 21 | 6 | 1 |
| HGO Tray Lvl | 15 | 0.03 | 5 | 120 | 5 | 50 | 15 | 1 |
| HGO Circ Stm Gen Lvl | 10 | 0.03 | 3 | 120 | 5 | 40 | 5 | 1 |
| MF Ovhd Acc HC Lvl | 10 | 0.02 | 10 | 120 | 5 | 35 | 5 | 1 |
| MF Ovhd Acc Boot Lvl | 5 | 0.25 | 5 | 15 | 15 | 100 | 10000 | 10000 |
| Absorber Bottoms Lvl | 15 | 0.05 | 10 | 120 | 4 | 40 | 5 | 1 |
| #2 Intercooler Lvl | 10 | 0.08 | 10 | 60 | 20 | 100 | 10000 | 10000 |
| #1 Intercooler Lvl | 10 | 0.075 | 10 | 120 | 3 | 50 | 10000 | 10000 |
| Debut Bottoms Lvl | 10 | 0.05 | 10 | 120 | 2.5 | 40 | 10000 | 10000 |
| Debut Acc Lvl | 15 | 0.025 | 10 | 120 | 2 | 100 | 10000 | 10000 |
| I-Stage KO Drum HC Lvl | 15 | 0.04 | 10 | 120 | 2 | 10 | 5 | 1 |
| I-Stage KO Drum Lvl | 5 | 0.03 | 10 | 120 | 4 | 100 | 10 | 10 |
| Suct KO Drum Lvl | 15 | 0.035 | 10 | — | — | — | 10 | 10 |
| HGO Prod Stm Gen Lvl | 5 | 0.1 | 10 | 120 | 7.5 | 50 | 7 | 1 |
| HGO Stripper Lvl | 15 | 0.05 | 7 | 30 | 8 | 80 | 8 | 1 |
| Absorber Ovhd Pressure | 15 | 0.02 | 5 | 120 | 5 | 80 | 2 | 10 |
| Debut Ovhd Pressure | 15 | 0.025 | 10 | 120 | 4 | 50 | 5 | 50 |
| Purge Oil Pressure | 15 | 0.04 | 10 | 120 | 5 | 50 | 10 | 10 |
| Hot MCB to E Htr Flow | 60 | 1.00E-11 | 10000 | 120 | 400 | 2000 | 5000 | 10000 |
| Hot MCB to W Htr Flo | 60 | 1.00E-11 | 10000 | 10000 | 400 | 2000 | 10000 | 10000 |

Standard Deviation Time Window (SDTW): Minutes of data used to calculate standard deviation of the process value
Frozen Value Threshold (FVT): Value to be compared with current standard deviation calculated over SDTW minutes
Frozen Value Tolerance Minutes (FVTM): If current value of standard deviation remains below FVT for FVTM minutes instrument is considered to be frozen
Offset Duration Tolerance (ODT): Number of minutes for which the current PV must stay on one side above a dead band (CDB) to consider that the instrument has a control offset problem.
Control Deadband (CDB): A threshold set to evaluate control offset error or accumulated controller error
Accumulated Error Tolerance (AET): Signed Value representing the cumulative error (PV-SP) over a specified time. Accumulation starts when PV is outside the dead band (CDB) and stays on the same side of the set point.
High Standard Deviation Threshold (HST): Value to be compared with current standard deviation calculated over SDTW minutes
High Standard Deviation Tolerance (HSTM): If current value of standard deviation remains above HST for HSTM minutes instrument is considered to be highly variant.

B. Process Consistency Monitors

| Name | Calculation | Tolerance Value (of absolute value) | Units |
|---|---|---|---|
| Heat Pass Flows Monitor | Sum of individual pass flows - the total flow for each furnace | Must be less than 2000 | BBL/D |
| Main Fractionator Flooding Monitor | Flash Zone Temperature - Bottoms Temperature | Must be greater than 50 | DEGF |
| Main Fractionator Overhead Temperature Monitor | Overhead Temperature - Overhead Outlet Temperature | Cannot be greater than 3 | DEGF |

-continued

| Name | Calculation | Tolerance Value (of absolute value) | Units |
|---|---|---|---|
| Main Fractionator Overhead Accumulator to Flare Monitor | Overhead Flare Line Pressure - Overhead Compressor Line Pressure | 1 | PSIG |
| Debutanizer Bottoms Flooding Monitor | Debutanizer Bottoms Temperature - Reboiler Inlet Temperature | Debut Btms >250 Delta >10 | DEGF |
| Cat Slurry Oil and Steam Flow Monitor | CSO Flow + 150 # Steam Flow for each heater | Must be greater than 0.01 | BBL/D (Hydrocarbon) LB/H (Steam) |

C. Valve-Flow-Models 22 valve-flow models have been developed for the DCU AED application. All the valve models have bias-updating implemented. The flow is compensated for the Delta Pressure in this manner:

$$\text{Compensated Flow} = FL/(DP/StdDP)^A$$

where,
FL=Actual Flow
DP=Upstream Pressure−Downstream Pressure
StdDP=Standard Delta Pressure
A=Exponential Parameter A plot is then made between the Estimated Compensated Flow and the Actual Compensated Flow to check the model consistency (X-Y plot) with a specified tolerance. The following is the list of the 22 valve flow models.

| DCU Area | Flow Description | Flow Engineering Units | Standard Differential (PSIG) | Exponential Parameter (Flow Units) | Tolerance (Flow Units) |
|---|---|---|---|---|---|
| Gas Plant | ABS REFLUX-LEAN OIL | KBBL/D | 60.0 | 0.21 | 2.3-3.9 |
| | ABSORBER OFF GAS | MSCF/D | 55.421 | 0.284 | 7.0 |
| | ABS NAP > DEB | KBBL/D | 60.0 | 0.273 | 4.0-8.0 |
| | DEB REFLUX | KBBL/D | 94.037 | 0.1 | 1.5 |
| | NAPHTHA TO STORAGE | KBBL/D | 137.264 | 0.6 | 4.5-4.625 |
| | C3C4 TO FCC TRTS | BBL/D | 49.423 | 0.247 | 800 |
| Fractionator | UPPER FD-TRAY 5 | KBBL/D | 70.736 | 0.1 | 2.5 |
| | SOUR FEED CONTRL | KBBL/D | 28.268 | 0.273 | 6.0 |
| | 16E27 HGO FRESH FEED OUT | KBBL/D | 14.016 | 0.073 | 4.0-46 |
| | M.F. OVHD REFLUX | KBBL/D | 70.425 | 0.273 | 4.0 |
| | NAPTHA TO ABS | KBBL/D | 116.464 | 0.242 | 2.05 |
| | HGO TO DEB REB | KBBL/D | 64.708 | 0.6 | 2.625 |
| | HOT FD-CRUDE | KBBL/D | 165.125 | 0.1 | 5.0 |
| | COKER GAS (16D6) TO FCC | MSCF/D | 10.232 | 0.549 | 1.5 |
| Furnaces | 1ST PASS-E. HTR | BBL/D | 473.075 | 0.29 | 1600 |
| | 2ND PASS-E. HTR | BBL/D | 399.594 | 0.35 | 1837.5 |
| | 3RD PASS-E. HTR | BBL/D | 516.236 | 0.45 | 1837.5 |
| | 4TH PASS-E. HTR | BBL/D | 507.764 | 0.2 | 1312.5 |
| | 1ST PASS-W. HTR | BBL/D | 747.437 | 0 | 1181.25 |
| | 2ND PASS-W. HTR | BBL/D | 657.98 | 0 | 1312.5 |
| | 3RD PASS-W. HTR | BBL/D | 667.437 | 0 | 1200 |
| | 4TH PASS-W. HTR | BBL/D | 653.891 | 0 | 1200 |

What is claimed is:

1. A method for the early notification of an unplanned abnormal event detection (AED) for some process units of a delayed coking unit (DCU) comprising:

(a) comparing online measurements from an array of sensors for the process units to a set of models including at least two principal component analysis models for normal operation of the corresponding process units, wherein said delayed coking unit has been divided into at least two equipment groups wherein there is minimal interaction between said equipment groups and principal component analysis models correspond to equipment groups, wherein the inputs to the principal component analysis models include measurements from said array of sensors which have been divided into groups corresponding to equipment groups, wherein said equipment groups are defined by including all major material and energy integrations and quick recycles in the same equipment group and said measurements are cross-correlated with each other, (b) determining if the current operation differs from expected normal operations from the cumulative measurements of said array of sensors that are inputs to said set of models so as to detect the presence of an unplanned abnormal event condition in a process unit which has developed on a timescale of minutes to hours, and (c) determining the underlying cause of an abnormal condition in the DCU.

2. The method of claim 1 wherein said set of models correspond to equipment groups and operating modes, one model for each equipment group which may include one or more operating modes.

3. The method of claim 1 wherein said set of models correspond to equipment groups and process operating modes, one model for each equipment group and each operating mode.

4. The method of claim 1 wherein said delayed coking unit includes downstream towers and are decomposed into five monitors.

5. The method of claim 4 wherein each of the monitors generates a continuous signal indicating the probability of an abnormal condition in the area.

6. The method of claim 4 where a list of monitors are automatically identified, isolated, ranked and displayed for the operator.

7. The method of claim 1 wherein said process units are divided into operational sections of the DCU system.

8. The method of claim 7 wherein there are three operational sections.

9. The method of claim 8 wherein the three operational sections include the furnaces or heater, main fractionator and the gas plant.

10. The method of claim 9 wherein said set of models further identifies the consistency between measurements around a specific unit, including main fractionator, gas plant units, the wet gas compressor, flow to valve pressure drop which indicate any early breakdown in the consistency.

11. The method of claim 10 wherein said set of models further comprises suppressing model calculations to eliminate false positives on special cause operations.

12. The method of claim 1 wherein said set of models include process variables values measured by said array of sensors.

13. The method of claim 12 wherein said principal component models for different process units include some process variable values measured by a same sensor in said array of sensors.

14. The method of claim 1 wherein (a) said set of models begins with a principal components model based on questionable data, (b) gathering high quality training data and using said high quality training data in the model to modify the model and thereby improve the model, and (c) repeating step (b) of this claim to further improve the model.

15. The method of claim 14 further comprising the step of synchronizing pairs of measurements for two variables used in said model by time by one of the variables using a dynamic transfer function.

16. The method of claim 14 wherein said high quality training data includes historical data for the model of the processing unit.

17. The method of claim 16 wherein said set of models include transformed variables.

18. The method of claim 17 wherein said transformed variables are transformed to include pressure compensated temperature and/or pressure compensated flow measurements and/or valve positions to estimate flow.

19. The method of claim 1 wherein variables of process measurements that are affected by operating point changes in process operations are converted to deviation variables by subtracting the moving average.

20. The method of claim 1 wherein at least one of said models is corrected for noise.

21. The method of claim 20 wherein said set of models are corrected by filtering or eliminating noisy measurements of variables.

22. The method of claim 1 wherein the measurements of a variable are scaled.

23. The method of claim 22 wherein the measurements are scaled to the expected normal range of that variable.

24. The method of claim 1 wherein the step of determining the underlying cause of the abnormal condition provides diagnostic information at different levels of detail to aid in the investigation of the event.

25. The method of claim 1 wherein the number of principal components is chosen such that coefficients of the principal component become about equal in size.

26. The method of claim 1 wherein said set of models further includes engineering models.

27. The method of claim 1 wherein said principal components include process variables provided by online measurements.

28. The method of claim 27 further comprising the step of synchronizing measurements by time to one of the variables using a dynamic filter.

29. The method of claim 27 wherein the process measurement variables affected by operating point changes in the process operations are converted to deviation variables.

30. The method of claim 27 wherein the number of principal components is selected by the magnitude of total process variation represented by successive components.

31. A system for early notification of unplanned abnormal event detection (AED) for some of the process units of a DCU of a petroleum refinery comprising:

(a) on-line data acquisition of measurements from an array of sensors, (b) a set of models including at least two principal component analysis models included in the set describing operations of said process units including automatic detection of drum switches and furnace decoking operations wherein said DCU has been divided into at least two equipment groups, wherein a single principal component model corresponding to an equipment group, and wherein the inputs to the principal component analysis models include measurements from said array of sensors, wherein said array of sensors has been divided into groups corresponding to said equipment groups, and wherein said equipment groups are defined by including all major material and energy integrations and quick recycles in the same equipment group and said measurements are cross-correlated with each other, (c) a set of displays which indicates if the current operation differs from expected normal operations from the cumulative measurements of said array of sensors so as to indicate the presence of an abnormal condition in the process unit which has developed on a timescale of minutes to hours so as to detect an unplanned abnormal event, and (d) a set of displays which indicates the underlying cause of an abnormal condition in the DCU.

32. The system of claim 31 wherein said DCU is partitioned into three operational sections with principal components models for selected sections.

33. The system of claim 32 wherein said principal component models include process variables provided by online measurements.

34. The system of claim 32 wherein said set of models further comprises suppressing model calculations to eliminate operator induced notifications and false positives.

35. The system of claim 31 wherein: (a) said set of models are obtained from an initial model based upon training data, (b) use of said initial model to obtain new data and improve the model, and (c) iteratively repeating step (b) to improve the model.

36. The system of claim 35 wherein said training data set includes historical data of the processing unit for model development.

37. The system of claim 36 wherein said set of models includes transformed variables.

38. The system of claim 37 wherein said transformed variables include pressure compensated temperature and/or pressure compensated flow measurements and/or flow to valve positions to estimate flow.

39. The system of claim 36 wherein some measurement pairs are time synchronized to one of the variables using a dynamic filter.

40. The system of claim 36 wherein the process measurement variables affected by operating point changes in the process operations are converted to deviation variables.

41. The system of claim 36 wherein the measurements of a variable are scaled prior to model identification.

42. The system of claim 41 wherein the measurements are scaled by the expected normal range of that variable.

43. The system of claim 31 wherein the number of principal components is selected by the magnitude of total process variation represented by successive components.

44. The system of claim 31 wherein said set of models further includes engineering models.

* * * * *